US011677123B2

(12) United States Patent
Qiao et al.

(10) Patent No.: US 11,677,123 B2
(45) Date of Patent: Jun. 13, 2023

(54) MITIGATING THERMAL RUNAWAY IN LITHIUM ION BATTERIES USING DAMAGE-INITIATING MATERIALS OR DEVICES

(71) Applicant: The Regents of the University of California, Oakland, CA (US)

(72) Inventors: Yu Qiao, San Diego, CA (US); Weiyi Lu, La Jolla, CA (US); Yang Shi, La Jolla, CA (US); Anh V. Le, La Jolla, CA (US)

(73) Assignee: The Regents of the University of California, Oakland, CA (US)

( * ) Notice: Subject to any disclaimer, the term of this patent is extended or adjusted under 35 U.S.C. 154(b) by 149 days.

(21) Appl. No.: 16/889,168

(22) Filed: Jun. 1, 2020

(65) Prior Publication Data

US 2020/0295326 A1    Sep. 17, 2020

Related U.S. Application Data

(63) Continuation of application No. 14/893,893, filed as application No. PCT/US2014/041051 on Jun. 5, 2014, now abandoned.

(Continued)

(51) Int. Cl.
*H01M 50/578* (2021.01)
*H01M 4/62* (2006.01)
(Continued)

(52) U.S. Cl.
CPC .......... *H01M 50/578* (2021.01); *B60L 50/64* (2019.02); *H01M 4/62* (2013.01);
(Continued)

(58) Field of Classification Search
CPC .... H01M 4/62; H01M 4/628; H01M 10/0525; H01M 10/058; H01M 10/4235;
(Continued)

(56) References Cited

U.S. PATENT DOCUMENTS

| 8,309,240 B1 | 11/2012 | Li |
| 2004/0175618 A1 | 9/2004 | Inoue |

(Continued)

FOREIGN PATENT DOCUMENTS

| EP | 2424009 | 2/2012 |
| JP | 2009-043536 | 2/2009 |

(Continued)

OTHER PUBLICATIONS

English machine translation of JP 2012-104422 (cited on IDS) (Year: 2012).*

(Continued)

*Primary Examiner* — Eugenia Wang
(74) *Attorney, Agent, or Firm* — Fish & Richardson P.C.

(57) ABSTRACT

A method of manufacturing a battery includes introducing a first material to the battery, providing an anode, a cathode and a separator of the battery; and assembling the anode, the separator and the cathode. The first material is configured and arranged to increase the internal impedance of the battery upon mechanical or thermal loading.

17 Claims, 35 Drawing Sheets

Related U.S. Application Data

(60) Provisional application No. 61/831,437, filed on Jun. 5, 2013.

(51) Int. Cl.

| | | |
|---|---|---|
| *H01M 10/0525* | (2010.01) | |
| *H01M 10/058* | (2010.01) | |
| *H01M 10/42* | (2006.01) | |
| *B60L 50/64* | (2019.01) | |
| *H01M 10/04* | (2006.01) | |
| *H01M 50/579* | (2021.01) | |
| *H01M 50/581* | (2021.01) | |
| *B60L 50/50* | (2019.01) | |

(52) U.S. Cl.
CPC ..... *H01M 10/0481* (2013.01); *H01M 10/058* (2013.01); *H01M 10/0525* (2013.01); *H01M 10/4207* (2013.01); *H01M 10/4235* (2013.01); *H01M 50/579* (2021.01); *H01M 50/581* (2021.01); *B60L 50/50* (2019.02); *H01M 2200/10* (2013.01); *H01M 2220/20* (2013.01); *Y02E 60/10* (2013.01); *Y02T 10/70* (2013.01)

(58) Field of Classification Search
CPC ............. H01M 50/578; H01M 50/581; H01M 50/579; H01M 2200/00; H01M 2200/10; H01M 2200/20
See application file for complete search history.

(56) References Cited

U.S. PATENT DOCUMENTS

| | | |
|---|---|---|
| 2004/0248010 A1 | 12/2004 | Kato et al. |
| 2005/0221173 A1 | 10/2005 | Tatebayashi |
| 2010/0028758 A1 | 2/2010 | Eaves et al. |
| 2010/0075213 A1 | 3/2010 | Mehta et al. |
| 2011/0064997 A1 | 3/2011 | Peskar et al. |
| 2011/0070501 A1 | 3/2011 | Chang et al. |
| 2011/0123844 A1* | 5/2011 | Bhardwaj ........... H01M 50/557 429/56 |
| 2011/0151328 A1 | 6/2011 | Chang |
| 2011/0274986 A1 | 11/2011 | Yamamoto |
| 2011/0281154 A1 | 11/2011 | Vissers |
| 2011/0311882 A1 | 12/2011 | Kim et al. |
| 2011/0314755 A1* | 12/2011 | Langille ................. E06B 5/164 52/232 |
| 2012/0000251 A1* | 1/2012 | Hu .......................... A61F 13/08 66/171 |
| 2012/0264012 A1 | 10/2012 | Cho |

FOREIGN PATENT DOCUMENTS

| | | |
|---|---|---|
| JP | 2009-054318 | 3/2009 |
| JP | 2012104422 | 5/2012 |

OTHER PUBLICATIONS

European Office Action in International Application No. EP14806966.9, dated Oct. 5, 2018, 7 pages.
Machine translation of JP2012104422.
Supplementary European Search Report, Application No. EP14806966, dated Oct. 16, 2016, 9 pages.
Transmittal of the International Search Report and the Written Opinion for PCT/US 14/41051, dated Dec. 3, 2014, 16 pages.
International Preliminary Report on Patentability in International Appln. PCT/US2014/041051, dated Dec. 17, 2015, 7 pages.

* cited by examiner

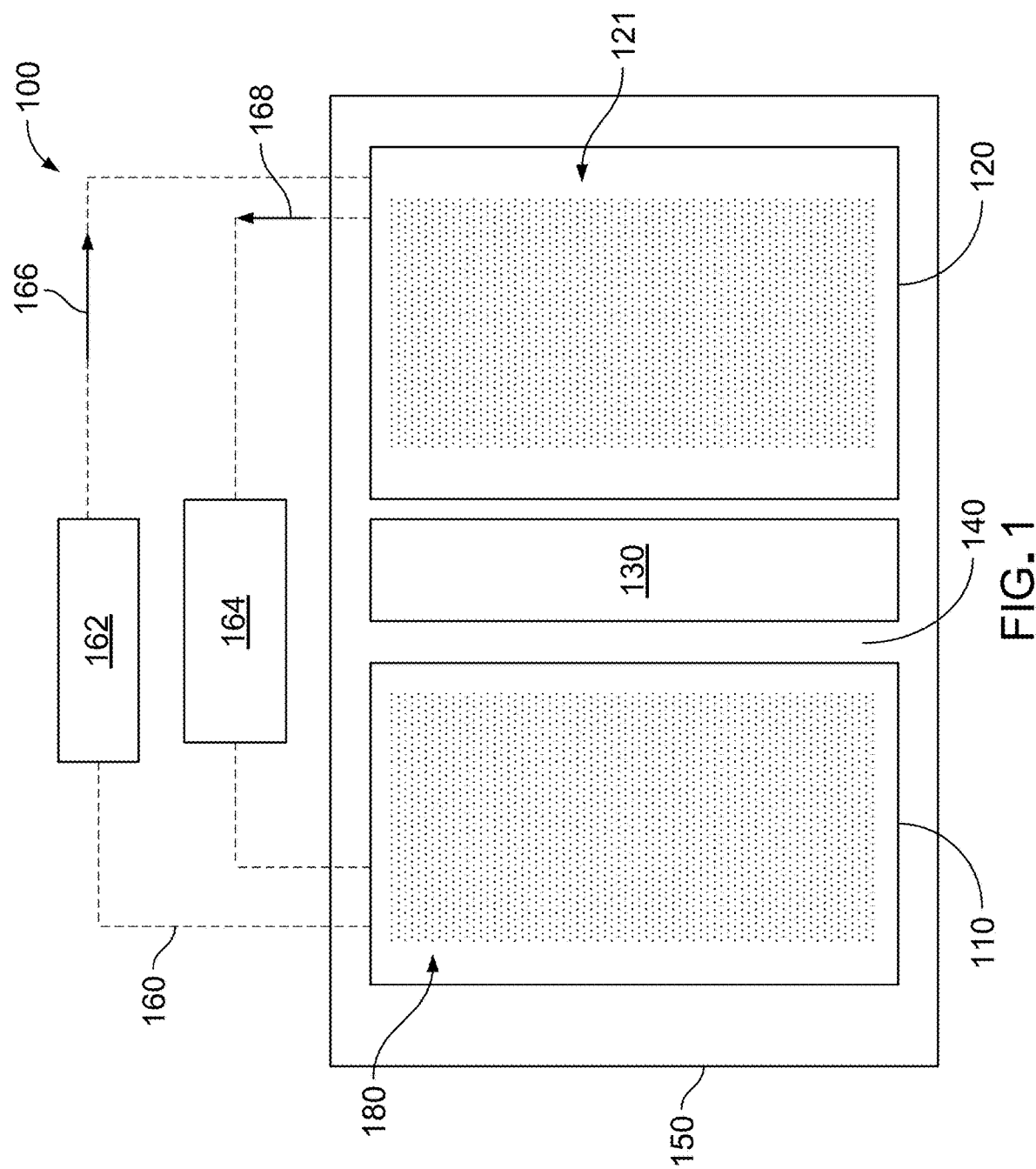

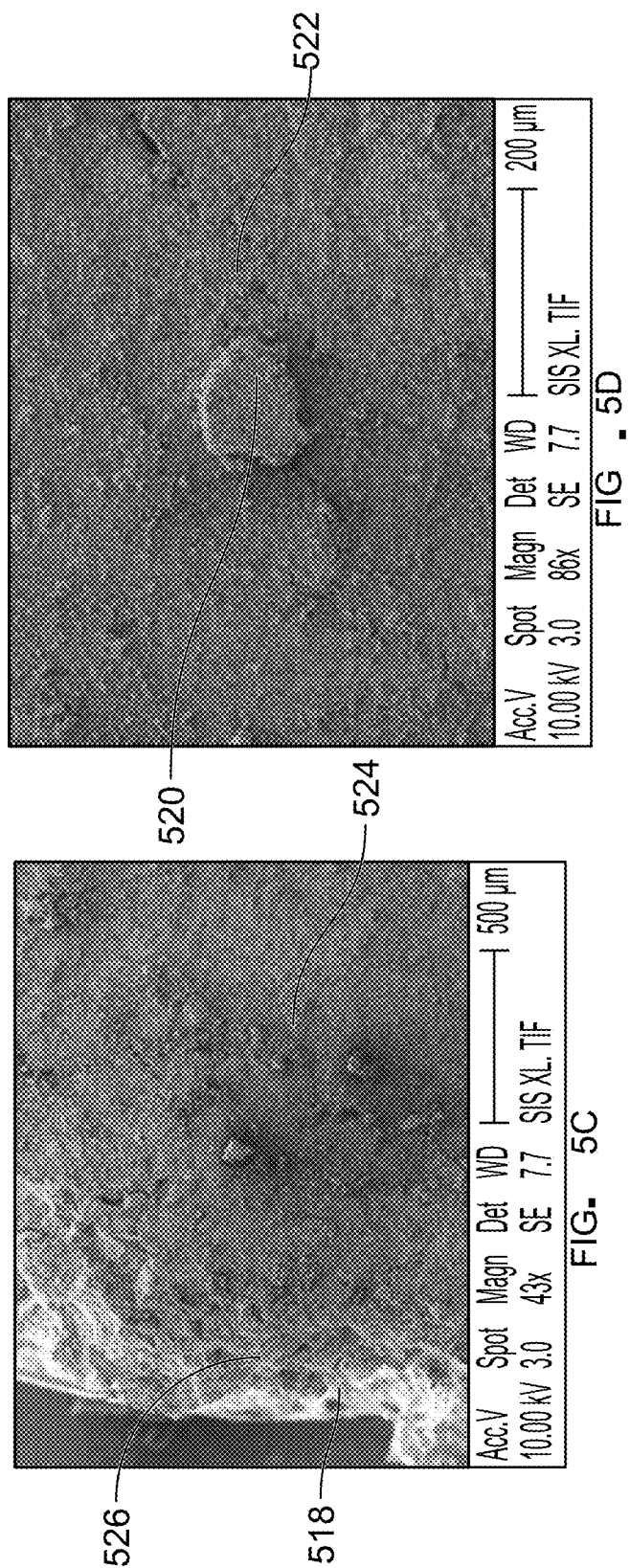

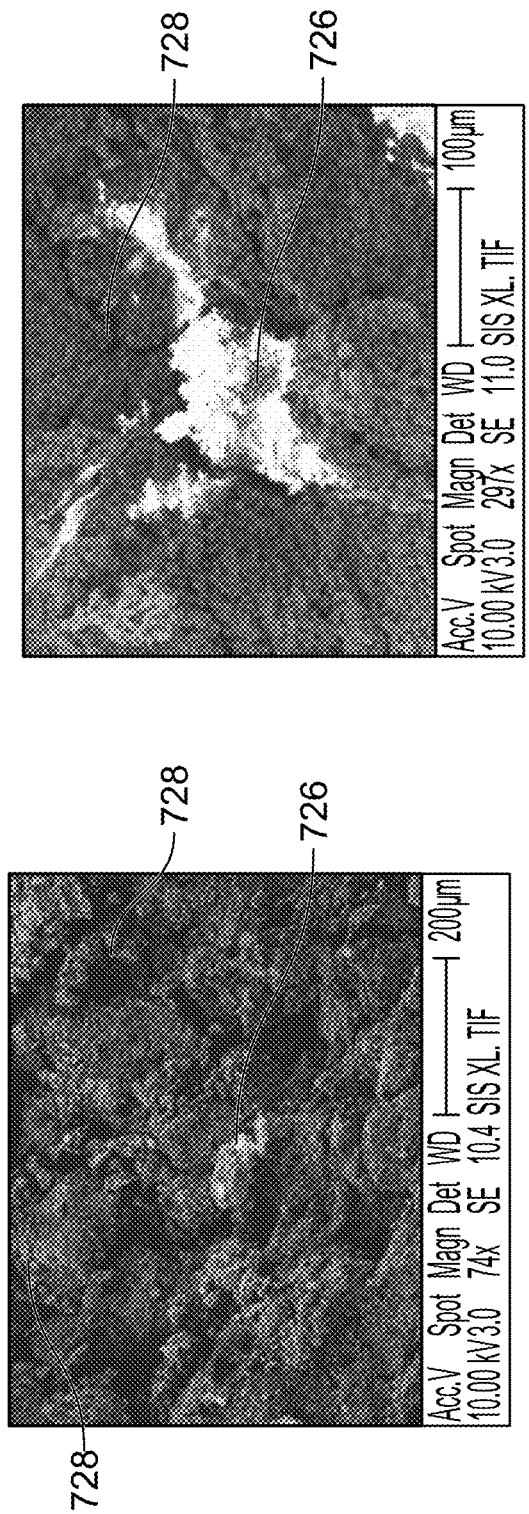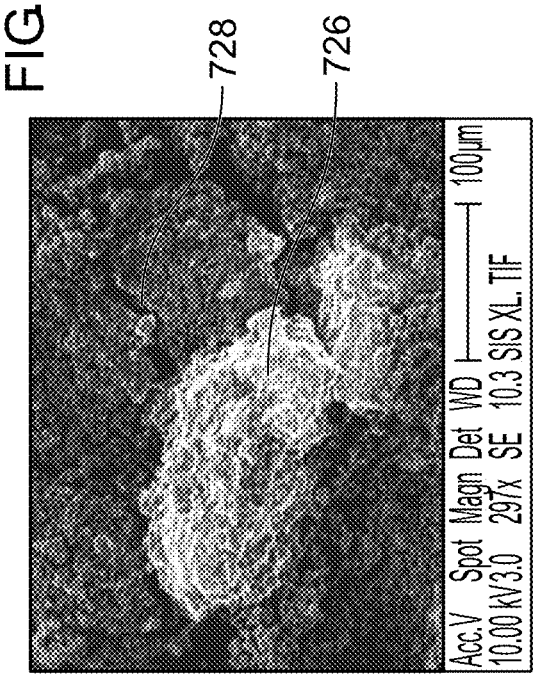
FIG 7I
FIG 7J
FIG 7K

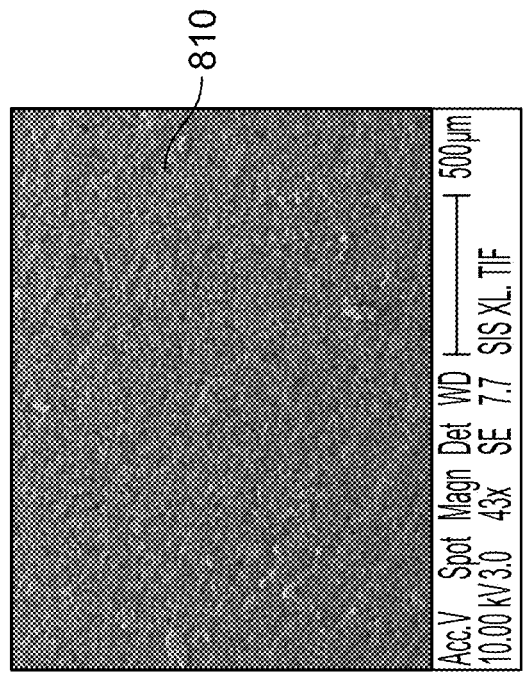
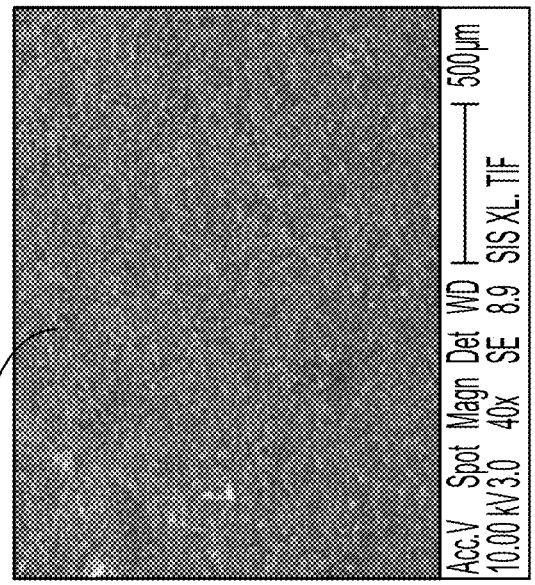
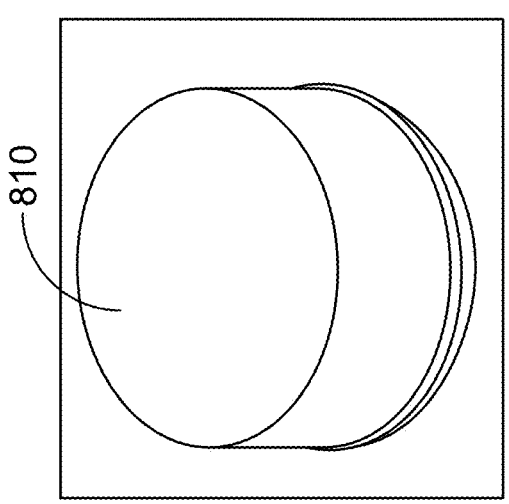
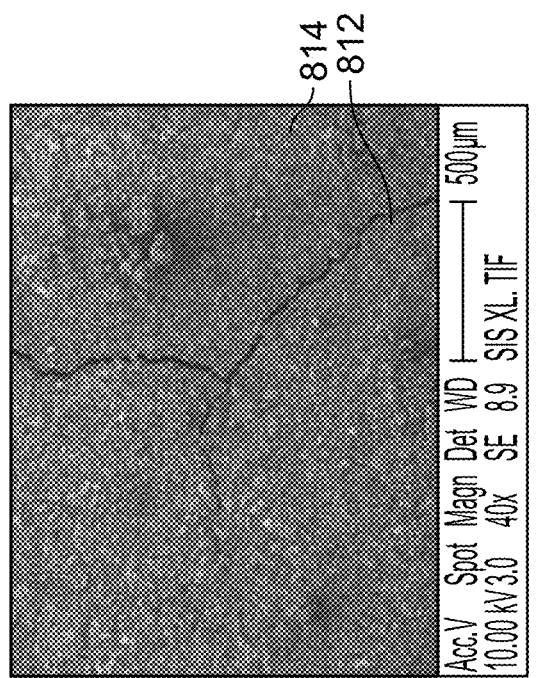
FIG. 8A
FIG. 8B
FIG. 8C
FIG. 8D

MITIGATING THERMAL RUNAWAY IN LITHIUM ION BATTERIES USING DAMAGE-INITIATING MATERIALS OR DEVICES

CROSS-REFERENCE TO RELATED APPLICATIONS

This application is a continuation application of U.S. application Ser. No. 14/893,893, filed on Nov. 24, 2015, which is a U.S. National Stage of International Application No. PCT/US2014/041051 entitled "MITIGATING THERMAL RUNAWAY IN LITHIUM ION BATTERIES USING DAME-INITIATING MATERIALS OR DEVICES" and filed Jun. 5, 2014, which claims priority to U.S. Application Ser. No. 61/831,437 filed on Jun. 5, 2013, which is incorporated herein by reference. This patent application is related to U.S. Application Ser. No. 61/831,455 filed Jun. 5, 2013, and entitled, "Non-Straight, Hollow, and/or Frictional Battery Cells/Structures as Protection and Structural Components", and PCT application filed on the same day as this application, titled "Rate-sensitive and self-releasing battery cells and battery-cell structures as structural and/or energy-absorbing vehicle components", both of which are hereby incorporated by reference.

FEDERALLY SPONSORED RESEARCH OR DEVELOPMENT

The invention was made with government support under DE-AR0000396 awarded by the Department of Energy. The government has certain rights in this invention.

BACKGROUND

Lithium-ion batteries are widely used because of their high energy density. However, their safety, especially when subjected to mechanical or thermal abuse, is a major concern. For instance, as a Li-ion battery is impacted or involved in a collision, internal shorting, e.g., direct contact of cathode and anode due to rupture of membrane separator, can happen, which can lead to thermal runaway.

Chemically protective techniques such as the use of advanced cathode materials, such as $LiMn_2O_4$, $LiFePO_4$, which release less or no oxygen during decomposition, help to improve the safety of Li-ion batteries. Similarly, alternative anode materials, e.g. $Li_4Ti_5O_{12}$, which reduce heat generation at elevated temperature and even absorb oxygen have also been used. Multifunctional components, such as flame retardant and/or self-healing materials can also be added into the battery housing.

In addition, mechanically protective techniques, such as the use of protective battery pack mount and housing, can reduce physical damages caused by external loadings. Low aspect ratio tube cell structure, which enhances air flow in the battery module and pack, can facilitate better thermal management.

Some techniques use phase change materials (PCM) to absorb heat; or use positive temperature coefficient (PTC) elements, which expand to increase impedance once the internal temperature of the battery cell reaches a threshold value; or use phase transition materials that initiate local volume mismatch operate after thermal runaway has begun. Low-melting-point membrane separators or particles can block ion transport paths operate after thermal runaway has begun.

SUMMARY

More efficient methods that include thermal runaway shutdown mechanisms that can be triggered either mechanically or thermally, or simultaneously, as battery damage happens (i.e., before or shortly after thermal runaway starts) are desired. The present systems and techniques can operate before or shortly after thermal runaway has begun. Mechanisms that operate before thermal runaway has begun offer better control of material behavior and obviate the need for a relatively high local temperature to be achieved before mitigation mechanisms are deployed.

The methods and systems disclosed herein have working temperatures that are below the boiling points of flammable liquids in Li ion batteries (e.g. ethyl methyl carbonate), and the effectiveness of the methods disclosed herein has been validated. The methods and systems disclosed herein can work directly under mechanical loading when battery cell is subjected to mechanical abuse (e.g. impact or collision). The materials used in the systems disclosed herein do not have negative effects on the electrochemical performance of battery, and, are therefore relevant to high-power batteries.

When a battery is subjected to dynamic loading, such as an impact, or high-pressure quasi-static loading, its internal structure can be damaged, causing internal shorting. Under this extreme condition, the above mentioned technique may not fully prevent thermal runaway. New techniques to mitigate thermal runaway simultaneously as or even before internal shorting takes place (that is, before the temperature increases) while the batteries are under mechanical abuse, are desired.

As a mechanical load is applied to the battery, damage initiators can trigger widespread damage or destruction of the electrode, so that the internal resistance increases significantly to mitigate thermal runaway even before it can happen. The damage of electrodes can be induced under a wide range of loading modes.

For example, hollow carriers containing fire extinguishing agents (FEA), thermal runaway retarders (TRR), electrolyte absorbers (EA), and/or gas generation agents (GGA), can be broken once the battery is subjected to mechanical loading, so that FEA, TRR, EA, and/or GGA can be released to suppress thermal runaway and reduce the risk of fires.

The hollow carriers of FEA, TRR, EA, or GGA may also act as cracking/voiding promoters. For instance, FEA, TRR, EA, or GGA can be sealed in micro-capsules or hollow fibers. When an external force applied on the battery exceeds a threshold value, a sealing layer in the hollow carriers is broken and FEA, TRR, EA, or GGA would be released to interrupt transmission of oxygen or ions. The size, materials, and the strength of the capsules can be adjusted.

Granular materials, fibers, arrays or meshes, and elastic energy storage materials (e.g. springs) can also be mixed with electrode materials or be placed near the electrode materials. When external loadings are applied to the cell, widespread cracking, rupture, and/or voiding can be initiated. Consequently, internal resistance increases significantly, suppressing electro-chemical reactions. In other words, the granular materials, fibers, arrays or meshes, and pre-stressed elastic energy storage materials serve as damage initiators (DI). They can be porous or hollow and carry FEA, TRR, EA, or GGA in them. The type of materials, the amount, the porosity, the size, the shape, the surface properties, and the locations and distributions of the damage initiators can be adjusted.

The charge collectors, separation membranes, and battery cell cases can be specially designed to act as DI. For instance, as the charge collectors are wavy or have a certain surface patterns, as the battery cell is deformed local shearing, bending, torsion, or compression can be promoted in electrodes, so that widespread damage of electrodes is achieved.

The above damage initiators can also be thermally responsive, enhancing the thermal-runaway mitigation performance. For instance, the porous or hollow carriers of FEA, TRR, EA, or GGA can melt or soften at a threshold temperature, so as to expose the FEA, TRR, EA, or GGA to the battery system and retard electrochemical reactions. FEA, TRR, EA, or GGA, with or without carriers, can be mixed with electrodes or placed near electrodes, and retard electro-chemical reactions as temperature rises to a threshold point. The damage initiators can be confined or triggered by devices or carriers that melt or soften at a threshold temperature. The thermally responsive processes of damage initiators take place after thermal runaway has begun. The working temperature can be readily adjustable to close to or lower than the boiling points of flammable liquids in lithium ion batteries.

The disclosed methods and apparatus work under various types of external or internal loadings, and have broad applicability and are particularly useful for various vehicles (e.g., electric vehicles (EV)), military devices, and large-scale energy storage units that use batteries.

In one aspect, methods described herein includeintroducing a first material to the battery, providing an anode, a cathode, charge collectors, and a separator of the battery; and assembling the anode, the separator and the cathode. The first material is configured and arranged to reduce a mechanical strength of the battery upon mechanical loading.

Implementations can include one or more of the following features. The first material includes a first device. Reducing the mechanical strength includes causing damages or configuration change of the battery upon mechanical loading. The first material is configured and arranged to increase an internal impedance of the battery upon mechanical loading. The first material includes a particle, a fiber, a tube, a layer, or a platelet, the first material formed of one or more of carbon, a glass, ceramic materials, metallic materials, polymer materials, or composites produced from combinations thereof. The first material includes an array or a mesh or a truss, or a layer stack, the first material formed of one or more of carbon, a glass, ceramic materials, metallic materials, polymer materials, or composites produced from combinations thereof.

The first material includes expandable graphite, the expandable graphite configured and arranged to expand and cause cracks or voids in the battery when heated to or beyond a critical temperature. The first material includes a shape or volume changing material, the shape or volume changing material having a first shape or volume below a transition temperature and a second shape or volume at or above the transition temperature.

The first material includes a binder of the cathode, the anode, or both, and introducing the first material to the battery comprises reducing a binder content of the cathode, the anode, or both of the battery or reducing a molecular weight of the binder.

The first material is deposited in aggregates or distribute non-uniformly inside the battery. The first material is distributed non-uniformly inside the battery.

The first material has anisotropic properties and promotes widespread damages in the electrode upon mechanical loading due to stiffness mismatch and local bending. The first material comprises a non-uniformly distributed damage initiators placed inside or near an electrode of the battery. The methods include anisotropically deforming or displacing the damage initiators to cause widespread damage in the electrode. The damage initiators include a charge collector, a membrane separator, or a battery case having a heterogeneous or anisotropic shape or material.

The methods include providing a soft impact promotion component in the battery to promote widespread damages in the electrode.

In one aspect, methods described herein include introducing a first device to the battery, providing an anode, a cathode, a separator and an electrolyte of the battery; and assembling the anode, the separator and the cathode. The first device is configured and arranged to promote damages in electrodes or to change configurations of the electrolyte upon mechanical or thermal loading. The first device includes a first material that is stable and non-reactive under battery operation conditions.

The first device includes a container, the container encloses a second material, the container being configured to release or to expose the second material upon thermal loading. The container includes a hollow or porous particle, or tube and the second material includes fire-extinguishing agents, thermal runaway retarders, electrolyte absorbers, gas generation agents, or combinations of them.

The fire-extinguishing agents, thermal runaway retarders, electrolyte absorbers, and gas generation agents include solid or liquid materials, foaming materials that generate bubbles. The fire-extinguishing agents and thermal runaway retarders include materials that change solvation structures of ions or materials that change viscosity of electrolyte solutions.

In one aspect, methods described herein include increasing an internal impedance of the battery upon mechanical loading or thermal loading to reduce or eliminate thermal runaway in the battery. The methods include reducing heat generation or internal shorting in the battery upon mechanical or thermal loading.

Increasing the internal impedance includes causing cracks and/or voids in the battery. The methods include causing a first material in the battery to change from a first shape or volume to a second shape or volume upon thermal loading to cause in-plane or out-of-plane cracks, or voids in the battery, the shape or volume-changing material having a first shape or volume below a transition temperature and a second shape or volume at or above the transition temperature. Increasing the internal impedance of the battery includes causing a first material to release a second material upon mechanical or thermal loading.

The methods include placing an elastic energy storage material inside or near an electrode of the battery. The elastic energy storage material is confined by a locking component that weakens and releases elastic energy upon mechanical or thermal loading. The methods include directly releasing elastic energy from the elastic energy storage material into the electrode to displace a plurality of damage initiators, and causing widespread damage in the electrode. The plurality of damage initiators in the electrode deforms upon mechanical or thermal loading when aided by another material.

The elastic energy storage material includes a part of a prestressed charge collector, a part of a prestressed membrane separator, or a part of a prestressed battery case.

In one aspect, batteries described herein include electrodes, a membrane, an electrolyte, charge collectors, and a first material configured and arranged to increase an internal impedance of the battery upon mechanical or thermal loading to reduce or eliminate thermal runaway.

Implementations can include one or more of the following features. The first material is embedded in the one or more of the electrodes, the first material configured to create cracks or voids in the one or more electrodes upon mechanical or thermal loading. The first material includes a shape or volume changing material embedded in the one or more electrodes, the shape or volume-changing material changing from a first shape or volume below a transition temperature to a second shape or volume at or above the transition temperature upon thermal loading to cause in-plane or out-of-plane cracks, or voids in the battery.

The first material includes a container, the container encloses a second material, the container being configured to release or expose the second material upon mechanical or thermal loading, the first material being deposited in one or more of the electrodes, the electrolytes, or the membrane. The second material includes fire-extinguishing agents, thermal runaway retarders, electrolyte absorbers, gas generation agents, or a combination of them, the fire-extinguishing agents comprise solid or liquid chemicals, and the thermal runaway retarders and gas generation agents comprise foaming materials that generate bubbles.

The gas generation agents include materials that generate gas phase or gas bubbles, and the gas generation agents are provided in the one or more electrodes, the membrane separators, or the electrolyte. The thermal runaway retarders include materials that change solvation structures of ions in the electrolytes, materials that dilute the electrolytes, materials that change viscosity of the electrolytes. The second material includes elastomers that expand upon release from the first material. The first material includes a binder of the one or more electrodes, the binder configured to crack upon mechanical loading.

The batteries can include materials that absorb an electrolyte, prevent electrolyte from being available for ion transport, or materials that isolate the electrolyte from a region of the battery.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

FIG. 1 shows a schematic of a battery.
FIG. 5C shows an SEM image of an edge of a cylindrical rod containing solid silica powders after mechanical loading.
FIG. 5D shows an SEM image of a center portion of a cylindrical rod containing solid silica powders after mechanical loading.
FIG. 7I shows an SEM image of a center portion of a cylindrical rod containing porous silica and electrode material that has been soaked by a solvent after mechanical loading.
FIG. 7J shows an SEM image of a center portion of an impacted porous silica modified cylindrical rod.
FIG. 7K shows an SEM image of an edge portion of a cylindrical rod which contains cracks around silica filler.
FIG. 8A shows a reference cylindrical rod containing anode material.
FIG. 8B shows the cylindrical rod of FIG. 8A before impact.
FIG. 8C shows an edge of the cylindrical rod of FIG. 8A after impact.
FIG. 8D shows a center portion of the cylindrical rod of FIG. 8A after impact.

DETAILED DESCRIPTION

Figure 2A:
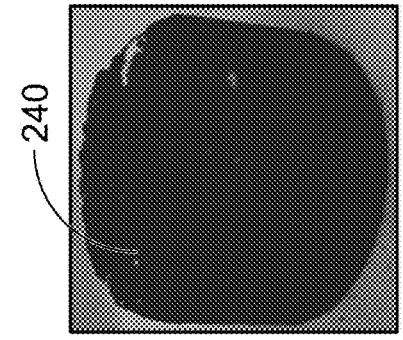
FIG. 2A shows a reference cylindrical rod before mechanical loading.

FIG. 1 shows a schematic of a battery 100. Battery 100 includes an anode 110, a cathode 120, a separator 130, electrolytes 140, a first charge collector 111 for the anode 110, and a second charge collector 121 for the cathode 120, all of which are enclosed in a housing 150. Electrical connections 160 connect the anode 110 and the cathode 120 to either an external load 162 or to a charging source 164. Electrons flow along the direction 166 from the anode 110 to the cathode 120 when the battery 100 discharges to power the external load 162. When the battery 100 powers an electric vehicle (EV), the load 160 would be the EV. During charging, electrons flow from the cathode 120 to the anode 110 along direction 168. The electrolytes 140 allow for ionic conductivity. The separator 130 separates the anode 110 and the cathode 120 to prevent a short circuit. Examples of the cathode include lithium cobalt oxide (LCO), lithium (nickel cobalt manganese) oxide (NCM), lithium (nickel cobalt aluminum) oxide (NCA), lithium manganese oxide (LMO), lithium iron phosphate (LFP). Examples of anode includes graphite, graphene, carbon nanotubes (CNT), Li-alloy, Si, $TiO_2$ and Sn. Examples of electrolytes include $LiPF_6$, $LiBF_4$ or $LiCl_4$ in organic solvent such as ethylene carbonate (EC), ethyl methyl carbonate (EMC), dimethyl carbonate (DMC) and diethyl carbonate (DEC). Examples of separator include polyethylene (PE), polypropylene (PP), trilayer PP/PE/PP, and any combination of them.

In general, the anode 110 and the cathode 120 can include binders such as polyvinylidene fluoride (PVDF) and poly (methyl methacrylate) (PMMA), and conductors such as active carbon.

Electrochemical reactions that operate in the battery 100 are exothermic. Thermal runaway occurs when the reaction rate increases due to an increase in temperature, causing a further increase in temperature and hence a further increase in the reaction rate. Thermal runaway can be a process by which an exothermic reaction goes out of control (e.g., when accelerated by a temperature rise), often resulting in an explosion or fire.

Lithium (Li) ion batteries, while providing higher capacity, are more reactive and have lower thermal stability, compared with other batteries such as lead-acid batteries. This makes Li ion batteries susceptible to thermal runaway in cases of abuse such as high temperature operation (e.g. >130° C.) or overcharging. At elevated temperatures, electrode decomposition generates oxygen, which then reacts with the organic electrolyte of the cell. This is a safety concern due to the magnitude of this highly exothermic reaction, which can spread to adjacent cells or ignite nearby combustible material.

In order to mitigate (e.g., reduce or eliminate) thermal runaway, damage initiators 180 can be introduced to electrodes (e.g., the cathode 110, the anode 120, or both), or be placed near electrodes so that as the battery 100 is subjected to external mechanical loading or overheating the damage initiators modify the electrode and/or the electrolyte to cause an increase in internal impedance. Examples of mechanical loading include impact, collision, crushing, penetration, tension, compression, torsion, bending, and indentation. Examples of overheating include temperature increases caused by electro-chemical reactions or caused by the environment. As the internal impedance increases, exothermic electrochemical reactions are reduced, leading to reduced heat generation rate.

An example of such damage imitators is passive damage initiators. Passive damage initiators initiate cracking or voiding in electrodes upon external loading, and such cracks and/or voids increase the internal impedance of the electrode. Such additives are also known as cracks or voids initiators (CVIs). The electrode damages can be caused by debonding of CVI-electrode interfaces, fracture and rupture of CVI, stress concentration caused by CVI, and/or local shear, bending, torsion, compression and tension caused by stiffness mismatch of CVI and electrode. Examples of passive additives include solid or porous particles, solid or hollow/porous fibers and tubes, solid or hollow/porous platelets, arrays, clusters, trusses, and layers or layer stacks formed by these materials. Passive additives can be formed from carbon materials such as graphite, carbon nanotubes, activated carbons, and carbon blacks. Passive damage initiators can also be formed from ceramic materials such as silica, alumina, $Al_2TiO_5$, ALN, $B_4C$, $BaTiO_3$, BeO, $Bi_{12}SiO_2O$, Bi—Sr—Ca—Cu—O, BN, cBN, $CdS/Cu_2S$, CdTe, $CeO_2$, CIGS, CoOx, cordierite, $CrO_2$, $Fe_2O_3$, GaAs, GaN, hBN, hydroxy apatite, La—Ba—Cu—O, $LaCrO_3$, Li silicate, Li—Al silicate, $LiNbO_2$, $LiNbO_3$, $LiTaO_3$, MgO, mica, MoS, $MoSi_2$, NiOx, $PbTiO_3$, PLZT, PZT, $Si_3N_4$, SiC, $SnO_2$, $SrTiO_3$, TiB, TiC, UC, $UO_2$, $V_2O_5$, $Y_2O_2S$, $Y_2O_3$, Y—Ba—Cr—O, zeolite, ZnO, ZnS and $ZrO_2$. Passive damage initiators of metallic materials such as iron, steel, ferrous metals, aluminum, copper, zinc, titanium, other nonferrous metals, alloys of these materials, copper based shape memory alloys, NiTi and their derivatives are also possible. Polymer materials such as epoxy, polyester resins, elastomers, thermoplastics such as butyl rubber, polyethylene, polyurethane are also suitable. Other suitable polymers can include thermoplastics, thermosets and elastomers, such as derivatives of natural products which include naturally occurring resins, derivative of cellulose, derivatives of vegetal proteins; polyaddition resins which include polyolefins such as polyethylene, polypropylene and polybutylene, polyvinyls such as polyvinyl ethers, polyvinyl chloride and polyvinyl fluoride, polyvinylidenes such as polyvinylidene chloride and polyvinylidene fluoride, polyvinyl derivatives such as polyvinyl alcohol and polyacetals, styrenics such as polystyrene, acrylonitrile-butadiene-styrene and styrene-butadiene, fluorocarbons such as polytetrafluoroethylene and fluorinated ethylene propylene, acrylics such as polymethylmethacrylate, coumarone-indenes; polycondensation resins which include phenolics such as phenol-formaldehyde and pesorcinol formaldehyde, aminoplastics such as urea-formaldehyde, melamine-formaldehyde and melamine-phenolics, furan resins such as phenol-furfural, polyesters such as alkyd resins and polycarbonates, polyethers such as polyformaldehydes and polyglycols, polyurethanes, polyamides, polyimides, polyaramides, sulfones such as polysulfones, polyethersulfone and polyphenylsulfone, epoxy resins, polysiloxanes such as silicones. In general, composites made of any combination of above materials can be used to form passive additives. The sizes of these passive additives can span from less than 1 nanometer to the electrode thickness.

In addition to the passive additives, the mechanical strength of electrodes can also be reduced by reducing the percentage content of binder in the electrode or by using binders having a lower molecular weight. When the mechanical strength of electrodes is reduced, the binder itself effectively becomes a CVI.

In addition, as the shapes of membrane separator, battery case, or charge collector are non-uniform, they can promote local shear, bending, tension, compression, or torsion of electrodes when the battery is deformed, and thus cause damages (e.g., widespread damages) in electrodes. As the widespread damage is promoted, the non-uniform shaped membrane separators, battery cases, and charge collectors themselves become CVIs.

Another type of additives are active damage initiators which damage electrodes, electrolyte, or membrane separator as the battery is subjected to external thermal or mechanical loadings. As mechanical loading or temperature reaches a threshold value, the active damage initiators actively deform, change volume, move, decompose, melt, soften, or break; they may release chemicals such as FEA, TRR, EA, or GGA, or absorb electrolyte. These thermally or mechanically triggered active additives form cracks and/or voids in electrodes, interact or react with an electrolyte or an electrode, interact or react with a membrane separator, interact or react with a charge collector and a battery cell case, change electrode conductivity, generate gas or change conductivity of electrolyte, absorb electrolyte, change configuration of membrane separator, change an internal environment in a battery cell, and/or change the configuration of electrodes, which would increase the internal impedance of the battery and, thus, reduce heat generation associated with possible internal shorting.

An active damage initiator can produce a significant volume or shape change upon a mechanical or thermal loading. Active damage initiators can include solid or porous particles, solid or hollow beads, solid or hollow/porous fibers and tubes, solid or hollow/porous layers and platelets, arrays, clusters, trusses, and layers or layer stacks formed by shape or volume changing materials. Active damage initiators can be formed from shape-memory alloys such as Ni—Ti, Ni—Ti—Pd, Ni—Ti—Pt, Ni—Ti—Hf, N—Ti—Zr, Ni—Ti—Cu, Ni—Ti—Nb, Cu—Al—Ni, Cu—Al—Nb/Ag, Co—Al, Co—Ni—Al/Ga, Fe—Mn—Si, Ni—Al, Ni—Mn, Ni—Mn—Ga, Zr—Cu, Ti—Nb, U—Nb, Ti—Au, Ti—Pd, Ti—Pt—Ir, Ta—Ru or Nb—Ru alloys. The active damage initiators can also be formed from shape-memory polymers and elastomers such as polyurethanes, epoxy, copolyesterurethane, polynorbornene, poly(trans-isoprene), polystyrene, polybutadiene, polyester, poly(methyl methacrylate), ethylene vinyl acetate-nitrile rubber, ethylene vinyl acetate-chlorosulfonated polyethylene, poly-caprolactone, polyethylene terephthalate-polyethylene glycol, polyethylene terephthalate, poly ethylene oxide, polyvinyl chloride, poly (ketone-co-alcohol), polytetramethylene glycol, and copolymers containing these components. Shape-memory ceramics and glasses, such as ceria-zirconia, yttria-zirconia, magnesia-zirconia, dicalcium silicate, lanthanum niobium oxide, yttria niobium oxide, lanthanide sesquioxide, and enstatites can also form active damage initiators. The active damage initiators can also include ionic solids such as KCl, KI, NaCl, $NaCl_3$, and $NaBrO_3$. Thermally or mechanically responsive carbon materials, such as expandable graphite can be used. The active damage initiators can also include elastic energy storage materials, such as springs. The spring configurations include coils, rings, clips, and folded or curved wires and sheets. The active damage initiators can be moved, deformed, or broken by elastic energy storage materials inside or near electrodes. The active damage initiators can contain low-melting-point polymers, metals/alloys, and ceramics, such as bismuth alloys. The damage initiators can be formed by using a mechanically or thermally expandable, deformable, or breakable carrier to contain functional fillers, such as phase change materials, large-thermal-expansion-coefficient materials, or swelling materials that can be involved in physical or chemical processes of large volume/ shape changes; such processes include melting, boiling, or chemical reactions leading to large volume changes. The carrier is optional if the fillers are stable and non-reactive under battery operation conditions. The damage initiators can be modified, coated, or decorated by carbon, metallic, or glass materials, such as particles and fibers or carbon blacks, carbon nanotubes, metallic fibers, activated carbons. The active damage initiators can be placed inside or near electrodes. If membrane separate, charge collector, or battery case is made of these materials, the membrane separator, charge collector, or battery case essentially becomes an active damage initiator. The damage initiators can be placed in or near the membrane separator to block ion transport.

Mechanical loading of rods fabricated using only cathode materials and rods having embedded passive additives are investigated. FIG. 2A shows a rod 210 fabricated using only cathode material, without any passive additives. The cathode material was collected from a cathode sheet 212 (shown in FIG. 2E) used in cylindrical 18650 cells and ground into fine particles 214 (shown in FIG. 2F). The cathode sheet 212 was obtained from American Lithium Energy Co. of Vista, Calif.

Figure 3:
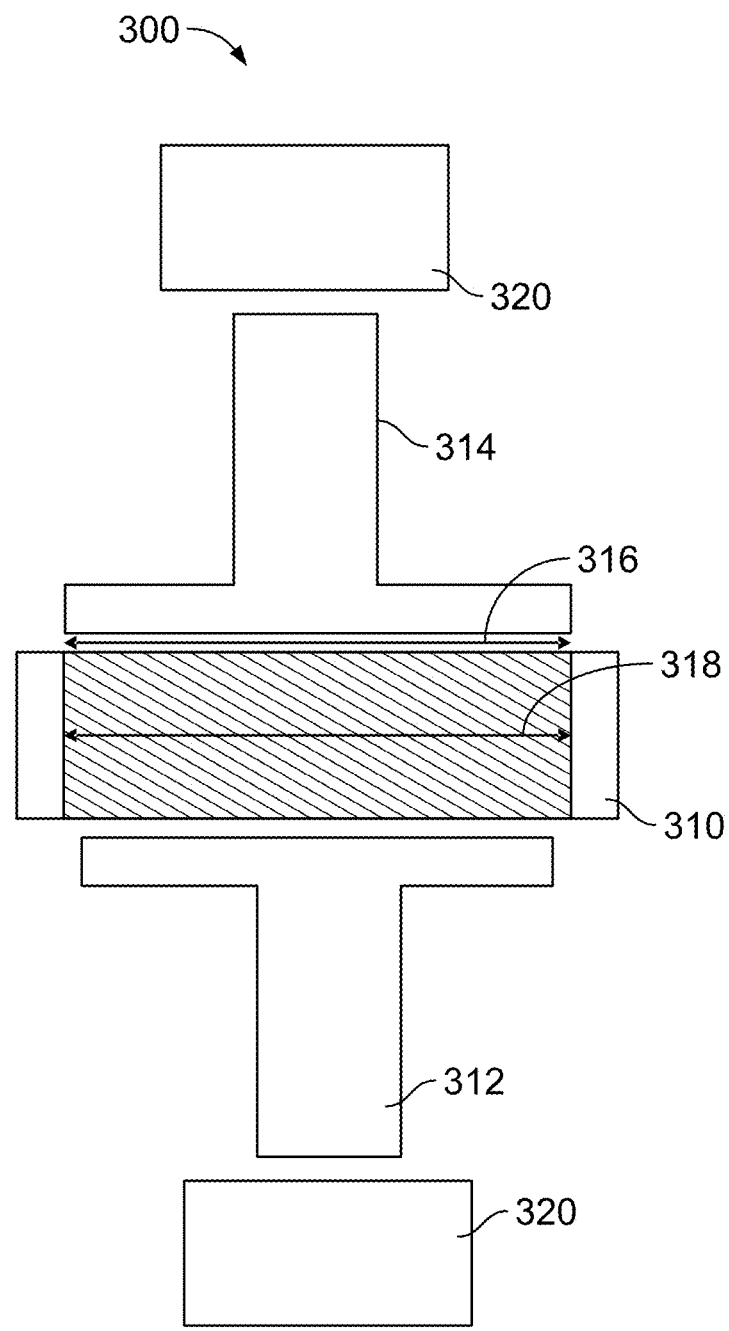
FIG. 3 shows a schematic of a system used to fabricate a cylindrical electrode.

FIG. 3 shows a system 300 used for fabricating cylindrical rods. The fine particles 214 were compressed into the cylindrical rod 210 by, for example, first placing the particles in a stainless steel cell 310 using two pistons 312 and 314. In the examples shown below, an inner diameter 318 of the stainless steel cell and the outer diameter 316 of the piston 314 were 0.5" (12.7 mm). The pistons 312 and 314 were used to compress the cell 310 by a machine 320 (e.g., an Instron 5582 machine) with the piston velocity of 5 mm/min. Once the force impacted on the fine particles 214 reaches 4 kN, the piston force was removed.

Figure 2B:
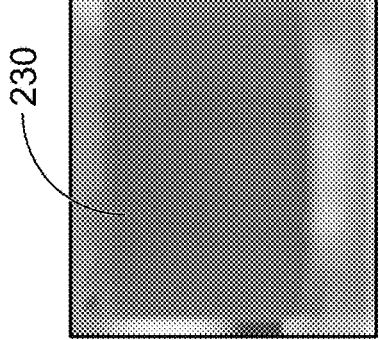
FIG. 2B shows a cylindrical rod having embedded activated carbon before mechanical loading.

A similar process is used to form a cylindrical rod 220 shown in FIG. 2B. Cathode material is mixed with activated carbon (AC) particles to form the cylindrical rod 220. The AC particles can act as damage initiators, or CVI. The AC particles can be introduced in lower mass ratio than the cathode material, for example, a ratio of cathode material to AC of 30:1, 20:1, 10:1, or 5:1 may be used. The mass ratio of cathode material to AC was 10:1 in cylindrical rod 220. AC having small particle size can be used, for example, sizes of 500 microns or less, 200 microns or less, 100 microns or less, or 50 microns or less. The AC particles in cylindrical rod 220 were around 150 microns. The AC powders were obtained from J. T. Baker (Product No: E343), a division of Avantor Performance Materials of Center Valley, Pa. The mixture containing the cathode material and the AC powders was placed in the stainless steel cell 310 and compressed using the apparatus 300 as outlined above in reference to the cylindrical rod 210. A few samples are shown in FIG. 2B.

Figure 2C:
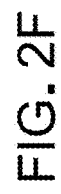
FIG. 2C shows a cylindrical rod having embedded solid silica particles before mechanical loading.

Cathode material is mixed with solid silica particles to form a cylindrical rod 230 shown in FIG. 2C using a similar method as described above in reference to cylindrical rod 220. The solid silica powders can act as damage initiators, or CVI. The solid silica powders can be introduced in lower mass ratio than the cathode material, for example, a ratio of cathode material to solid silica powders of 30:1, 20:1, 10:1, or 5:1 may be used. The mass ratio of cathode material to solid silica powders was 10:1 in cylindrical rod 230. Solid silica powders having small particle size can be used, for example, sizes of 500 microns or less, 200 microns or less, 100 microns or less, 50 microns or less, or 20 microns or less. The solid silica powders in cylindrical rod 230 were around 44 microns. The solid silica powders were obtained from Sigma-Aldrich Co. of St. Louis, Mo. (Product No.: 342890). No cracks could be observed after cylindrical rod 230 was formed using the apparatus of 300. The total mass of the rod was 1.91 g, and the rod has a height of 7.20 mm.

Figure 2D:
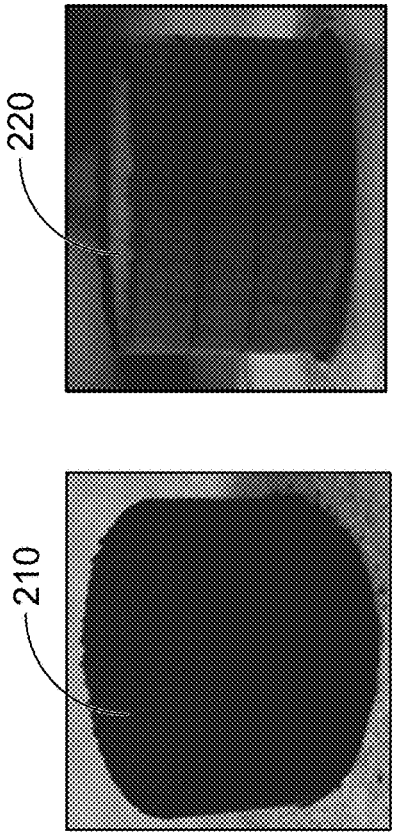
FIG. 2D shows a cylindrical rod having embedded porous silica particles before mechanical loading.
Figure 2E:
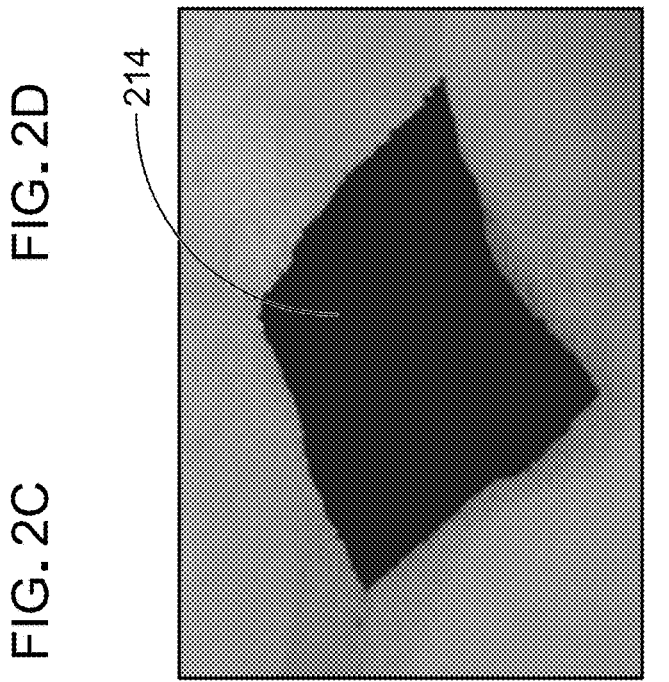
FIG. 2E shows cathode sheets.
Figure 2F:
FIG. 2F shows ground cathode particles.

Cathode material is mixed with porous silica particles to form a cylindrical rod 240 shown in FIG. 2D using a similar method as described above in reference to cylindrical rod 220. The porous silica particles can act as damage initiators, or CVI. The porous silica particles can be introduced in lower mass ratio than the cathode material, for example, a ratio of cathode material to porous silica particles of 30:1, 20:1, 10:1, or 5:1 may be used. The mass ratio of cathode material to porous silica particles was 10:1 in cylindrical rod 240. Porous silica particles having small particle size can be used, for example, sizes of 500 microns or less, 200 microns or less, 100 microns or less, 50 microns or less, 20 microns or less, 10 microns or less, 5 microns or less, or 1 micron or less. The average particle size of the porous silica particles in cylindrical rod 240 were around 2 microns. The porous silica particles were obtained from Performance Process Inc., of Mundelein, Ill. No cracks could be observed after cylindrical rod 240 was formed using the apparatus of 300. The total mass of the rod was 1.69 g, and the rod has a height of 7.38 mm.

Table 1 summarizes the parameters used to fabricate the cylindrical rods shown in FIGS. 2A-2D.

| FIG. | 2A | 2B | 2C | 2D |
|---|---|---|---|---|
| CVI | None | Activated carbon (AC), | Solid silica particles | Porous silica |
| Size of CVI |  | 150 micron | 44 micron | 2 micron |
| Ratio of cathode material:CVI | — | 10:1 | 10:1 | 10:1 |

The cylindrical rod 210 without any AC particles was quite strong. In contrast, the cylindrical rod 220 containing the AC particles cracked easily as a small mechanical loading below 0.5 MPa was applied, as shown in FIGS. 5C-5F, indicating that AC particles weakened the electrode sample.

Figure 4A:
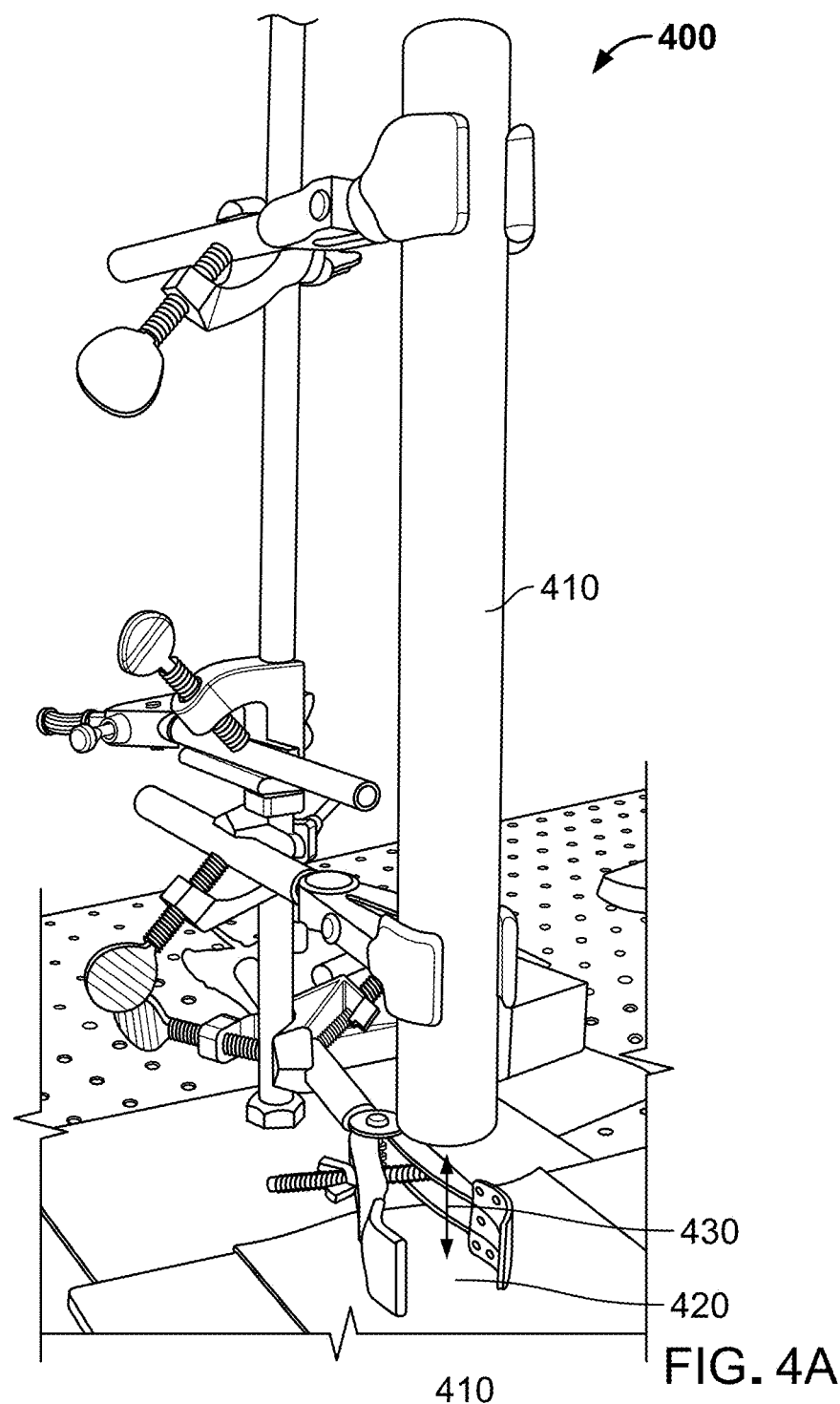
FIG. 4A shows a small-scale drop tower apparatus.
Figure 4B:
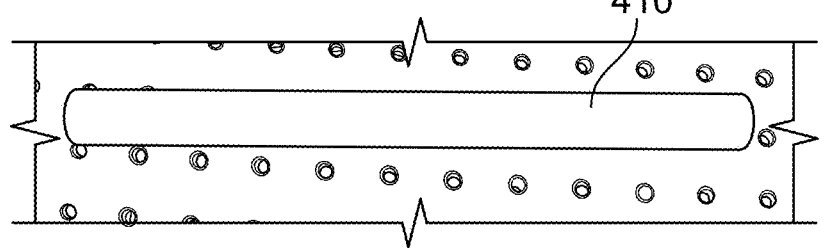
FIG. 4B shows a hammer.

A small-scale drop tower apparatus 400 as shown in FIG. 4A was used to impact each of the rods 220-240. The apparatus 400 includes a titanium (Ti) hammer 410 (shown in FIG. 4B), which was dropped on the top of the sample (i.e., each of rods 220-240) placed at a location 420 under the hammer 410. A drop distance 430 measured from a lower end of the hammer 410 to a top surface of each of the rods 220-240 was 100 mm. The mass of the titanium hammer 410 was 473 g. The Ti hammer has a diameter of 22.45 mm and a height of 265.4 mm.

After each drop-tower test for a corresponding one of the cylindrical rods 220-240, the rods 220-240 were observed under a SEM.

Figure 5A:
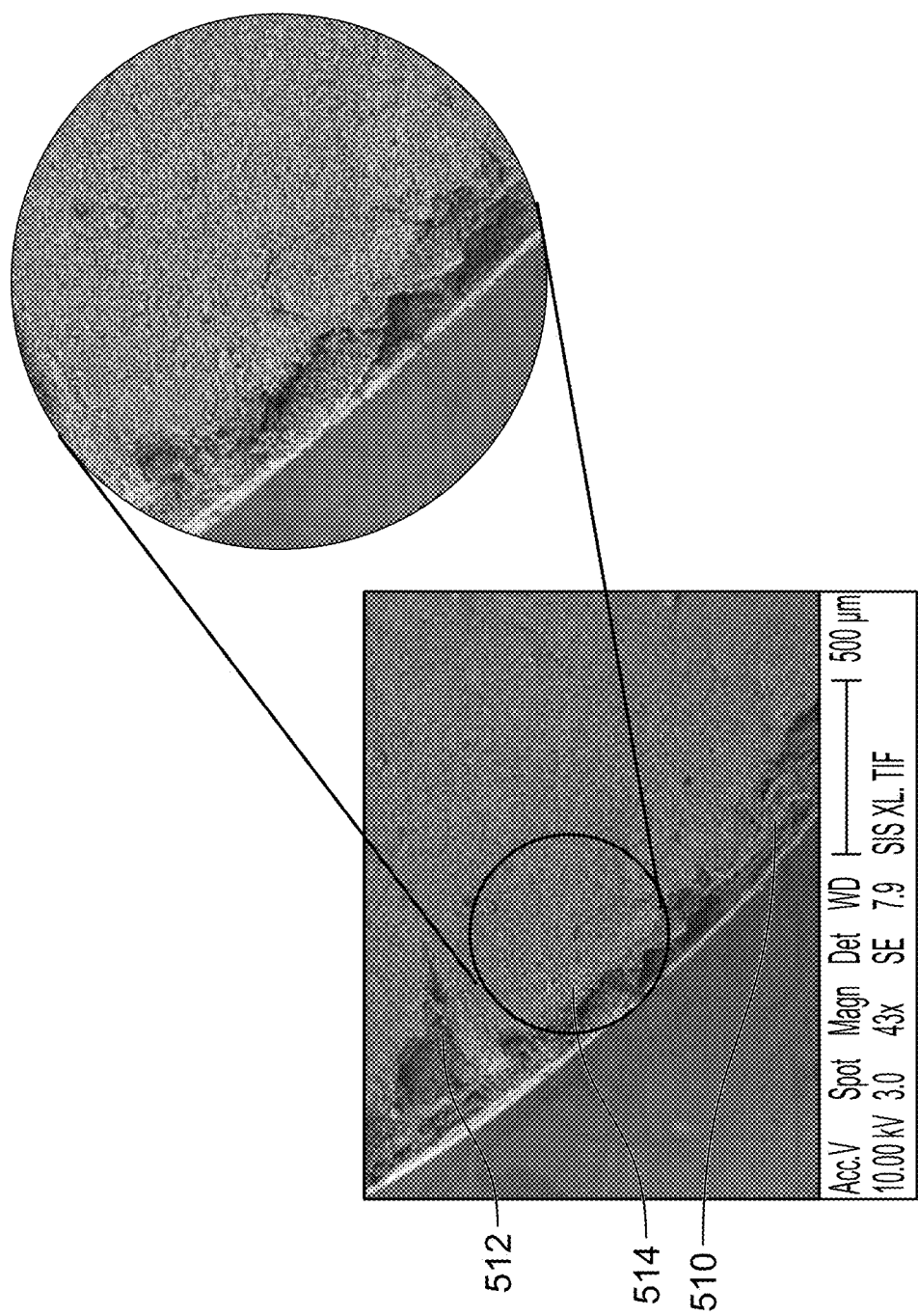
FIG. 5A shows an SEM (scanning electron microscope) image of an edge of a reference cylindrical rod after mechanical loading.
Figure 5B:
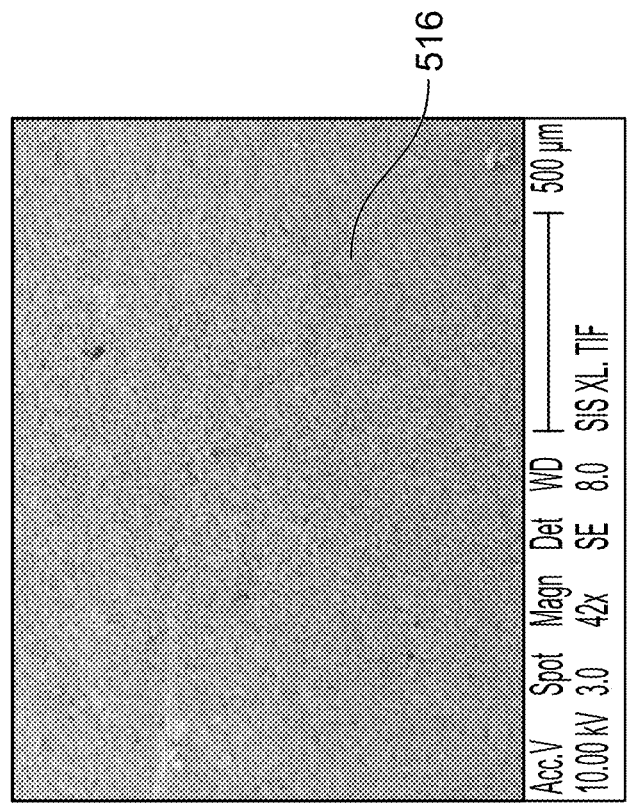
FIG. 5B shows an SEM image of a center portion of a reference cylindrical rod after mechanical loading.

FIG. 5A shows an edge 510 of the cylindrical rod 210, which does not contain any CVI, after the drop-tower test. While there were a few cracks 512 and 514 near the edge 510 of the cylindrical rod 210, a central part 516, shown in FIG. 5B was free of cracks.

FIG. 5C shows an edge 518 of the cylindrical rod 230, which contains solid silica powders after the drop-tower test. A number of cracks 520, 522 were observed at the center of the cylindrical rod 230 (shown in FIG. 5D), and more cracks 524, 526 were observed near the edge 518.

Figure 5F:
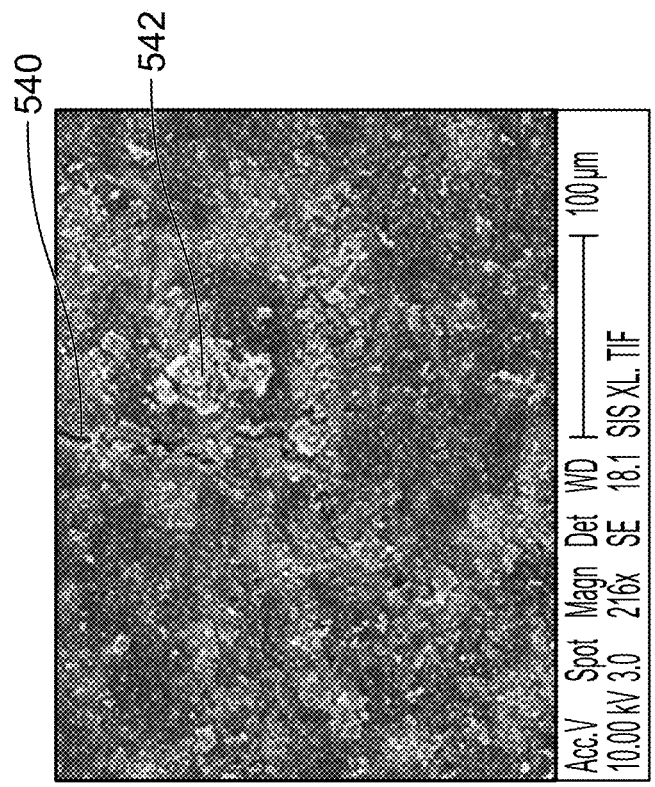
FIG. 5F shows an SEM image of a close up of a cylindrical rod containing porous silica after mechanical loading.
Figure 5E:
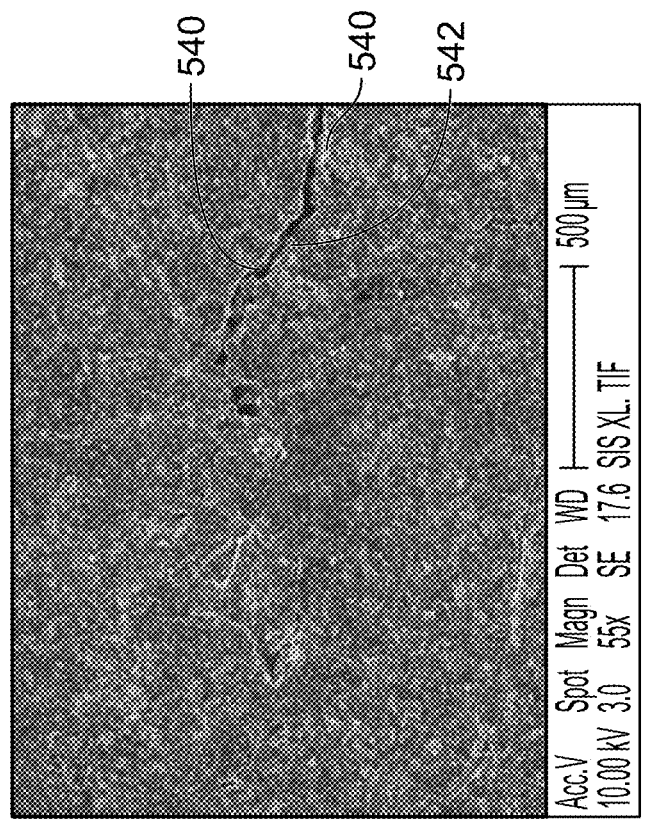
FIG. 5E shows an SEM image of a cylindrical rod containing porous silica after mechanical loading.

FIG. 5E shows a number of cracks 540 having crack sizes and crack density that were larger than those of cylindrical rod 230 containing solid silica powders. The cracks 540 were developed around the porous silica particles 542 as shown in FIG. 5F.

Cylindrical rods containing cathode materials that have been soaked in a solvent are also investigated. Ground anode particles were mixed with AC particles, and the AC particles can be introduced in lower mass ratio than the cathode material, for example, a ratio of cathode material to AC particles powders may be 30:1, 20:1, 10:1, or 5:1. The mass ratio of cathode material to AC particles was 19:1 in a cylindrical rod 620. The AC powders were obtained from J. T. Baker (Product No: E343) a division of Avantor Performance Materials of Center Valley, Pa., with a particle size was around 150 microns. Various solvents can be used, 2 mL of propylene carbonate anhydrous (Sigma-Aldrich Co. of St. Louis, Mo., 310328), were added in the mixture. The presence of the solvent in the cylindrical rod 620 is used to better approximate the working conditions of an electrode.

The mixture containing the solvent was sealed using the apparatus 300 similar to the method described in reference to rod 220. No cracks could be observed in cylindrical rod 620. A reference cylindrical rod 610 (shown in FIG. 6A) was prepared using a similar process with only the cathode material and the solvent (i.e., without the addition of AC particles). The mass of the reference cylindrical rod 610 was 1.11 g and has a diameter of 12.86 mm and a height of 3.16 mm. The mass of the porous silica modified cylindrical rod 620 was 1.30 g and has a diameter of 12.90 mm and a height of 4.06 mm.

Figure 6B:
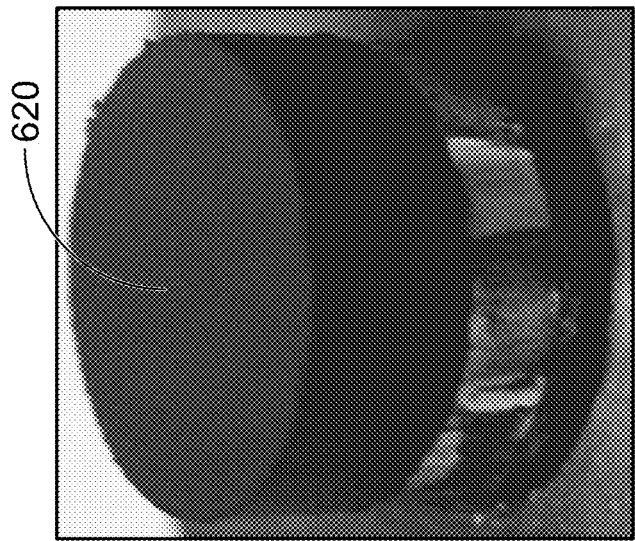
FIG. 6B shows a cylindrical rod containing activated carbon and electrode material that has been soaked by a solvent.
Figure 6C:
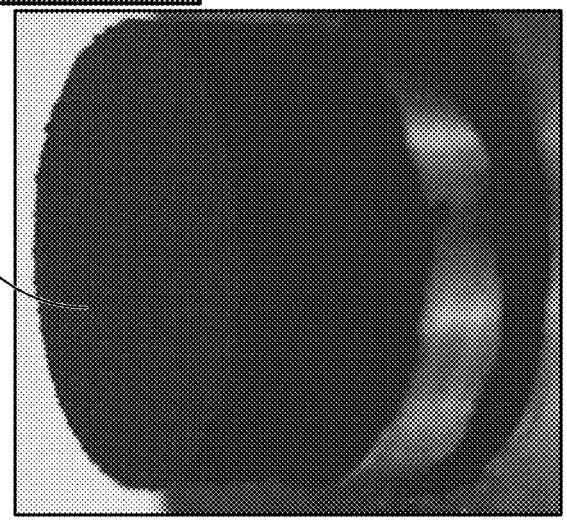
FIG. 6C shows a cylindrical rod containing porous silica particles and electrode material that has been soaked by a solvent.
Figure 6A:
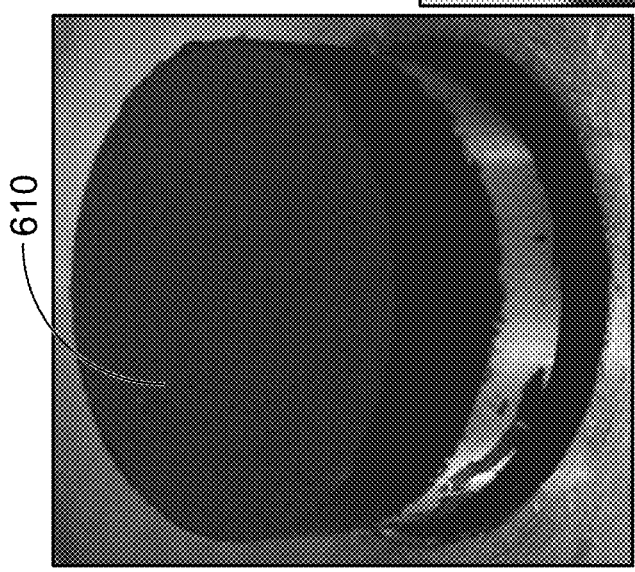
FIG. 6A shows a cylindrical rod containing electrode material that has been soaked by a solvent.

The ground cathode particles were mixed with porous silica particles to form cylindrical rod 630 shown in FIG. 6C. The porous silica particles can be introduced in lower mass ratio than the cathode material, for example, a ratio of cathode material to porous silica particles may be 30:1, 20:1, 10:1, or 5:1. The mass ratio of cathode material to porous silica was 9:1 in cylindrical rod 630. The porous silica powders, which served as CVI, were received from Performance Process Inc., of Mundelein, Ill. The average particle size was around 2 microns. Two mL electrolyte solvent, propylene carbonate anhydrous (Sigma-Aldrich Co. of St. Louis, Mo., 310328), were added in the mixture to resemble the wet state of electrodes in a working battery. No cracks could be observed in cylindrical rod 630, as shown in FIG. 6C when the rod 630 was removed from the apparatus 300. The total mass of the cylindrical rod 630 was 1.36 g and has a diameter of 12.85 mm and a height of 4.74 mm.

Table 2 summarizes the parameters of cylindrical rods containing cathode materials that have been soaked in a solvent.

| FIG. | 6A | 6B | 6C |
|---|---|---|---|
| Damage Initiator | None | AC | Porous silica |
| Size of damage initiator | — | 150 microns | 2 microns |
| Ratio of cathode material:Damage initiator | — | 19:1 | 9:1 |
| Solvent | Propylene carbonate anhydrous | Propylene carbonate anhydrous | Propylene carbonate anhydrous |
| Amount of Solvent | 2 ml | 2 ml | 2 ml |
| Mass of Rod | 1.11 g | | 1.36 |
| Dimension of Rod | 12.86 mm × 3.16 | | 12.85 × 4.74 |

Figure 7B:
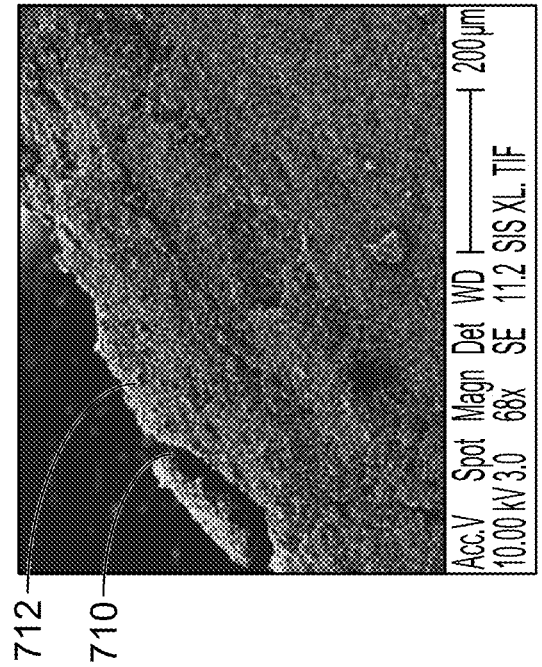
FIG. 7B shows an SEM image of an edge of a cylindrical rod containing electrode material that has been soaked by a solvent after mechanical loading.
Figure 7D:
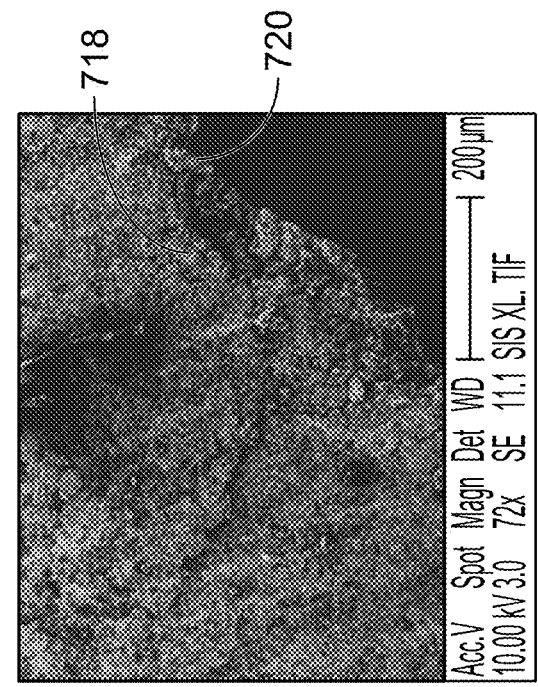
FIG. 7D shows an SEM image of an edge of a cylindrical rod containing activated carbon and electrode material that has been soaked by a solvent after mechanical loading.
Figure 7A:
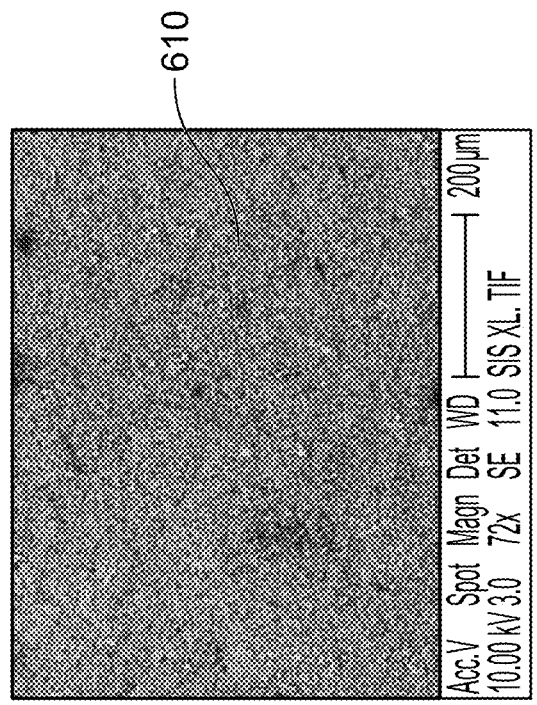
FIG. 7A shows an SEM image of a cylindrical rod containing electrode material that has been soaked by a solvent before mechanical loading.
Figure 7C:
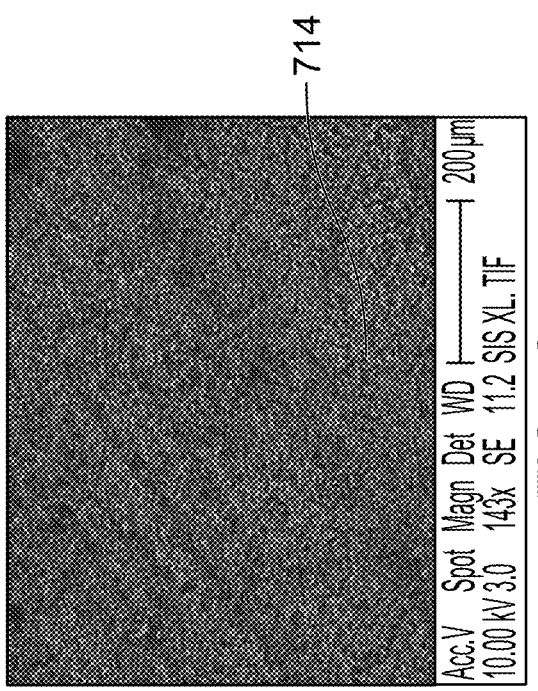
FIG. 7C shows an SEM image of a center portion of a cylindrical rod containing electrode material that has been soaked by a solvent after mechanical loading.
Figure 7E:
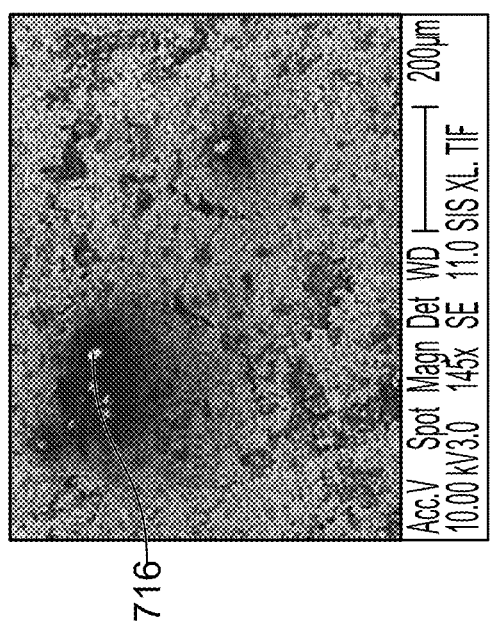
FIG. 7E shows an SEM image of a center portion of a cylindrical rod containing activated carbon and electrode material that has been soaked by a solvent after mechanical loading.
Figure 7F:
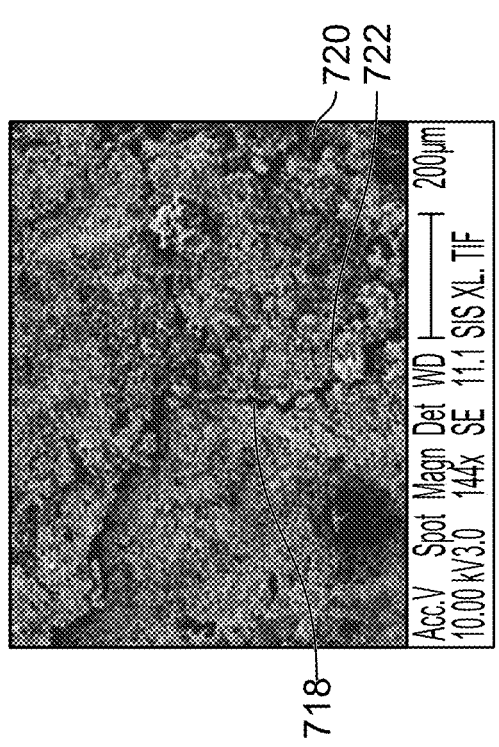
FIG. 7F shows an SEM image of cracks around an activated carbon in an edge of the cylindrical rod.
Figure 7G:
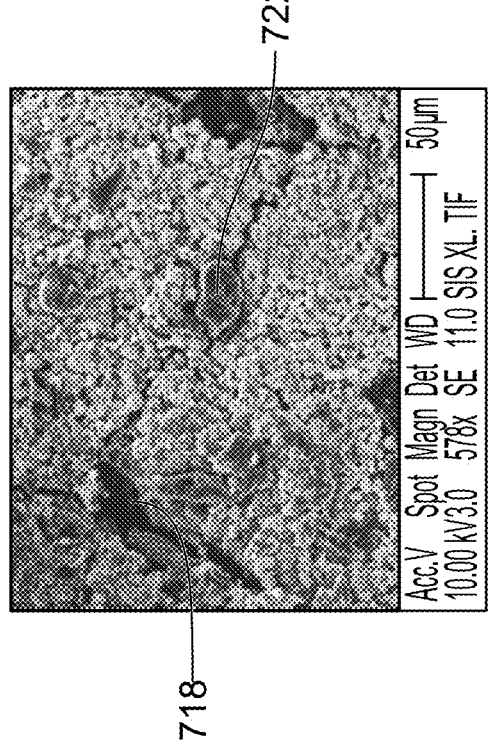
FIG. 7G shows an SEM image of cracks around an activated carbon in a center portion of the cylindrical rod

FIG. 7A shows an SEM image of the reference cylindrical rod 610 before the drop-tower test. After the drop-tower test, few cracks 710 could be observed in the SEM image in FIG. 7B at the edge 712 of the reference cylindrical rod 610. FIG. 7C is the SEM image of a center 714 portion of the cylindrical rod 610. The center portion 714 was generally free of cracks. In contrast, a large number of cracks 716 were observed at the center of the cylindrical rod 620 shown in FIG. 7E and more cracks 718 were observed near an edge 720 as shown in FIG. 7D. The cracks 718 were developed around an AC particle 722 as shown in FIGS. 7F and 7G. FIG. 7F shows the edge 720 of the cylindrical rod 620 while FIG. 7G shows a center portion of the cylindrical rod 620.

Figure 7H:
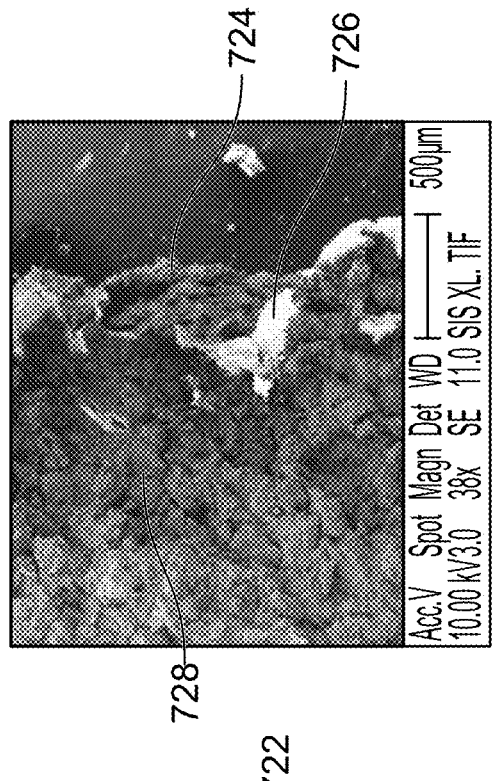
FIG. 7H shows an SEM image of an edge of a cylindrical rod containing porous silica and electrode material that has been soaked by a solvent after mechanical loading.

FIG. 7H is an SEM image of an edge 724 of the cylindrical rod 630 that contains porous silica particles 726 after the drop-tower test. FIG. 7I is an SEM image of a center portion of the cylindrical rod 630 after the drop-tower test, a large number of cracks 728 were observed and the size and density of the cracks were much larger than those of the cylindrical rod 620. The cracks were developed around the porous silica particles 726, as shown in FIGS. 7J and 7I. FIG. 7J is a close up of cracks 728 around a porous silica particle 726 near the edge 724 of the cylindrical rod 620. FIG. 7K is a close up of cracks 728 around a porous silica particle 726 in the center portion of the cylindrical rod 620.

Cylindrical rods containing anode materials that were soaked in a solvent are also investigated. Anode materials for the cylindrical rod 910 shown in FIG. 9A were collected from an anode sheet obtained from American Lithium Energy Co. of Vista, Calif. The anode sheet was grounded and the ground anode particles were mixed with porous silica particles at a mass ratio of anode material to porous silica of 9:1. The porous silica powders were received from Performance Process Inc., of Mundelein, Ill. The average particle size was around 2 microns. Two mL electrolyte solvent, propylene carbonate anhydrous (Sigma-Aldrich Co. of St. Louis, Mo., 310328), were added in the mixture to resemble the wet state of electrodes in a working battery. The mixture of anode materials, porous silica particles and solvent were compressed to form cylindrical rod 910 using the apparatus 300 in a similar fashion as that used to form cylindrical rod 620 described above. No cracks could be observed in cylindrical rod 910 after it was formed using apparatus 300. A reference cylindrical rod 810, as shown in FIG. 8A was prepared through a similar process by using only the anode material and the solvent, without the addition of porous silica particles. The mass of the reference cylindrical rod 810 was 1.28 g, and the rod has a diameter of 13.02 mm and a height of 5.55 mm. The mass of the cylindrical rod 910 was 1.33 g, and its diameter was 12.97 mm and its height was 6.22 mm. A 46-range digital multimeter from RadioShack of Fort Worth, Tex., was used to measure an electrical resistance of the cylindrical rod 910 containing the porous silica. Before impact, the measured resistance was about 200 kn. After the impact test, the electrical resistance was 28.7 MΩ, which is a few hundred times higher than the resistance before the impact test. In contrast, the electrical resistance of the reference cylindrical rod 810 without porous silica fillers did not vary much.

Figure 9A:
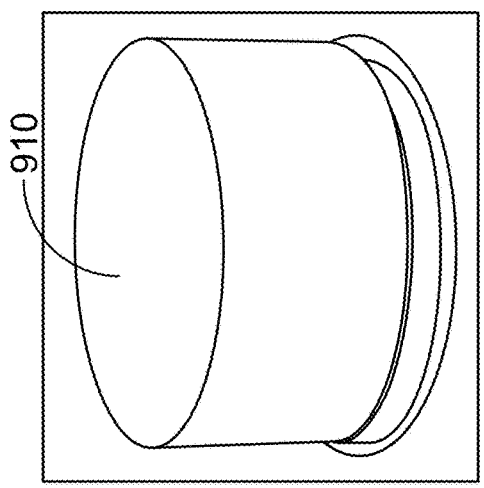
FIG. 9A shows a cylindrical rod containing porous silica particles.

Table 3 summarizes the parameters used to fabricate the cylindrical rods shown in FIGS. 8A and 9A.

| FIG. | 8A | 9A |
|---|---|---|
| CVI | None | Porous silica |
| Size of CVI | — | 2 microns |
| Ratio of anode material:CVI | — | 9:1 |

-continued

| FIG. | 8A | 9A |
|---|---|---|
| Solvent | Propylene carbonate anhydrous | Propylene carbonate anhydrous |
| Amount of Solvent | 2 ml | 2 ml |
| Mass of Rod | 1.28 g | 1.33 |
| Dimension of Rod | 13.02 mm × 5.55 | 12.97 mm × 6.22 |

Before impact, there were no cracks in the reference cylindrical rod 810 as shown in FIG. 8B. After impact, cracks 812 were observed near the edge 814 of the reference cylindrical rod 810, as shown in FIG. 8C. However, the center portion 816 of the sample was free of cracks, as shown in FIG. 8D.

Figure 9C:
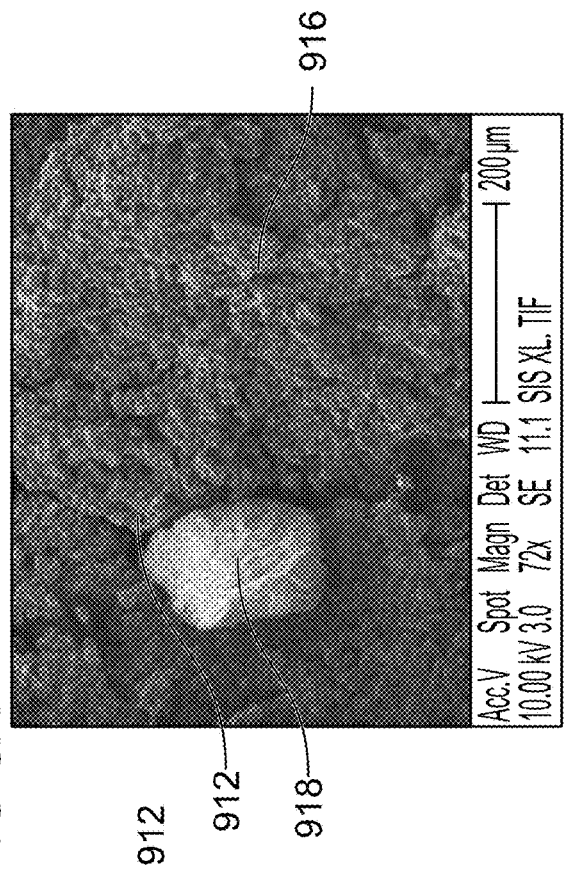
FIG. 9C shows cracks in the rod of FIG. 9A after impact.
Figure 9B:
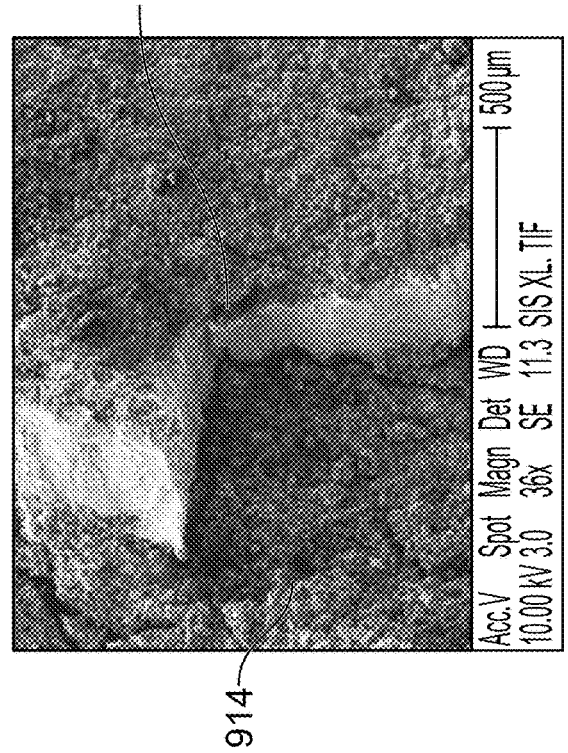
FIG. 9B shows cracks in the rod of FIG. 9A after impact.

In the cylindrical rod 910 containing porous silica particles, a large number of cracks 912 were observed in a center area 914 of the cylindrical rod 910, as shown in FIG. 9B, and more cracks 912 were observed near an edge 916 as shown in FIG. 9C. The cracks 912 were developed around silica particles 918 as shown in FIGS. 9B and 9C.

After the impact test, the electrical resistance of the cylindrical rod 910 containing porous silica increased significantly by more than a few hundred times than before the impact test; while that of the reference cylindrical rod 810 without porous silica fillers did not vary much.

Carbon nanotubes (CNT) can also be used as CVI to modify electrodes. In some embodiments, polyvinylidene fluoride (PVDF) can be used as a binder in the electrode. A binder in an electrode is typically a polymer adhesive that holds the particles of active materials together. The binder amount is usually 3-6% of electrode mass. An exemplary preparation method includes using an active material, either NCM-04ST $LiNi_{0.5}Mn_{0.3}Co_{0.2}O_2$ (NMC532) obtained from TODA America of Battle Creek, Mich. (for cathode samples) or EQ-Lib-CMSG graphite obtained from MTI Corp. of Richmond, Calif. (for anode samples), and mixing the active material with polyvinylidene fluoride (PVDF) obtained from Sigma-Aldrich Co. of St. Louis, Mo. (Product No. 182702) and CNERGY-C65 conductive carbon (C) obtained from Timcal of Cleveland, Ohio. The mixture was soaked up in 1-Methyl-2-pyrrolidinone (NMP) (Sigma-Aldrich Co. of St. Louis, Mo., Product No. 328634). The weight ratios of the solid components were NMC532: PVDF: C=93:4:3 and Graphite: PVDF: C=93:6:1 for cathode and anode samples, respectively. For each 0.2 g of PVDF, 5 ml NMP was used. The solid components and NMP was thoroughly mixed in a 50 ml beaker at room temperature by a mechanical stirrer (PCVS1, IKA) at 400 rpm for 30 minutes, and then conductive carbon was added, stirred at 500 rpm for another 30 minutes. After that, the active material was added, which was further homogenized by stirring at 600 rpm for 90 minutes. Cathode slurry was cast on a 15 μm thick aluminum foil (MTI EQ-bcaf-15u-280) by a film casting doctor blade (MTI EQ-Se-KTQ-150A) with the slurry thickness of 400 μm. Anode slurry was cast on a 9 μm thick copper foil (MTI EQ-bccf-9u) with the slurry thickness of 200 μm. The electrode sample was dried in vacuum at 80° C. for 24 hours. After drying, the thickness of the electrode sample was about 150 μm for cathode and 100 μm for anode, respectively. The dried sample was compressed by two flat stainless steel plates in a Type-5582 Instron machine at 30 MPa, with the loading rate of 0.5 mm/min. In the following sections, all electrode samples were processed through similar procedures, except that extra functional components might be added and special configurations might be employed. During testing, the electrode samples were soaked in an electrolyte, to simulate the working condition in a battery cell. The electrolyte was 1 M $LiFP_6$ dissolved in ethylene carbonate (EC) and ethyl methyl carbonate (EMC). The mass ratio of EC:EMC was 1:1.

The electrode sample was impacted by a stainless steel rod with a length of 305 mm and the mass of 7.7 kg, from a drop distance in the range from 4-22 mm.

Figure 10A:
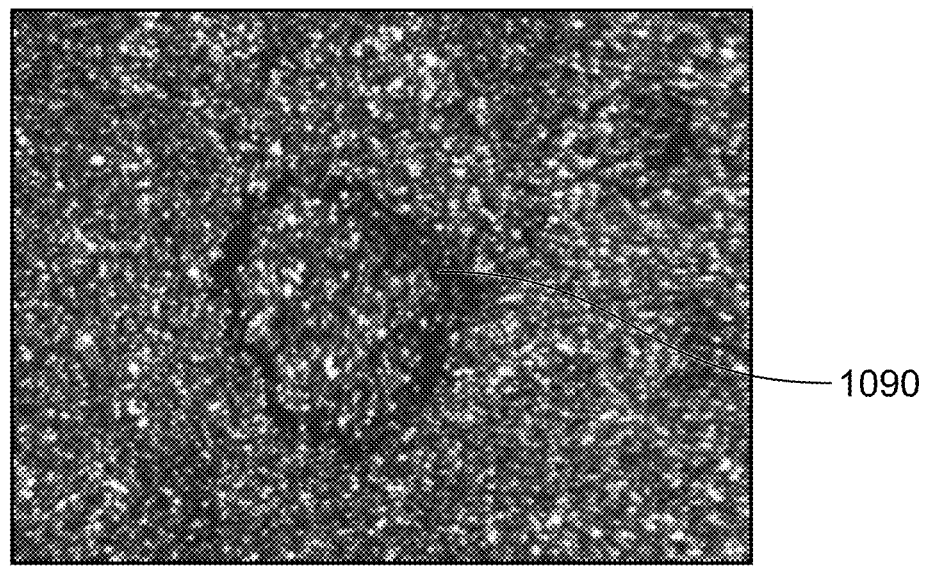
FIG. 10A shows an electrode containing single wall carbon nanotubes after mechanical loading.

FIG. 10A is an optical microscope image of the electrode containing SWCNT after impact. Cracks 1090 were observed. Under similar impact conditions, a reference electrode (not shown) prepared using a similar procedure but without the addition of CVI showed no evidence of damage.

Figure 10B:
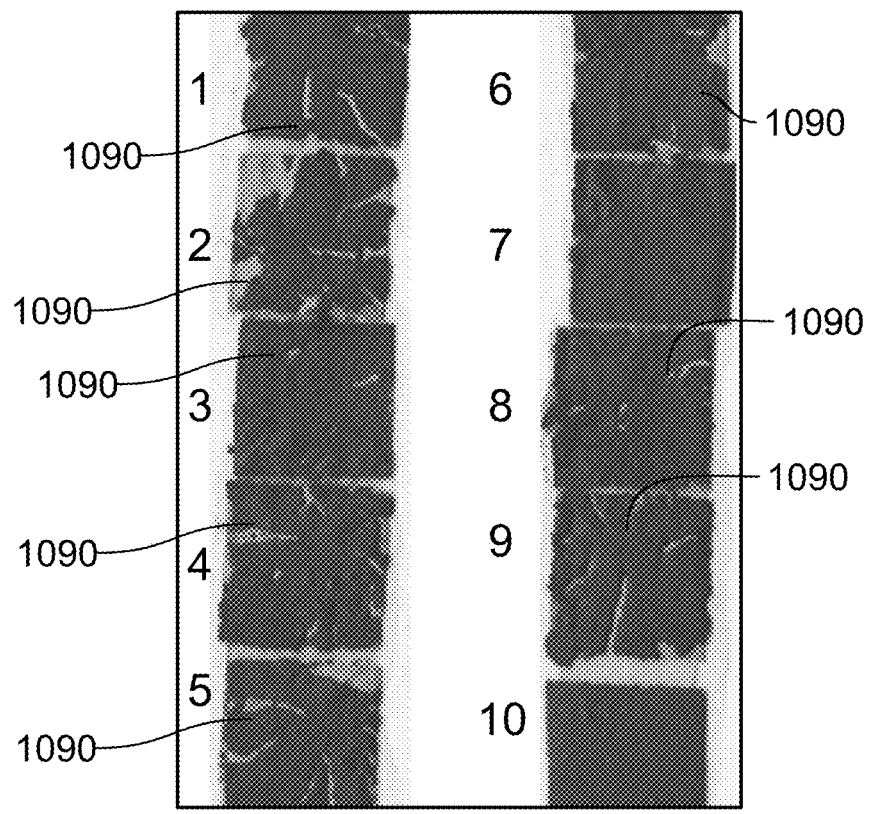
FIG. 10B shows an electrode containing multiple wall carbon nanotube after mechanical loading.

FIG. 10B shows various electrode samples modified by 3 wt % MWCNT after impact tests. Ten electrodes formed a layer stack and was impacted simultaneously, labeled as samples 1-10, respectively. The drop distance was 12 mm. Multiple cracks 1090 are visible in most of the electrode layers.

In addition to the passive additives described above, active additives that are thermally triggered have also been investigated.

Figure 11A:
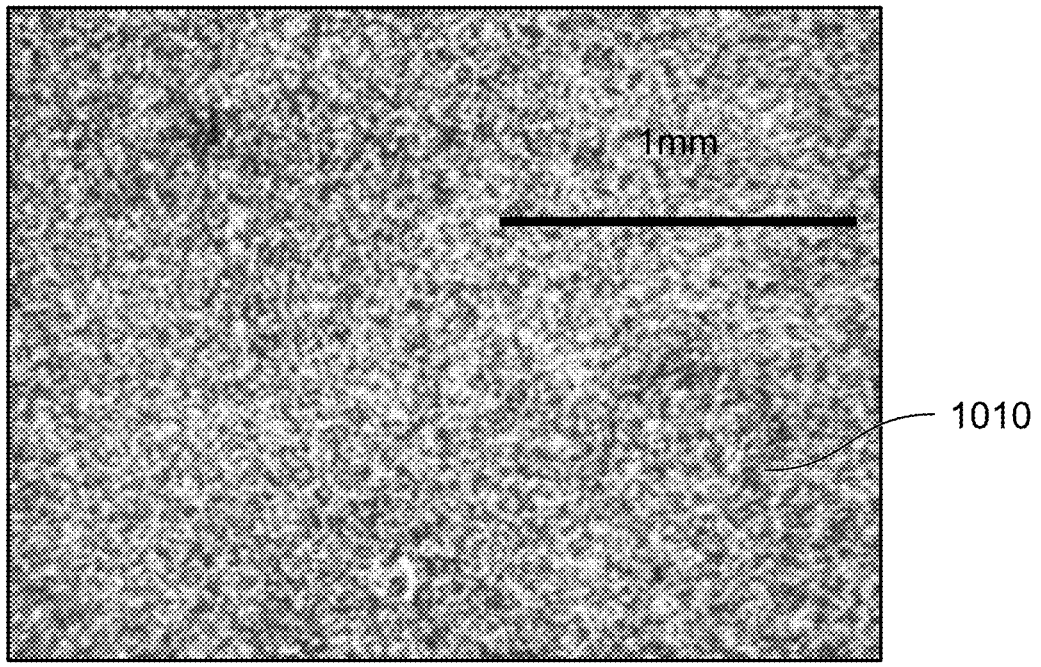
FIG. 11A shows an electrode containing expandable graphite before a thermal trigger.
Figure 11B:
FIG. 11B shows cracks in the electrode of FIG. 11A after a thermal trigger.

Expandable graphite (EG) can be employed as a thermally triggered CVI. The thickness of EG can expand by a few times when it is heated to or above a critical temperature. FIG. 11A shows an electrode 1010 containing expandable graphite (EG) before the application of heat. The electrode 1010 includes 5 wt % of conductive EG particles, obtained from ACS Material LLC of Medford, Mass.; Products No. EG-110-230, having a size of 80 mesh. NCM532 is the cathode materials for electrode 1010. The selected EG has an critical temperature at about 110° C. The modified cathode layers were dried at 40° C. for 72 hours. The low drying temperature prevents premature damages. The electrode 1010 was then heated to 120° C. and kept for 20 minutes. The graphite expanded and generated cracks/voids 1020 as expected upon heating, as shown in FIG. 11B.

Figure 12A:
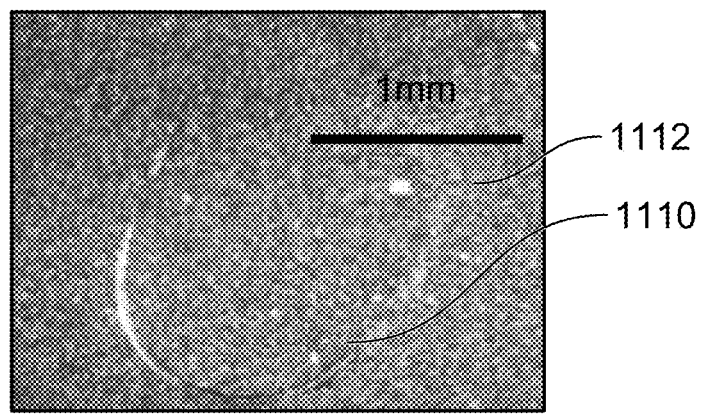
FIG. 12A shows an electrode containing a shape memory material before a thermal trigger.
Figure 12B:
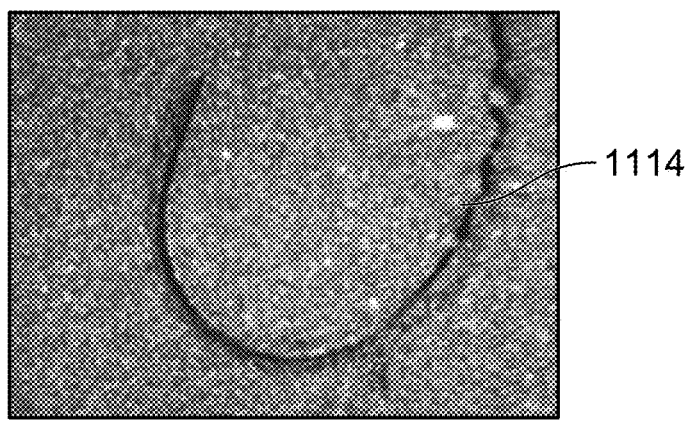
FIG. 12B shows cracks in the electrode of FIG. 12A after thermal trigger.
Figure 12C:
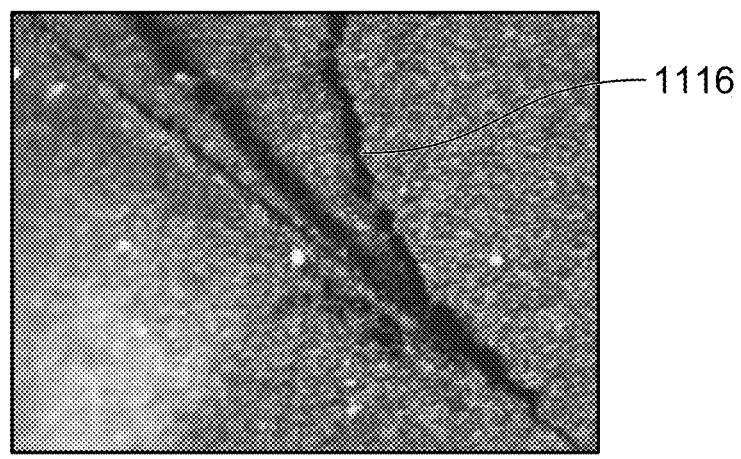
FIG. 12C shows out of plane cracks in the electrode of FIG. 12A after thermal trigger.

Shape memory materials (SMM) can also be used as a thermally triggered CVI. A SMM can be deformed below the transition temperature and recover to the original shape above the transition temperature. FIG. 12A is an optical microscope image of an originally straight SMM wire from Fort Wayne Metals; Products No.: 82909 that was cut into segments that are 10 mm long. The transition temperature was about 90° C. At room temperature, the wire segments were bent into coils 1110, and embedded into 150 μm thick cathode layers to form an electrode 1112. The electrode 1112 was heated to 120° C. and kept for 5 minutes. After heating, the SMM coils 1110 tend to change back to straight, either causing in-plane cracking and voiding 1114 as shown in FIG. 12B or causing out-of-plane damages 1116 as shown in FIG. 12C.

Hollow or porous beads, particles, tubes, pipes, fibers, plates, pads, pouches, boxes, and other containers with sizes ranging from a few nanometers to the battery cell size can be used to hold fire-extinguishing agents (FEA), thermal runaway retarders (TRR), electrolyte absorbers (EA), and/or gas generation agents (GGA). Upon mechanical loading or thermal loading (when temperature rises) FEA, TRR, EA, or GGA can be released from the hollow or porous containers into the battery system to put out fire and/or reduce heat generation rate in the battery. Such containers can be placed in the cathode, anode, electrolyte, membrane, or other locations, both inside or outside the battery cells. The containers can be distributed uniformly, or form aggregates that have either random or textured distribution patterns.

Thermal runaway retarders (TRR) can include chemicals that can change salvation structures of ions, such as aromatic amine, N,N-Diethylaniline, N,N-diethyl-p-phenylenediamine, 2-(2-methylaminoethyl)pyridine, 5-amino-1,3,3-trimethylcyclohexanemethylamine, (1R,2R)-(+)-1,2-diphenylethylenediamine, N,N'-diphenylethylenediamine, tryptamine, 2-benzylimidazoline, 1,2,3,4-tetrahydro-9H-pyrido[3,4-b]indole, 4,4'-diaminodiphenylmethane, 1-(N-boc-aminomethyl)-4-(aminomethyl)benzene and pyridine; lightly cross-linked polymers, which include but not limited to epoxy, polyester, poly (vinyl ester), polyurethane, bakelite, polyimide, urea methanol and melamine, or co-polymers containing these components.

TTR can also include surfactants, such as sodium lauryl sulfate, sodium dodecylbenzenesulfonate, oleic acid, Span™ series, Atlas™ G series, Tween™ series, Solulan™ series, Splulan™ series, Brij™ series, Arlacel™ series, Emcol™ series, Aldo™ series, Atmul™ series surfactant.

TTR can also include chemicals that can change the viscosity of electrolyte solutions. These TTR can include solid state aromatic amine such as n,n'-diphenylethylenediamine, 4,4'-diaminodiphenylmethane and 1-(N-Boc-aminomethyl)-4-(aminomethyl)benzene; nonionic surfactants such as 2,4,7,9-Tetramethyl-5-decyne-4,7-diol, polyethylene glycol hexadecyl ether, polyoxyethylene nonylphenyl ether, sorbitan laurate and polyethylene glycol sorbitan monolaurate; viscous liquids such as glycerol, glycerin, and other polyols.

TTR can also be chemicals such as acid, bases, ketone, alcohol and organic phosphorus compounds as well as their halogenated derivatives.

The gas generation agents (GGA) and associated processes can include catalytic decomposition of hydroxyl peroxide with potassium iodine or manganese dioxide as catalyst; polyurethane foaming; extinguishing agents in fire extinguishing processes such as ammonium sulfate with sodium bicarbonate solution; organic solvents having boiling points ranging from 60-250° C. such as acetone, methanol, ethanol, acetonitrile, benzene, carbon tetrachloride, cyclohexane, ethyl acetate, isopropyl alcohol, tert-butyl alcohol and triethylamine; thermal decomposition of ionic solids, e.g. carbonates such as sodium bicarbonate and potassium bicarbonate; thermal decomposition of permanganate salts such as silver permanganate, ammonium permanganate, nickel permanganate and copper permangantes; thermal decomposition of ammonium salts such as ammonium nitrate, ammonium chromates, ammonium citrate, ammonium carbonate and ammonium bicarbonate; thermal decomposition of coordination compounds such as diaquaamminecobalt chloride, diaquaamminecobalt bromide, cobalt ammines chloride, cobalt ammines nitrate, chromium ammines thiocyanate and nickel ammines chloride; thermal decomposition of perchlorates such as nitronium/nitrosonium perchlorates; thermal decomposition of oxalates such as silver oxalate; thermal decomposition of azide such as sodium azide, potassium azide, lithium azide and ammonium azide; thermal decomposition of organic compounds such as azodicarbonamide, azobisisobutyronitrile, n,n'-dinitrosopentamethylenetetramine, 4,4'-oxydibenzenesulfonyl hydrazide, p-toluenesulfonyl hydrazide; thermal decomposition of hydrated salts such as ammonium copper sulfate hexahydate, nickel sulfate hexahydrate, calcium sulfate hemihydrate, lithium sulfate monohydrate, sodium carbonate monohydrate, borax, nickel oxalate dehydrate, soium carbonate perhydrate, alkali (Na, K, Rb, NH4) oxalate perhydrate and calcium sulfite.

Gas generation agents (GGA) can also include bubble generation promoters (BGP), materials that promote bubble nucleation and growth when the electrolyte is heated, such as particles, fibers, rods, layers and layer stacks, platelets of rough, cracked, or dimpled surfaces or surface coatings. BGP can be inside or near electrodes, inside or near membrane separator. If the membrane separator can promote bubble generation as electrolyte is heated, the membrane separator essentially becomes a BGP.

The electrolyte absorbers (EA) can include particles, platelets, beads, tubes, fibers, membranes, disks, and monoliths of metallic materials, glass materials, carbon materials, ceramics, polymers, elastomers, alumina, zeolites, polyelectrolytes, polymers with charged or polar side groups, silica and aerogels, and composite materials. These materials can be porous, hollow, or solid. The electrolyte absorbers (EA) can also include superabsorbents such as poly (sodium acrylate), poly acrylic acid-sodium styrene sulfonate (AA-SSS), poly acrylic acid and 2-acrylamido-2-methylpropane sulfonic acid (AA-AMPS), 2-Acrylamido-2-methylpropane sulphonic acid and poly(ethylene glycol) copolymer, poly (potassium, 3-sulfopropyl acrylate-acrylic acid) gels, poly (AMPS-TEA-co-AAm), (poly ethylene glycol methyl ether methacrylate-acrylic acid) copolymers, methacrylamidopropyltrimethyl ammonium chloride (MAPTAC). The electrolyte absorbents (EA) can include particles, platelets, tubes, membranes, disks, and monoliths of polyelectrolytes including protines such as bovine serum albumin, casein, lactoferrin; polycations containing aromatics or having a charged backbone such as poly(4-vinylpyridine) (PVP), x,y-ionene, poly(N,N-diallyl-N,N-dimethyl-ammonium chloride) (PDMDAAC); polycations with quaternary ammonium side chains such as poly(trimethylammonio ethylmethacrylate) (PTMAEMA) and its copolymers; polycations without steric stabilizer such as modified polyaspartamide (PAsp), poly(amidoamine)s (PA) with different side groups, poly(N-isopropylacryl amide) (PNIPAM) and derivatives, poly(dimethylaminoethyl-L-glutamine) (PDMAEG) and copolymers, Poly(methyl methacrylate) (PMMA) and methacrylamide derivatives, poly[2-(dimethylamino)ethyl methacrylamide](PDMAEMA) and derivatives; polycations with steric stabilizer such as poly(L-lysine) (PLL) and derivatives, amino acid-based polymers; Amphiphilic polycations such as poly(N-ethyl-4-vinylpyridinium bromide) (PEVP) and copolymers, poly(4-vinylpyridine) (PVP) copolymers; Polyamphoters such as modified poly(1,2-propylene H-phosphonate), silica and aerogels, and composite materials. These materials can be porous or solid. The electrolyte absorbents (EA) can also include superabsorbents such as poly (sodium acrylate), poly acrylic acid-sodium styrene sulfonate (AA-SSS), poly acrylic acid and 2-acrylamido-2-methylpropane sulfonic acid (AA-AMPS), 2-Acrylamido-2-methylpropane sulphonic acid and poly(ethylene glycol) copolymer, poly (potassium, 3-sulfopropyl acrylate-acrylic acid) gels, poly (AMPS-TEA-co-AAm), (poly ethylene glycol methyl ether methacrylate-acrylic acid) copolymers, methacrylamidopropyltrimethyl ammonium chloride (MAPTAC), or co-polymers containing these components.

Fire-extinguishing agents (FEA) include dry chemicals such as sodium bicarbonate, monoammonium phosphate, potassium bicarbonate, potassium bicarbonate and urea complex, potassium chloride; foams such as Aqueous Film Forming Foam (AFFF), Alcohol-Resistant Aqueous Film Forming Foams (AR-AFFF), Film Forming Fluoroprotein (FFF), Compressed Air Foam System (CAFS);

FEA can be class D fire extinguishing powders such as sodium chloride, copper, graphite based, sodium carbonate based powders.

The containers of FEA, TRR, EA, or GGA can be weakened, softened, melted, broken apart upon mechanical or thermal loading. For FEA, TRR, EA, or GGA that are stable under normal battery operation conditions (i.e. operating at a normal battery operation temperature range, or without intense mechanical loading), or for FEA, TRR, EA, or GGA that do not interact with active materials and the electrolyte in the battery, the containers are optional. The containers can be hollow carriers; organic surface coatings, inorganic surface coatings, blockers, tubes, pouches, boxes, beads, particles, disks, layers, stoppers, and surface layers of absorbed or adsorbed particles, carbon nanotubes or other tubes, fibers, rods, and platelets. The containers can be made of fusible alloys such as bismuth alloys, polymers such as paraffin and polyethylene, elastomers, glass materials, gelatin, carbon materials, ceramics, smart materials such as smart alloys, polymers, elastomers, and ceramics, e.g. Ti—Ni alloy, and hydrogels; and composite materials. The containers can be either electrically conductive or nonconductive. The containers can be either thermally conductive or nonconductive. The containers can be used to carry the damage initiators disclosed above, or additives such as positive thermal coefficient materials, phase change materials, and membrane blocking materials. Multiple layers or sections of containers can be used.

Figure 13A:
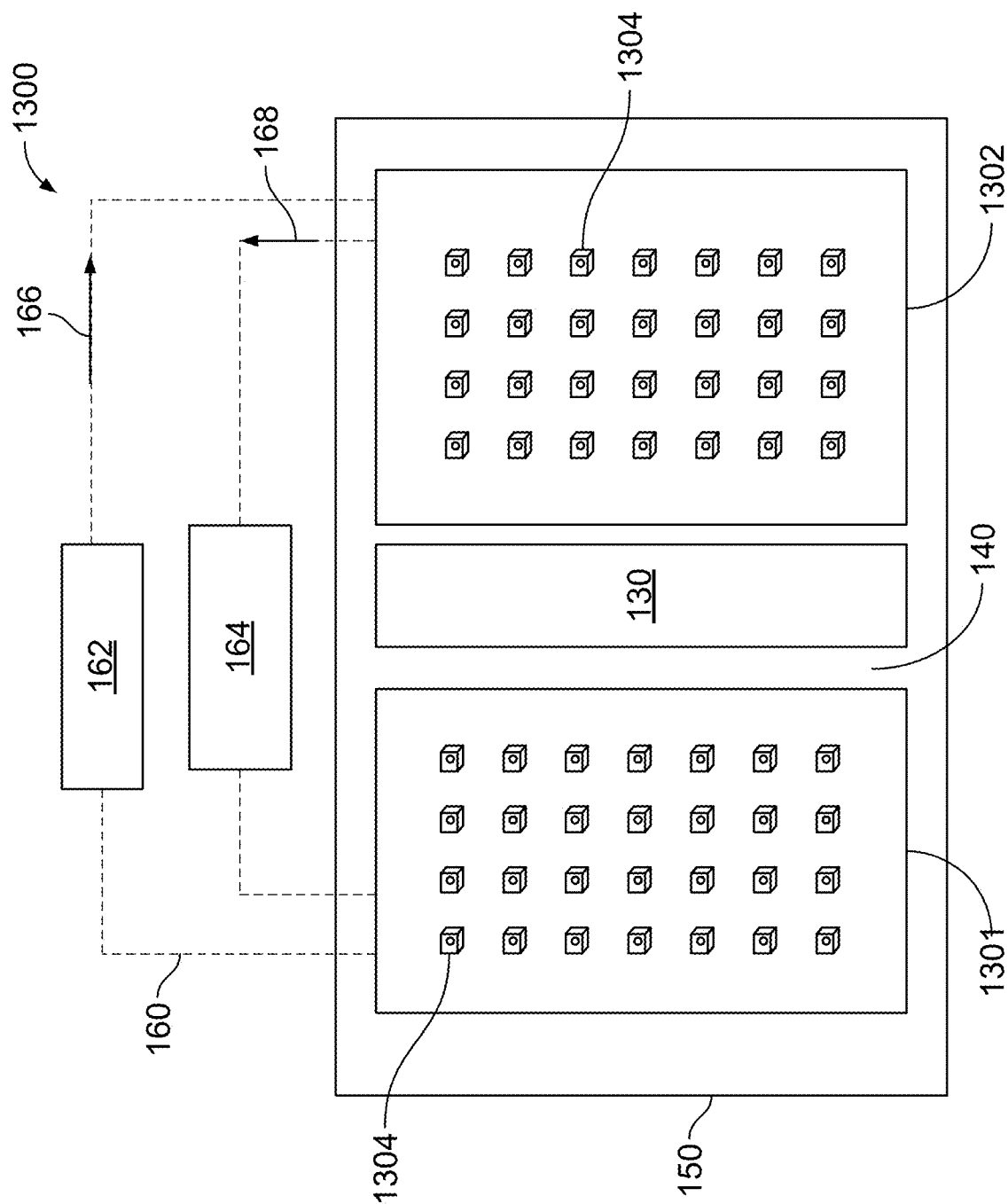
FIG. 13A shows a schematic diagram of a battery that includes containers.

FIG. 13A shows a battery 1300 having an anode 1301 and a cathode 1302 both of which includes containers 1304. The containers 1304 can hold FEA, TRR, EA, or GGA. In FIG. 13A, the containers are uniformly distributed in the electrodes. However, the containers can be aggregates distributed in a random pattern or aggregates that are distributed in a specific pattern.

Containers for holding FEA, TRR, EA, or GGA can be, for example, hollow microfibers (HMF). HMF alone can also serve as a CVI. The processing and testing procedure for exemplary electrodes were similar with that of CNT modified electrodes described above in FIGS. 10A and 10B, except that the CNT was replaced by HMF. The HMF can be either clear fused quartz (CFQ) fibers, for example, obtained from Produstrial of Fredon, N.J. (Product No. 134316), which have an inner diameter (ID) of 50 microns and an outer diameter (OD) of 80 microns; or borosilicate glass fibers of similar ID and OD, provided by Produstrial of Fredon, N.J. (Product No. 134270). The HMF content was either 3 wt % or 5 wt % of electrode mass.

Figure 13B:
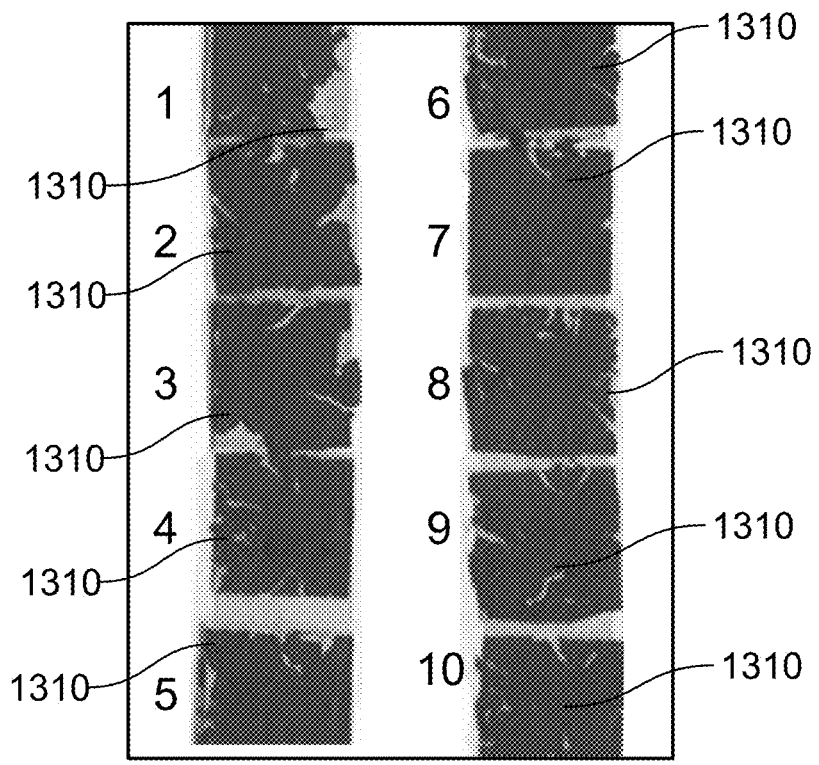
FIG. 13B shows electrodes containing hydrophilic hollow microfibers after mechanical loading.
Figure 13C:
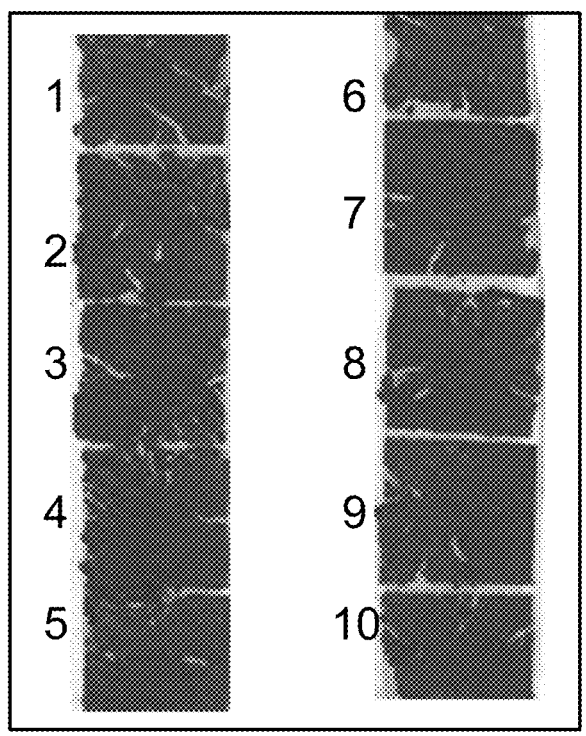
FIG. 13C shows electrodes containing hydrophobic hollow microfibers after mechanical loading.

At a HMF content of 3 wt %, pronounced cracks 1310 are observed after impact test done at a drop distance of 12 mm as shown in FIG. 13B. Ten layers of HMF modified electrodes (samples 1-10) form a layer stack, and are impacted by the hammer. Extensive cracking are observed in most of the layers.

Figures 14A, 14B:
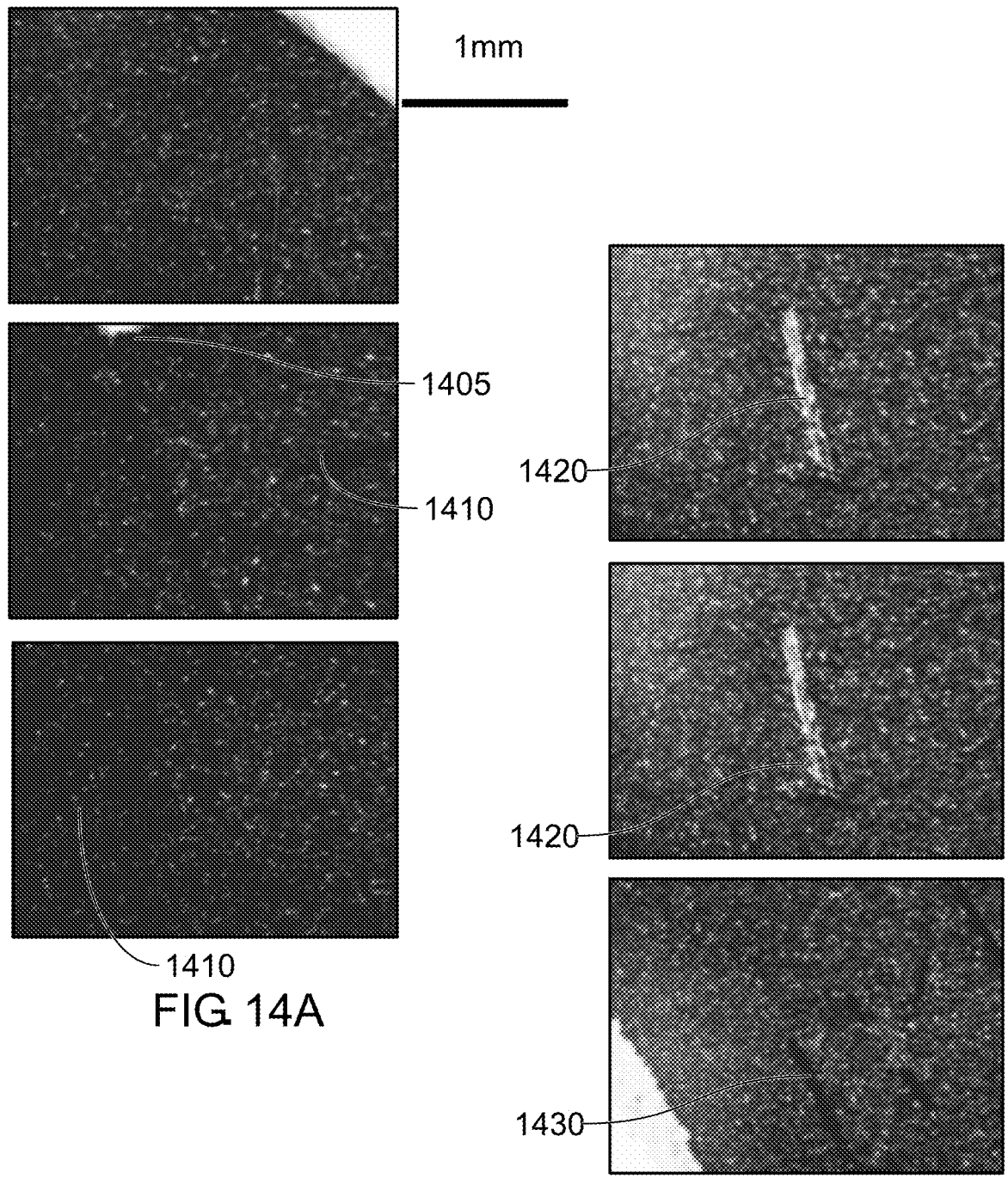
FIG. 14A shows electrodes containing hollow hydrophilic glass fibers after mechanical loading.
FIG. 14B shows electrodes containing hollow hydrophobic glass fibers after mechanical loading.

FIG. 14A shows a series of three optical microscope images of electrodes containing 3% hollow hydrophilic glass fibers 1410 when impacted at a drop distance of 7 mm. FIG. 14B shows a series of three optical microscope images of electrodes containing 3% hollow hydrophoboic glass fibers 1420 when impacted at a drop distance of 7 mm. As shown in FIGS. 14A and B, the fibers are broken, and any chemicals initially contained inside would be released.

Figure 15A:
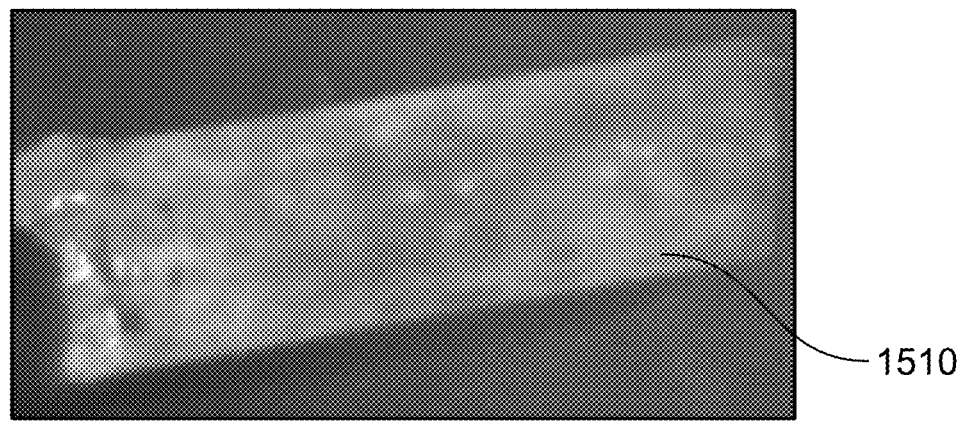
FIG. 15A shows an empty miniature hollow capsule.

FIG. 15A shows a glass tube 1510 having an OD of 1.69 mm, ID of 1.55 mm, height of 5.65 mm, and mass of 0.010 g that can contain FEA, TRR, EA, or GGA and be embedded in the battery.

Figure 15B:
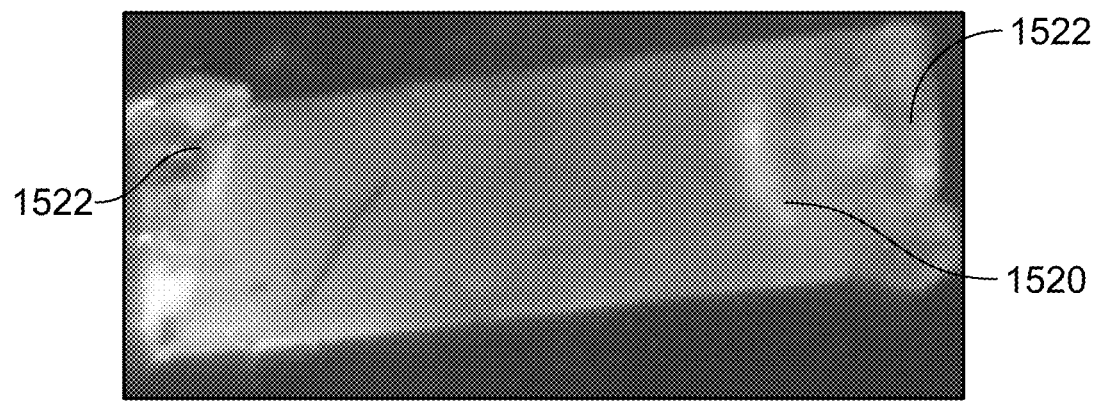
FIG. 15B shows a miniature hollow capsule containing water.

FIG. 15B shows a miniature capsule 1520 filled with 7 mg of neat water, which serves as an analog of functional chemicals such as FEA, TRR, EA, or GGA. The liquid was sealed in the capsules by thin layers of epoxy adhesive 1522 at both ends.

Figure 15C:
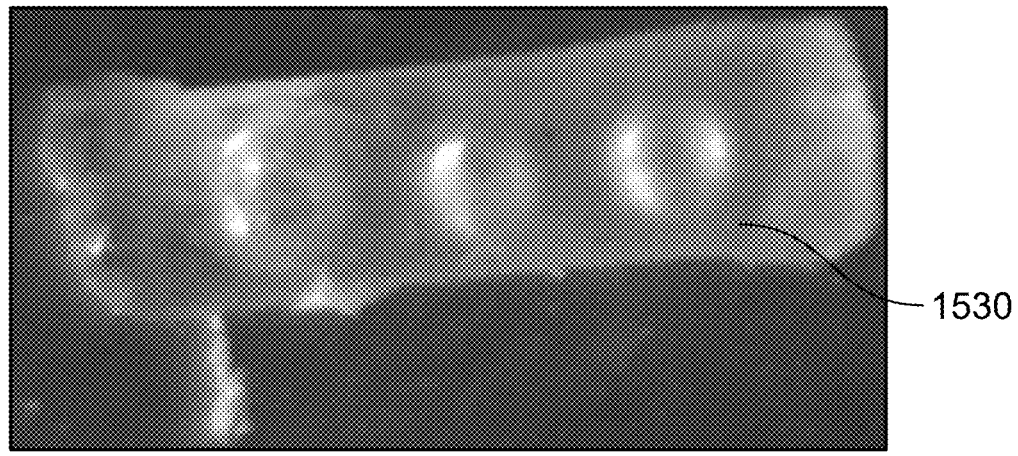
FIG. 15C shows a miniature hollow capsule containing a surfactant.

FIG. 15C shows a miniature capsule 1530 filled with 9 mg of a surfactant, Adogen 464 obtained from Sigma-Aldrich Co. of St. Louis, Mo. (Product No. 856576), which is another analog of functional chemicals such as FEAs.

Figure 15D:
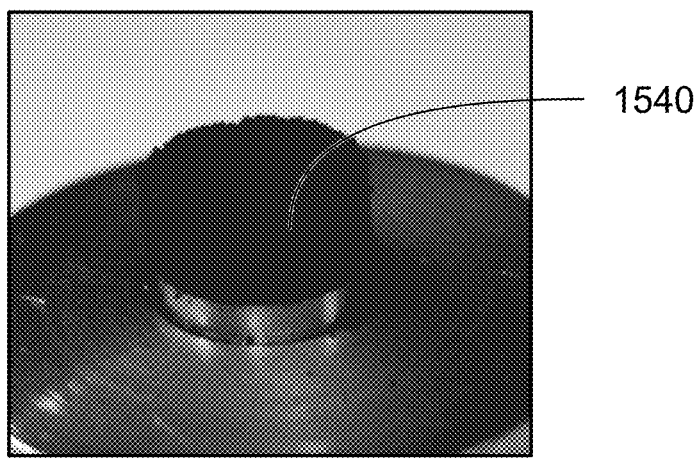
FIG. 15D shows an electrode before mechanical loading.

The filled miniature capsules 1520 and 1530 were embedded into cathode material cluster saturated with solvent, to form a cylindrical rod 1540, as shown in FIG. 15D. The sample preparation procedure is similar with that of FIG. 6A, except the additives are filled miniature capsules.

Figure 15E:
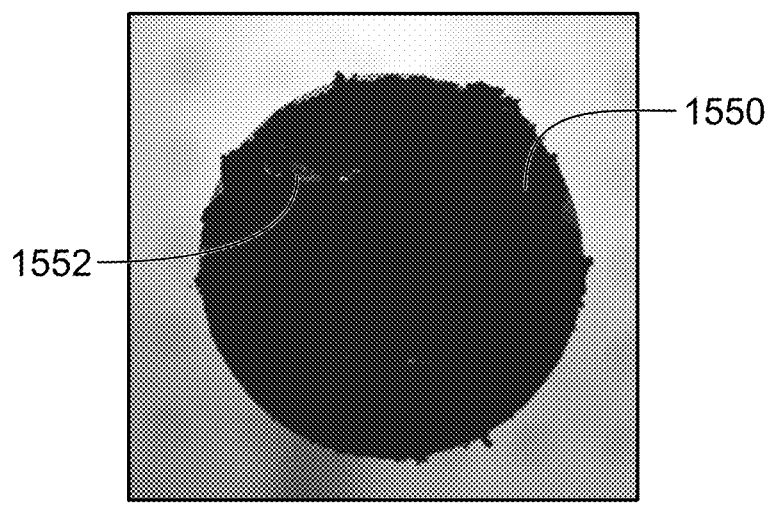
FIG. 15E shows an electrode after mechanical loading.

FIG. 15E shows the impacted cylindrical rod 1550 containing broken miniature capsules 1552 and the sealed liquids were released.

Figure 15F:
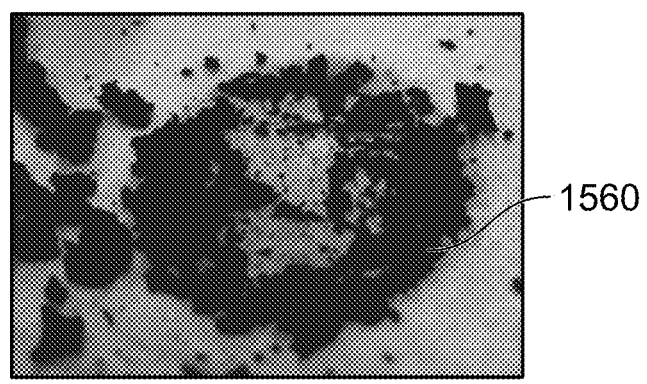
FIG. 15F shows an electrode after mechanical loading.

FIG. 15F shows the impacted cylindrical rod 1550 being shattered into small pieces 1560 after being impacted by the hammer at a drop distance of 12 mm. The shattering of the rods indicates that the capsules acted as damage initiators, as the electrode samples without the capsules had few cracks.

Figure 15G:
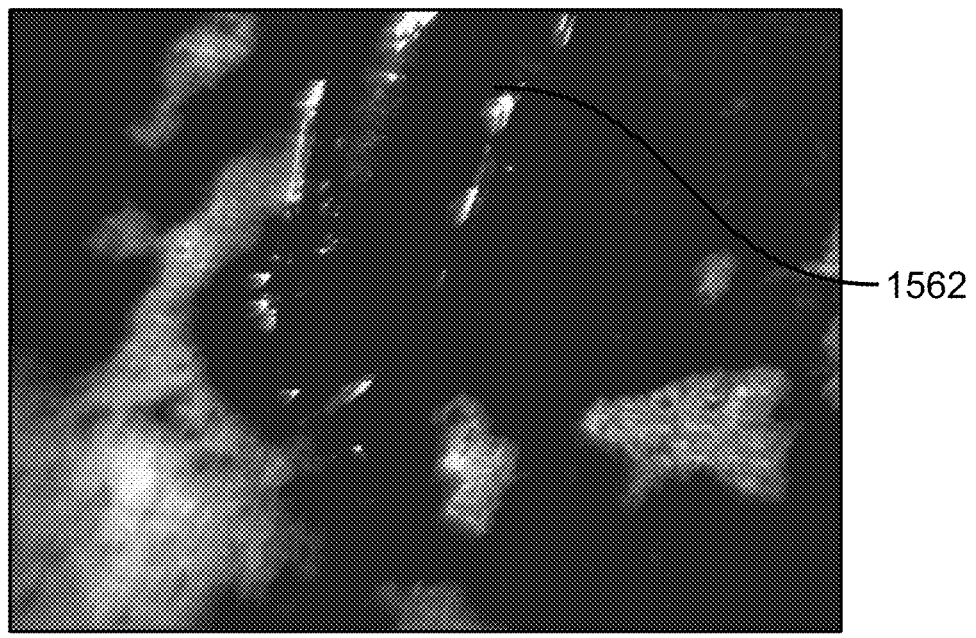
FIG. 15G shows an electrode after mechanical loading.
Figure 15H:
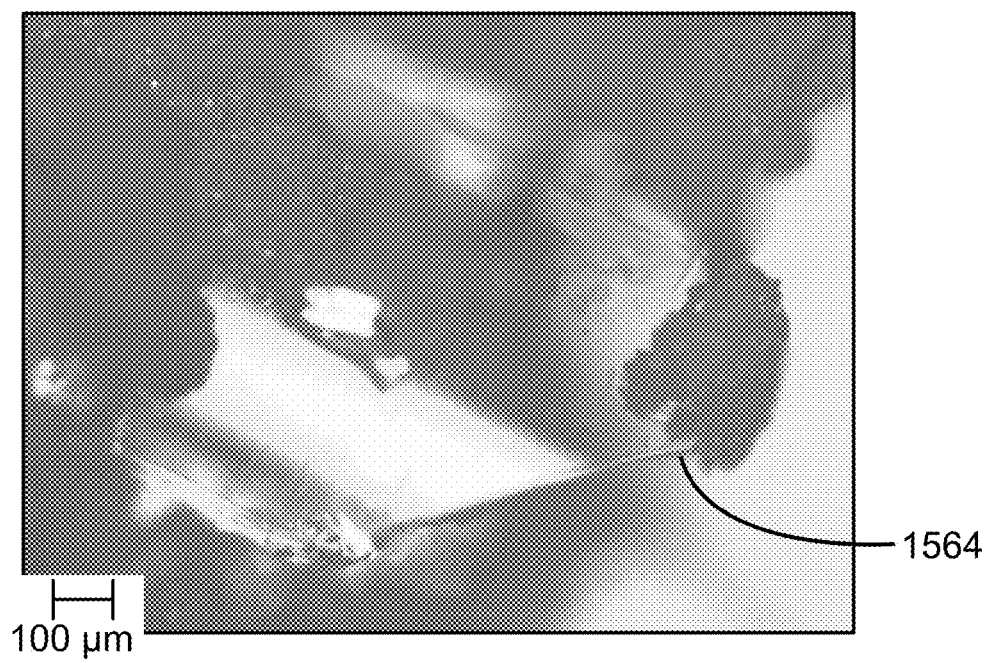
FIG. 15H shows an electrode after mechanical loading.

The mechanical impacted samples were also characterized by optical microscope and typical photos are shown in FIGS. 15G and 15H. A broken empty capsule 1564 is shown in FIG. 15H.

Figure 16A:
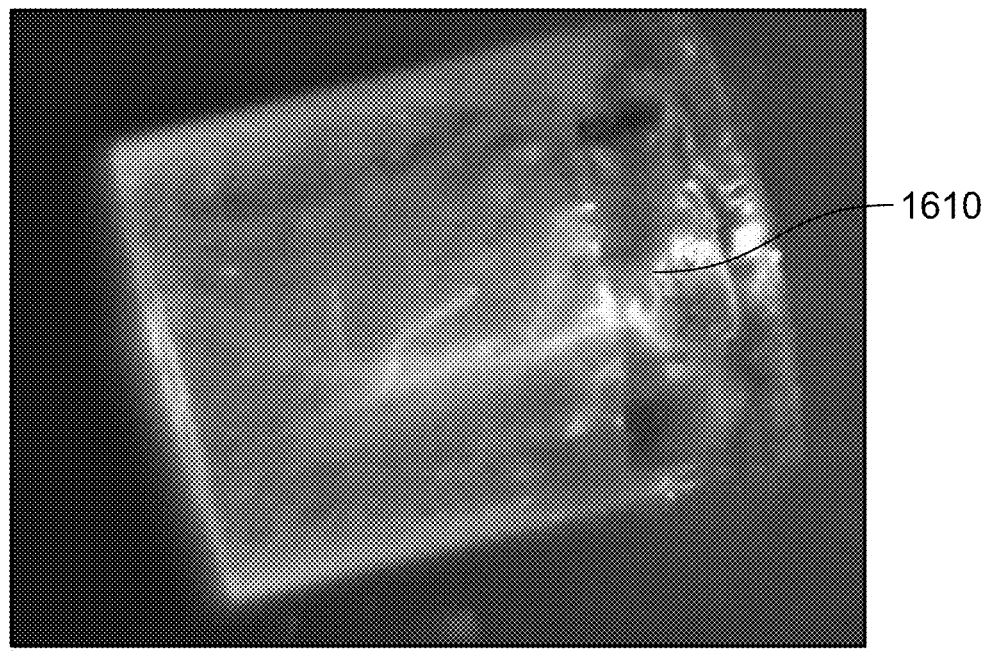
FIG. 16A shows an empty miniature hollow capsule.
Figure 16B:
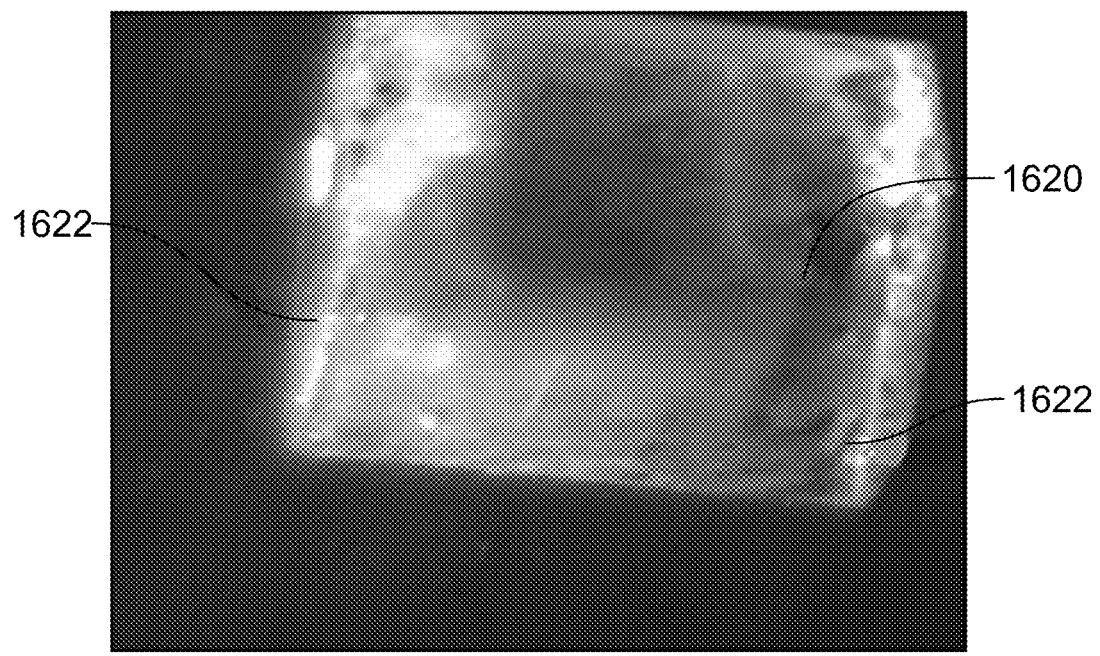
FIG. 16B shows a miniature hollow capsule containing porous silica particles.

FIG. 16A shows a glass tube 1610 having an OD of 3.97 mm, ID of 2.40 mm, a height of 3.97 mm, and a mass of 0.091 g. The glass tube forms a miniature capsules 1620 when filled by 7 mg of porous silica particles obtained from Performance Process Inc., of Mundelein, Ill., as shown in FIG. 16B. The porous silica particles are analogs of condensed aerosol fire suppression agent. The solid agent was sealed in the capsule by thin layer of epoxy adhesives 1622 from both ends.

Figure 16C:
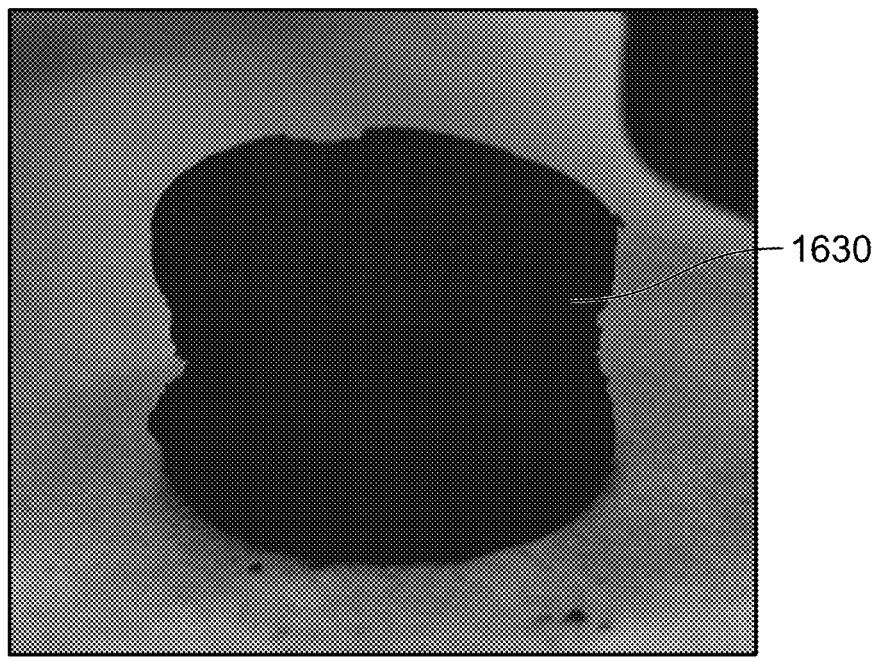
FIG. 16C shows an electrode before mechanical loading.

The filled miniature capsules 1620 were embedded into cathode material soaked up by solvent, to form cylindrical rod 1630 as shown in FIG. 16C. The cylindrical rod 1630 was then impacted by the drop tower 400.

Figure 16D:
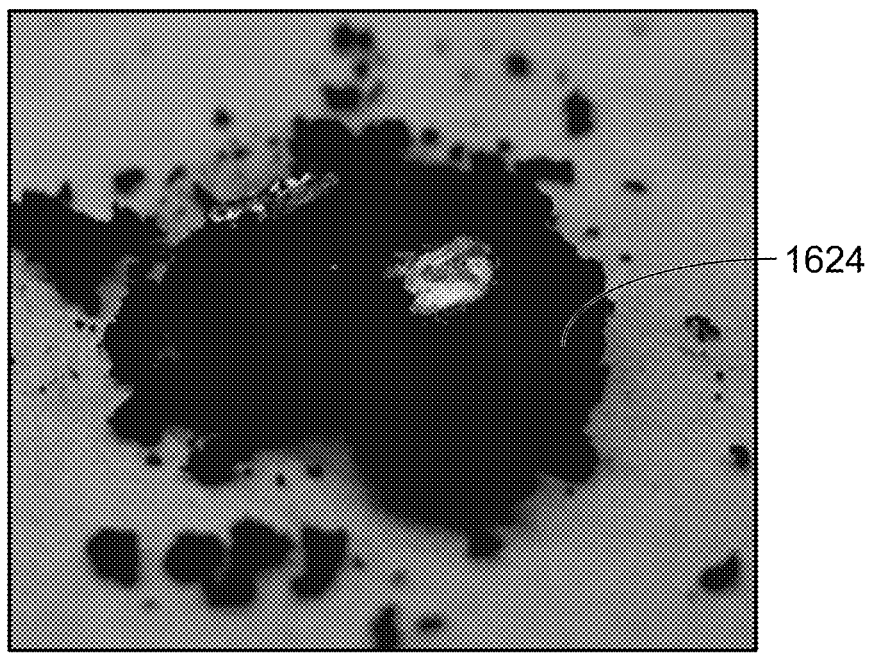
FIG. 16D shows the electrode of FIG. 16C after mechanical loading.

As shown in FIG. 16D, the miniature capsules 1620 were broken and the sealed porous silica particles 1624 were released and exposed.

In general, a damage initiator needs not be an additive. For example, reducing the amount or the molecular weight (MW) of the binder in electrodes can also weaken (i.e., reduce) the mechanical strength of the electrode upon mechanical impact. In other words, the reduced binder phase effectively becomes the CVI.

An example of the binder is PVDF. The processing and testing procedures for fabricating an electrode in this case are similar as before, except that no CVI particles are added.

Figure 17A:
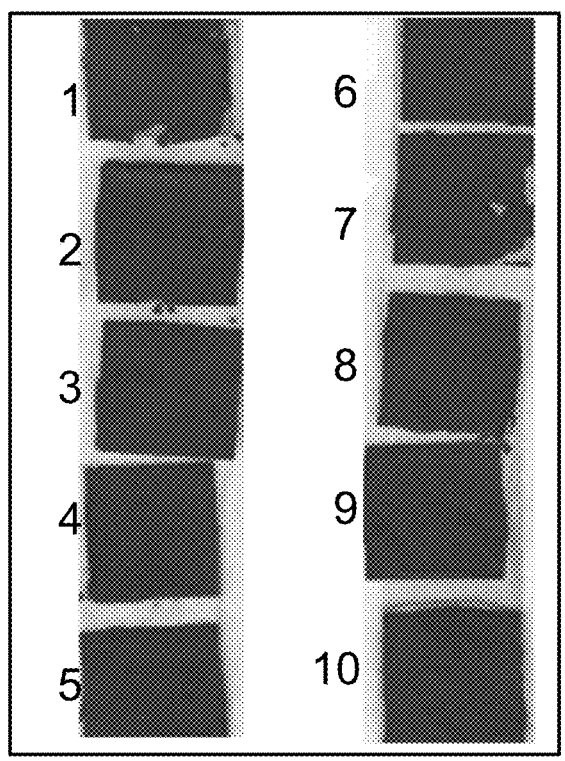
FIG. 17A shows electrodes having high molecular weight binder after mechanical loading.
Figure 17B:
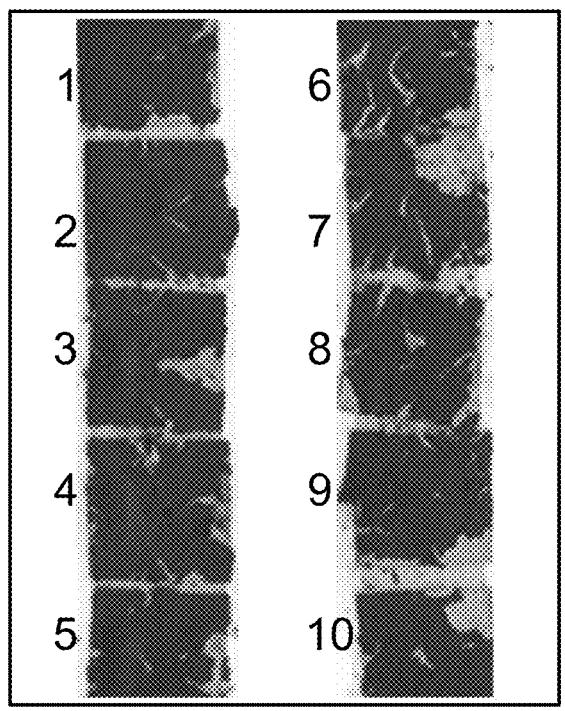
FIG. 17B shows electrodes having low molecular weight binder after mechanical loading.
Figure 17C:
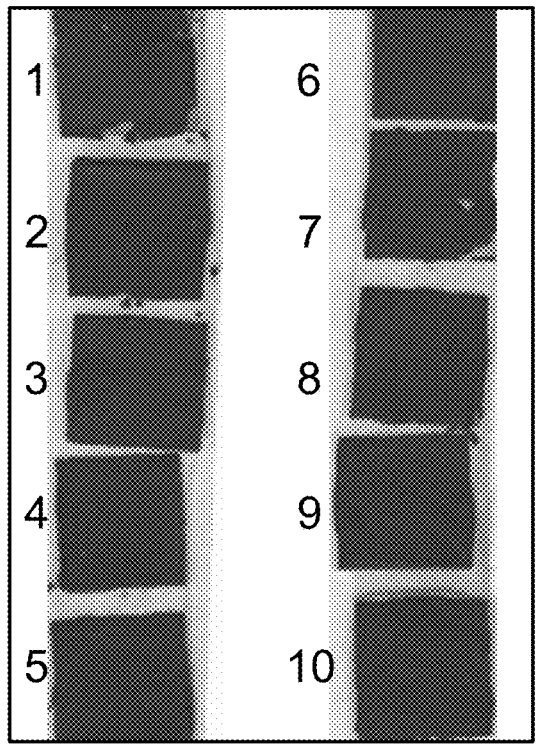
FIG. 17C shows electrodes having 6 wt % binder.

FIG. 17A shows the impact result from an electrode having a high molecular weight (MW) binder. The MW in this case was 540 k and was obtained from Sigma-Aldrich Co. of St. Louis, Mo. Ten layers of electrodes form a layer stack (samples 1-10) and are impacted by the hammer simultaneously. FIG. 17B shows impact results from an electrode having a low molecular weight (MW) binder. The mass ratio of binders to CB to active material remained the same as that used in the electrodes shown in FIG. 17A but the MW of the binder was reduced to 180 k, which is also provided by Sigma-Aldrich Co. of St. Louis, Mo. (Product No. 427152). The MW of the electrodes shown in FIG. 17B is lower than the MW of the binder used for the electrodes shown in FIG. 17A by ⅔. FIG. 17B show that the electrodes with lower MW binder suffer more cracking when subjected to an impact from a drop distance of 12 mm while the electrodes made from the larger MW binders were not damaged.

Figure 17D:
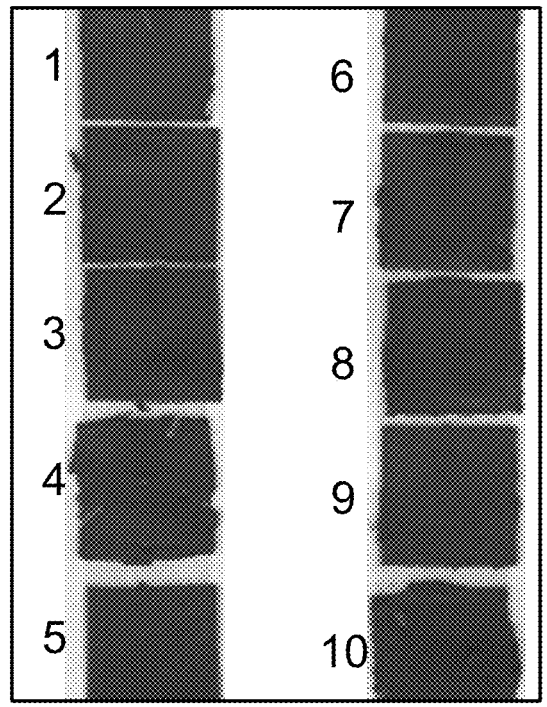
FIG. 17D shows electrodes having 5 wt % binder.
Figure 17E:
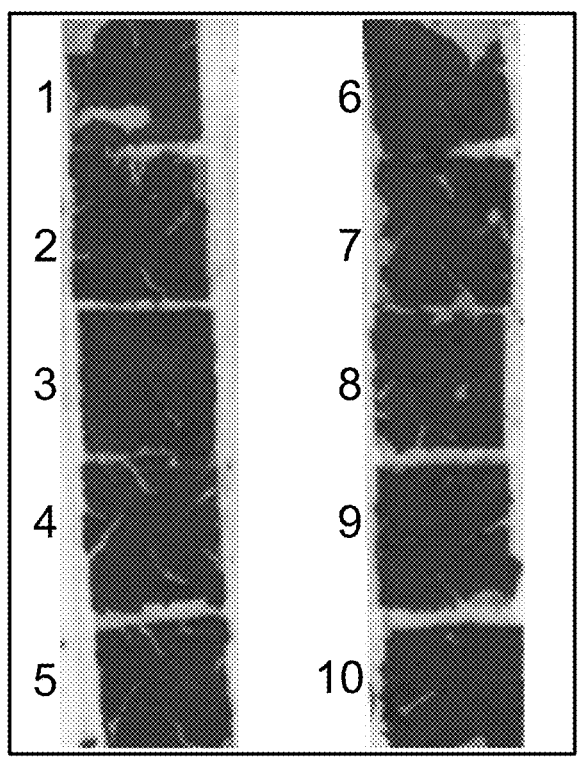
FIG. 17E shows electrodes having 4.5 wt % binder.
Figure 17F:
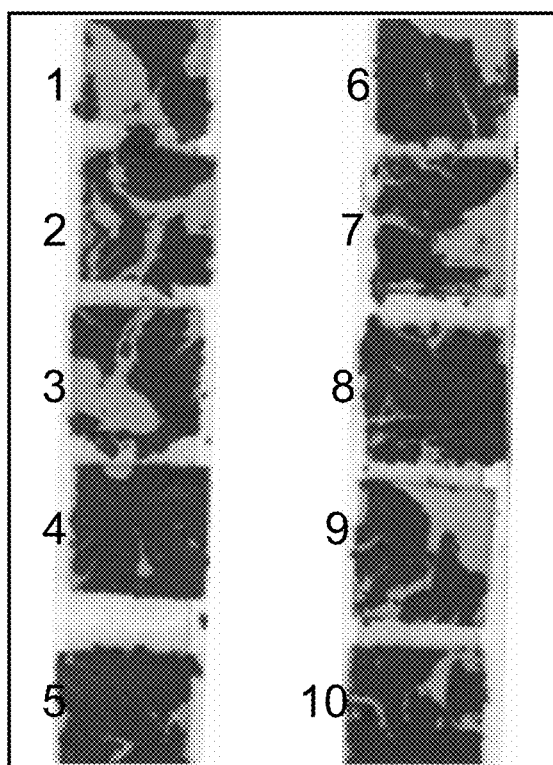
FIG. 17F shows electrodes having 4 wt % binder.

FIGS. 17C-F show samples made from different binder amounts of 6 wt % a mass ratio of binder:CB:active material was 6:1:93, 5 wt % (i.e., binder:CB:active material of 5:1:94), 4.5 wt % (i.e., binder:CB:active material of 4.5:1: 94.5) and 4 wt % (i.e., binder:CB:active material of 4:1:95), respectively when subjected to an impact from a drop distance of 12 mm. FIGS. 17D and 17A show that electrodes having the lowest (4 wt %) amount of binder exhibit extensive cracking damages after impact, while electrodes having the highest (6 wt %) amount of binder were not damaged.

While this specification contains many implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The damage initiators can be triggered mechanically or thermally; that is, damage initiators can deform, displace, break, melt or soften, and/or expose FEA/TRR/EA/GGA to the interior of battery, and/or absorb electrolytes upon thermal or mechanical loading.

Figure 18A:
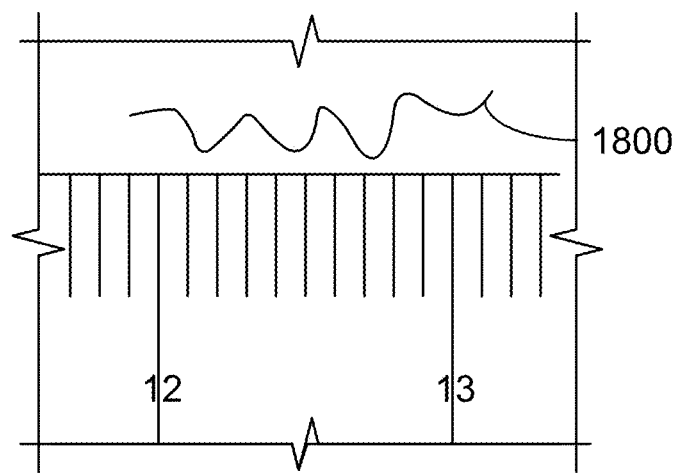
FIG. 18A shows a wavy nitinol wire.
Figure 18B:
FIG. 18B shows an embedded wire.
Figure 18C:
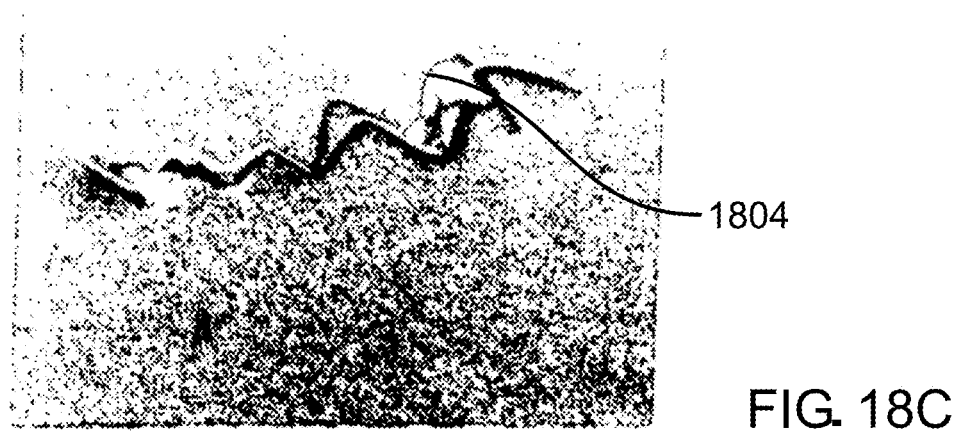
FIG. 18C shows cracks caused by an embedded wire.

FIG. 18A shows a wavy nitinol wire 1800 (Niti #5, FWMetal) having a diameter of 75 microns and a phase transition temperature of 95° C. was embedded in electrode 1820, as shown in FIG. 18B. The nitinol wire is straight at temperatures over 95° C. and has a wavy shape at room temperature. The nitinol wire was placed on a charge collector before slurry casting, and subsequently vacuum dried together with the slurry. The nitinol wire could also be directly compressed into the dried electrode at 30 MPa, as the electrode sample was compressed after drying. The electrode with embedded nitinol wire was heated by a hotplate to 100° C. In a few minutes, cracks 1804 caused by the shape change of the embedded nitinol wire are observed, as shown in FIG. 18Cs.

Damage initiators can be an elastic energy storage material/device (EESMD), such as a spring. An EESMD can be prestressed and be confined by a locking component, which can be weakened, softened, broken, or melt upon mechanical or thermal loading before releasing the stored elastic energy to cause damages in an electrode. EESMD can be placed in an electrode or near an electrode. If charge collectors, membrane separators, or battery cases are prestressed and the associated stored elastic energy can be released upon mechanical or thermal loading, they essentially become EESMD. EESMD can include pre-stressed or pre-compressed particles, fibers, tubes, rods, strings, layers, layer stacks, platelets of polymers, elastomers, metals and alloys, ceramics, glass materials, carbon materials, polyurethane, natural rubber, polybutadiene, thermoset resins, epoxy, polyester, and co-polymers containing these components.

EESMD can include springs, rings, wires, strings, beads, rods, beams, meshes, arrays, and trusses that can be deformed and pre-stressed elastically. They can be made of polymers, elastomers, ceramic materials, metallic materials, glass materials, carbon materials, or composite materials. They can be confined by locking components, which can include hollow carriers, coatings, blockers, and stoppers. The materials of above mentioned confining methods/materials can be metallic materials, polymers, elastomers, wax, epoxy, gelatin, glass materials, carbon materials, ceramics, and composite materials.

As the elastic energy is released form an EESMD, it can directly cause damages in electrode, or deform or displace other damage initiators in electrode, indirectly causing damages (e.g., widespread damages) in electrode. The damage initiators can be threads, meshes, arrays, and multilayers with various dimensions, surface properties and features, and shapes and configurations. The materials of the damage initiators can include polymers, elastomers, glass materials, carbon materials, metals and alloys, ceramics, and composite materials.

Figure 19A:
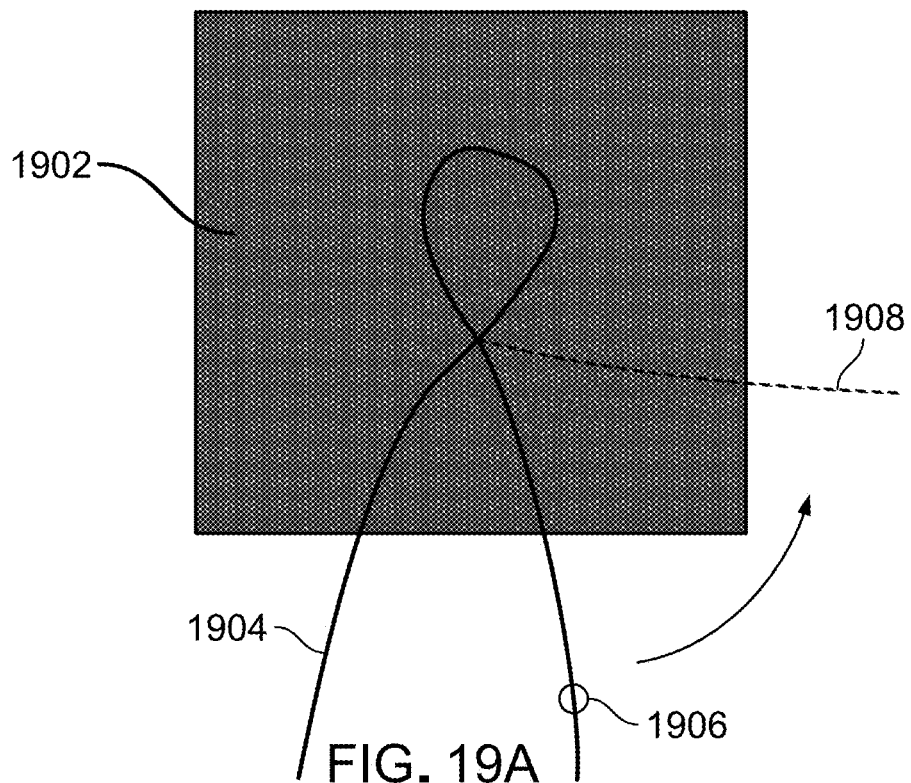
FIG. 19A shows a prestressed coil spring.
Figure 19B:
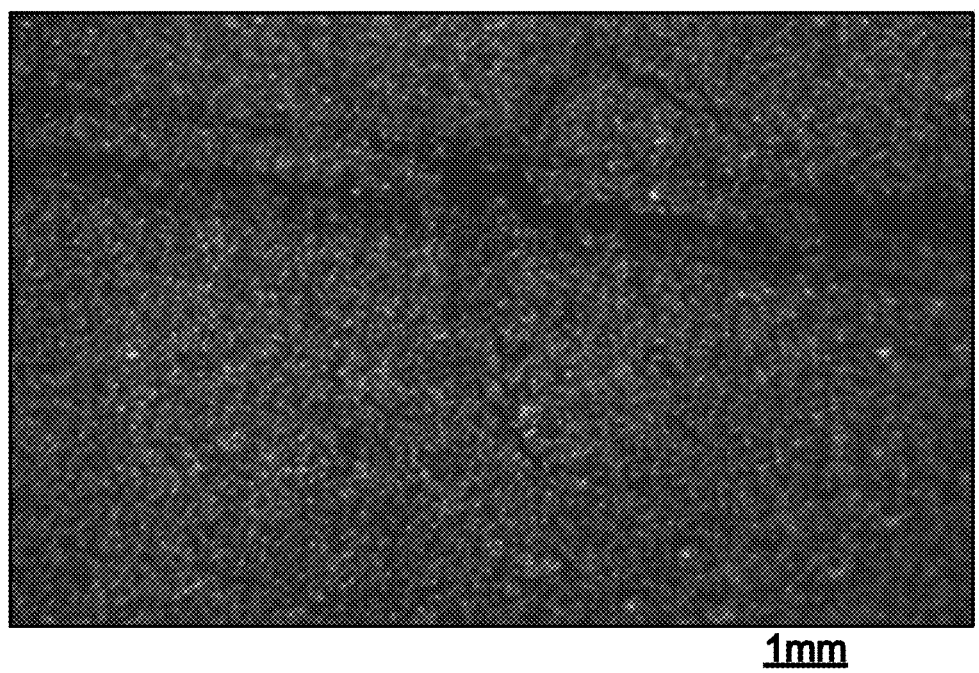
FIG. 19B shows damages in an electrode.

FIG. 19A shows a prestressed coil spring 1904 embedded in a cathode sample 1902. The coil spring 1904 was made from a stainless steel wire having a diameter of 125 microns (9882K11, from McMaster-Carr of Santa Fe Springs, Calif.). The curvature of the soil spring 1904 was about 1 mm. One end of the coil spring was initially fixed on an aluminum charge collector by duct tape. The other end of the coil spring was fixed by the locking component 1906, which can be, for example, a drop of paraffin having a melting point below 100° C. Initially, the coil spring 1904 was prestressed, so that its curvature can be changed by about 10%. Cathode slurry was casted on top of the prestressed spring, dried and compressed at 30 MPa. The electrode sample was then soaked up by 20 ml ethyl methyl carbonate (EMC) (from Sigma-Aldrich Co. of St. Louis, Mo., product number 754935), and covered by a 0.5 mm thick, 20 mm×10 mm glass plate. The electrode sample was heated by a Cimarec digital HP131125 hot plate from Thermo Scientific of Waltham, Mass., to 100° C., and the paraffin melted. The stored elastic energy in the spring was released and it relaxes to a position 1908 shown in FIG. 9, causing evident damages in the electrode, such as cracks 1910, as shown in FIG. 19B. The resistivity of the damaged electrode increased by more than 4 times compared to an undamaged electrode.

Other damage initiators, such as strings, threads, meshes, and arrays and layer stacks of them, can be deformed or displaced by elastic energy storage materials/devices upon mechanical or thermal loading. The dimensions, surface features and properties, and shapes and configuration of the damage initiators can be controlled in broad ranges. The damage initiators can also be deformed or displaced by thermally or mechanical responsive components other than EESMD.

Figure 20A:
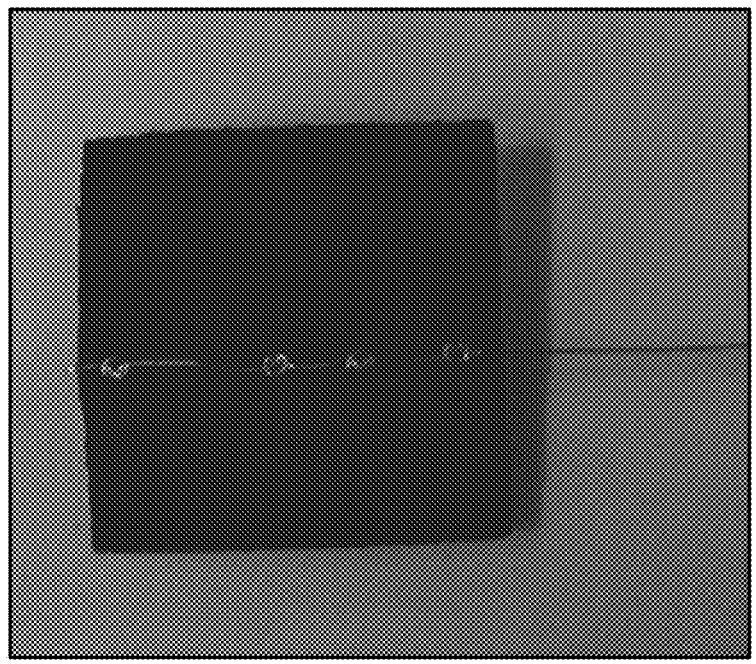
FIG. 20A shows a copper wire with knots.
Figure 20B:
FIG. 20B shows damages caused by the copper wire of FIG. 20A.

FIG. 20A shows a copper wire with knots 2002, embedded in an electrode sample 2004 The wire has a diameter of 80 microns. The electrode sample 2004 was processed using standard procedures, except that in the final compression step the wire was compressed into the dried electrode sample at 30 MPa by an Instron 5582 machine. After compression, the electrode sample soaked up 200 microliter of electrolyte. Damages 2006 observed in the electrode sample 2004, as shown in FIG. 20B, were caused by displacement of the wire, as the wire was pulled by a coil spring placed next to the electrode sample. FIG. 20B Damages in electrode caused by displacing the copper-wire damage initiator The resistivity of the damaged electrode increased by more than 4 times compared to an undamaged electrode.

Damage initiators (DI) can be distributed non-uniformly inside an electrode or near an electrode. DI can have heterogeneous and/or anisotropic materials, components, or shapes and configurations. Upon mechanical loading, such damage initiators or the electrode materials near such damage initiators deform or displace differently in different areas and/or along different directions, so that local compression, tension, shear, torsion, bending, cracking, voiding, or debonding are promoted. Such heterogeneous or anisotropic damage initiators can be fibers, wires, wedges, strips, tubes, meshes, arrays, and trusses. When a charge collector, a membrane separator, or a battery case has heterogeneous or anisotropic shapes, surface features, configurations, or materials or components, which can trigger internal damages in battery, they essentially become damage initiators. Such damage initiators and their components can be made of metallic materials, polymers, elastomers, carbon materials, glass materials, ceramics, and composite materials.

Figure 21A:
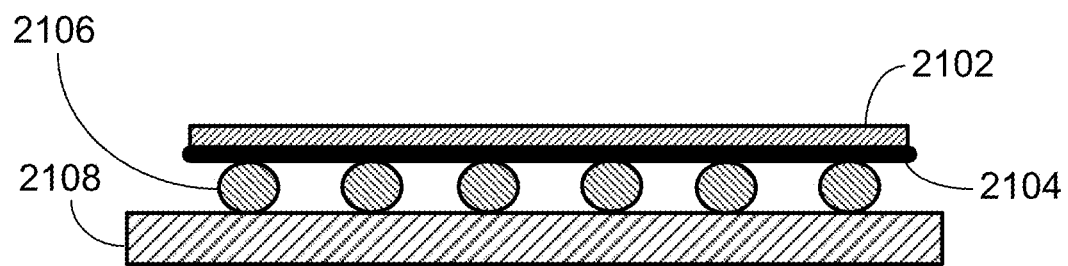
FIG. 21A shows copper wires as damage initiators.
Figure 21B:
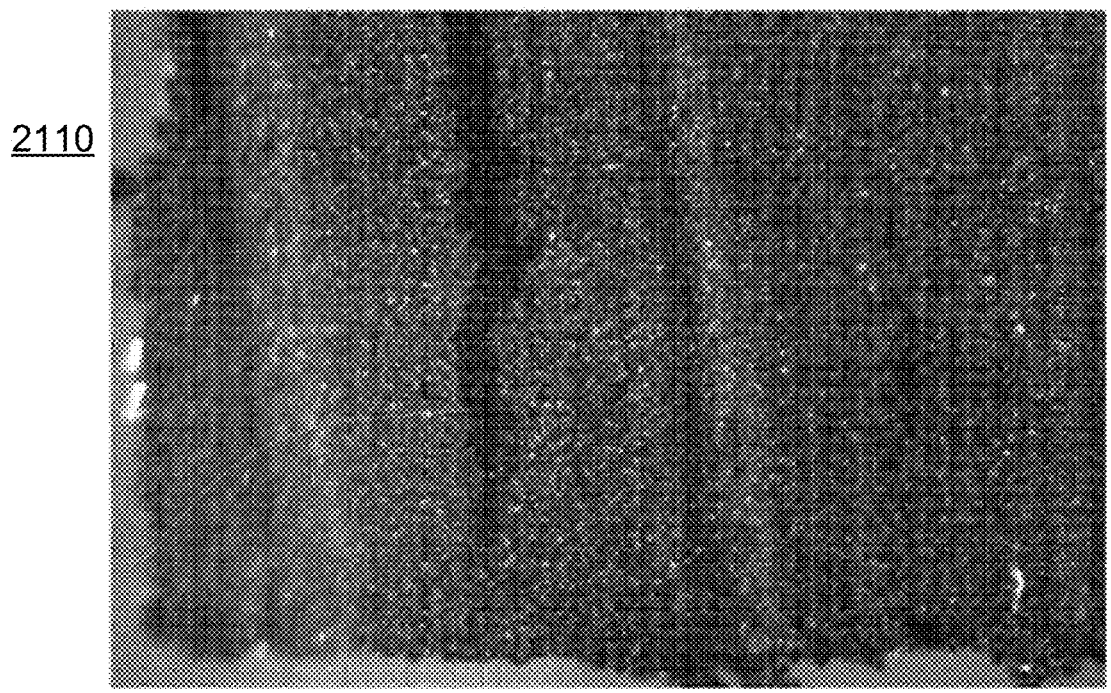
FIG. 21B shows damages in an electrode layer.
Figure 21C:
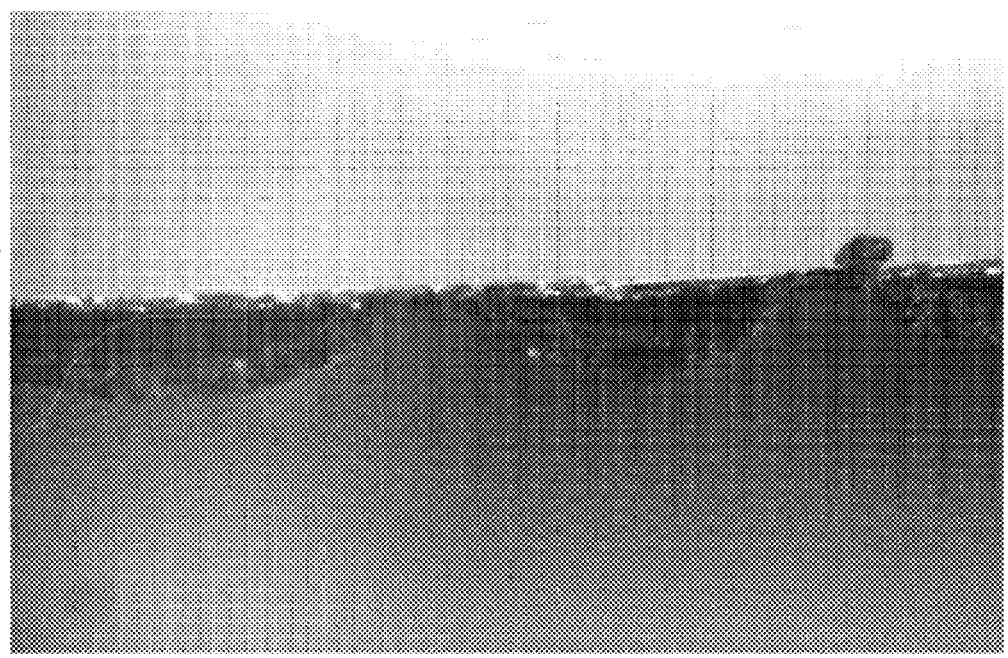
FIG. 21C shows debonding.

FIG. 21A shows an example of an aluminum (Al) sheet 2108 having copper (Cu) wires 2106 as damage initiators. The diameter of the Cu wire can be 500 microns and the spacing between the wires can also be about 500 microns. The Cu wires were firmly glued on the Al substrate 2108. A cathode sample was processed using standard procedures on an Al charge collector 2104. The cathode sample thickness was about 150 microns. The size of the electrode sample was 10×10 mm. The electrode layer 2102 soaked up 20 microliter of an electrolyte. The electrode sample was placed on top of an array of copper wires 2106. This setup was impacted using the same table top drop tower as shown in FIG. 4A. The drop weight and distance were 405 g and 15 mm, respectively. Upon impact, as the electrode layer 2102 was forced to bend and shear around the Cu wires 2106. Damages (e.g., cracks 2110) in an electrode layer and debonding (e.g., region 2112 in FIG. 21C) between the electrode layer 2102 and the charge collector 2104 were observed, as shown in FIGS. 21B and FIG. 21C, respectively. The resistivity of the damaged electrode increased by more than 3 times compared to the resistivity of an undamaged electrode. Using a soft impactor, e.g. a polyurethane hammer, helps promote widespread damage. The soft impactor models soft inner layers of battery case or other soft components near electrodes. If the shape or surface pattern of a charge collector or a battery case is non-flat and wavy, such as S-shaped or dotted-shaped, similar electrode damages can be achieved.

Figure 22A:
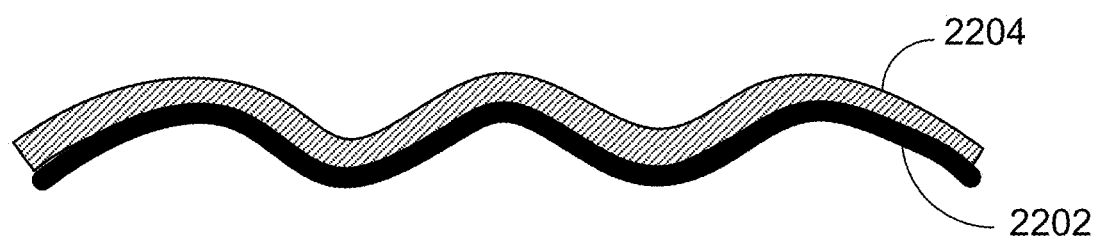
FIG. 22A shows a wavy shaped substrate.
Figure 22B:
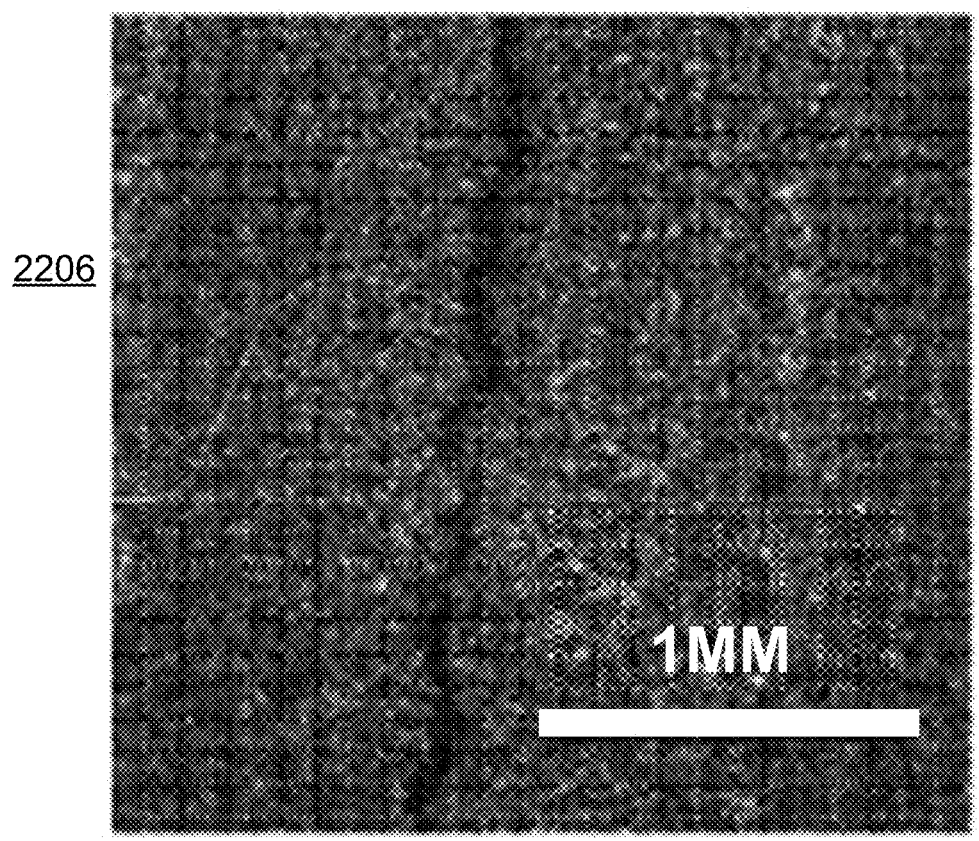
FIG. 22B shows damages in an electrode.

A wavy shaped substrate, e.g. a charge collector 2202, as shown in FIG. 22A, was tested as damage initiator. To control the shape of the charge collector 2202, two arrays of copper wires sandwich a copper foil. The copper wire has a diameter of 500 microns, and the spacing between adjacent wires was also 500 microns. The top and bottom arrays were misaligned so that the top array can move into the gaps of the bottom array when an external compression force is applied through a steel plate. After the charge collector 2202 was deformed, the steel plate and the top array of copper wires were removed. A cathode sample was prepared on the wavy charge collector 2202 using standard procedures, except that the final compression at 30 MPa was performed by a 10 mm thick polyurethane plate, instead of a steel plate. After compression, the electrode sample soaked up 20 ml of EMC. Then, the bottom array of copper wires was removed, as shown in FIG. 22A. A wavy electrode film 2204 was impacted by the table top drop tower shown in FIG. 4A. The drop weight and distance were 405 g and 30 mm, respectively. After impact, a large number of cracks 2206 were observed in the electrode sample, as shown in FIG. 22B. The resistivity of the damaged electrode increased by more than 2 times than compared to the electrode prior to the impact.

Upon mechanical or thermal loading, if gas generation agents (GGA) can be released or exposed to an electrode, an electrolyte, and/or a membrane separator, GGA can generate gas inside the battery andblock ion transport. In one example, ammonium carbonate was employed as GGA. About 50 mg of ammonium carbonate was immersed in 5 ml 50% ethyl methyl carbonate (EMC) solution of ethylene carbonate (EC). The system was heated to 100° C. Ammonium carbonate thermally decomposed and generated carbon dioxide gas, beginning at about 80° C. A large number of gas bubbles were generated.

In one example, 10 mg of ammonium carbonate powders, with the average particle size of about 80 μm, were compressed onto a cathode film, using a type 5582 Instron machine at 30 MPa. The cathode diameter was 16 mm, and its thickness was about 150 μm. The cathode film was supported by a copper (Cu) disk charge collector. The Cu disk diameter was 18 mm, and its thickness was 3 mm. A 25 μm thick Celgard 2325 PP/PE/PP membrane separator was firmly compressed on the top of the cathode film. The lateral surface of the cathode and the membrane separator was strengthened by a layer of Devcon 5 min epoxy glue. The glue layer thickness was nearly 30 μm. About 0.5 ml electrolyte, 1 M LiFP6 dissolved in EC: EMC (1:1 by weight), was dropped on the electrode-membrane system by a plastic disposable pipette. A second Cu disk charge collector with a diameter of 16 mm and a thickness of 3 mm was placed on top of the membrane separator. The two Cu charge collectors were connected by a RadioShack 22-812 multimeter, to measure the impedance of the electrode-membrane system. This setup could be heated by a Barnstead Cimarec digital HP131125 hot plate from Thermo Scientific of Waltham, Mass. The impedance was measured at both room temperature (25° C.) and 100° C. It could be clearly observed that as temperature increased, gas bubbles generated between the membrane and the electrode block ion transport and, increase an impedance of the system. At room temperature, the measured impedance was 5 kΩ; at 100° C., the impedance increased by more than 2 times to 12 kΩ. The gas bubble size was around a few hundred microns.

Upon mechanical or thermal loading, if electrolyte absorbers (EA) can be released or be exposed to an electrolyte, the amount of electrolyte available for ion transport would be reduced, creating the condition of "electrolyte starvation" (ES) in membrane separator and/or in electrodes, or both. The flammability of the electrolyte absorbed in EA is also reduced, as it is isolated from the environment.

Figure 23A:
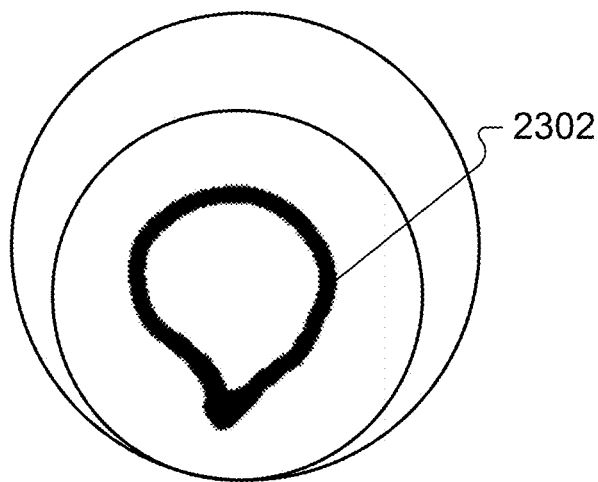
FIG. 23A shows nanoporous carbon.
Figure 23B:
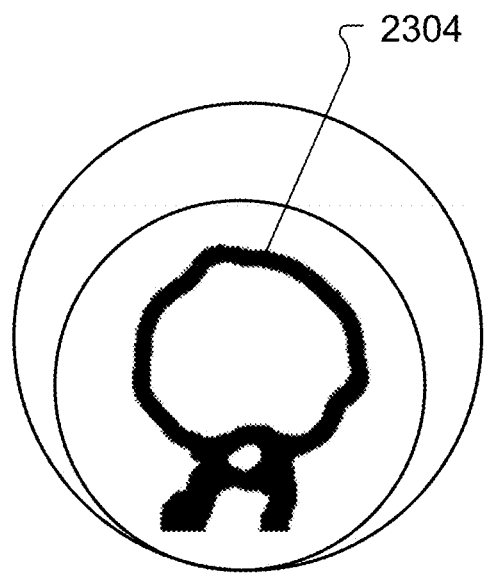
FIG. 23B shows nanoporous carbon that is soaked with an electrolyte.
Figure 23C:
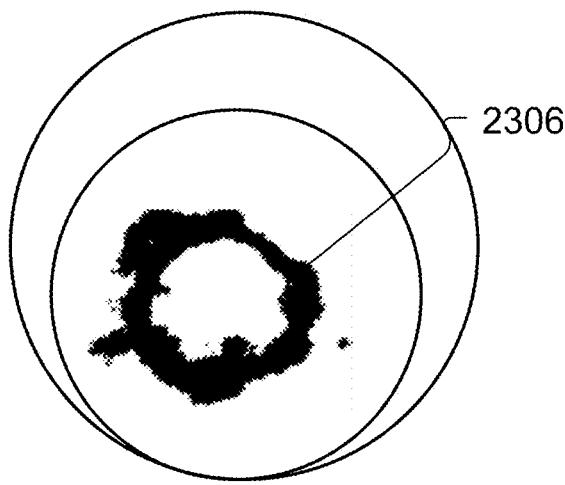
FIG. 23C shows nanoporous particles.
Figure 23D:
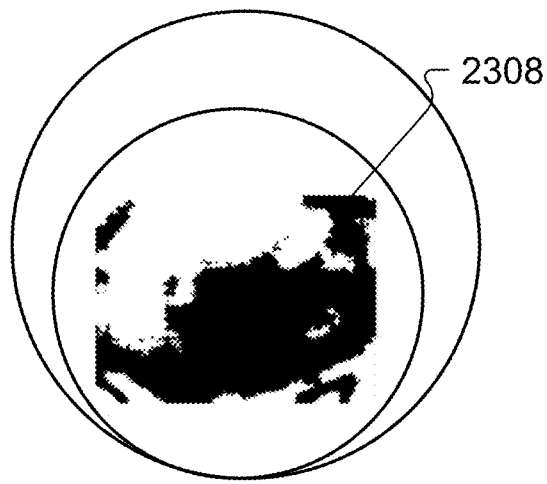
FIG. 23D shows nanoporous particles that are soaked with an electrolyte.

FIG. 23A shows nanoporous carbon 2302 (BP2000 obtained from Cabot Corporation of Boston, Mass.) that can be used to absorb electrolyte. The particles have nanopores of nanometer scale a specific surface area that is around 2000 m$^2$/g, and a porosity of 80%. As the particles 2302 are exposed to the electrolyte solution, the nanopores 2304 are filled by the liquid spontaneously. Thereafter, electrolyte starvation is developed in other areas. About 0.1 g of BP 2000 particles were placed in a sample glass container. About 0.4 mL 1 M LiPF6 in EC/EMC electrolyte (LP 50, BASF) was dropped onto the particles. The electrolyte was completely absorbed by the BP 2000 particles in a few seconds. Similar to carbon black particles, porous silica or silica gel can be used as electrolyte absorber. In one example, iTNM-b 2306 was used as EA. The raw material was obtained from JLK Industries of Coopersburg, Pa. (Product No. PP-35-HP-HS-18). The received nanoporous silica particles were heated in vacuum at 450° C. for 12 h. The nanoporous silica particles have the pore size around 100 nm. About 0.1 g of nanoporous silica particles were placed in a glass container. About 0.4 mL 1 M LiPF6 in EC/EMC electrolyte (LP 50 from BASF of Ludwigshafen, Germany) was dropped onto the particles. The electrolyte was completely absorbed by the nanoporous silica particles in a few seconds to form electrolyte soaked nanoporous silica particle 2308.

Figure 24A:
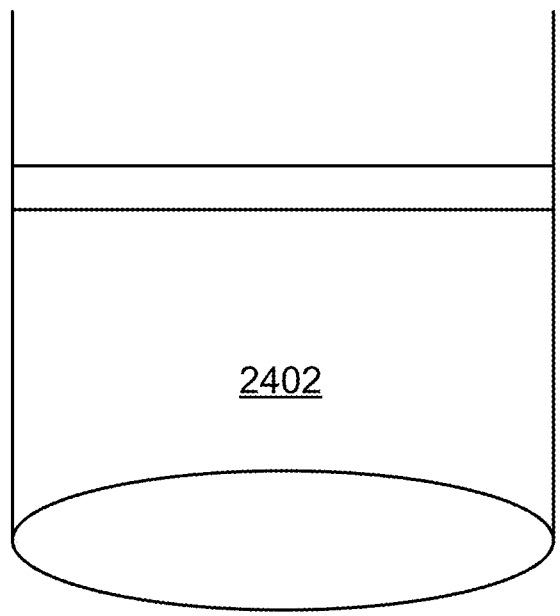
FIG. 24A shows a solution.
Figure 24B:
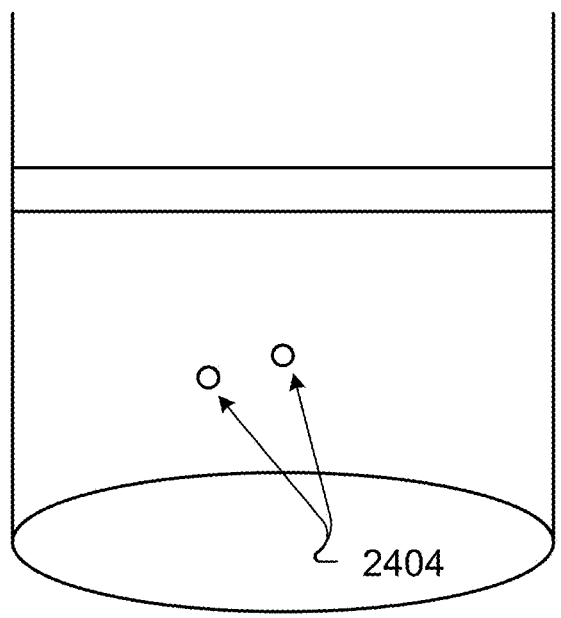
FIG. 24B shows bubbles in the solution of FIG. 24A.

FIG. 24A shows a solution 2402 of 0.05 g ammonium carbonate in 5 ml of 50% ethyl methyl carbonate (EMC) and 50% ethylene carbonate (EC) before and after heating at 100° C. A larger amount of liquid was used to show more clearly the generated gas bubbles 2404. Ammonium carbonate thermally decomposed and generated carbon dioxide, beginning at about 80° C., as shown in FIG. 24B.

Similarly, while operations are depicted in the drawings in a particular order, this should not be understood as requiring that such operations be performed in the particular order shown or in sequential order, or that all illustrated operations be performed, to achieve desirable results. In addition, the systems and techniques described above can be combined with the subject matter of the patent application entitled, "Rate-sensitive and self-releasing battery cells and battery-cell structures as structural and/or energy-absorbing vehicle components", filed on the same day. For example, a non-chemical approach to developing low-cost, robust, and multifunctional battery systems for electric vehicles can be enabled.

The first material/device includes an elastic energy storage material or device. The elastic energy storage material or device can be placed inside or near electrode.

The elastic energy storage material or device can be confined by a locking component. Upon mechanical or thermal loading, the locking component can be weakened, softened, or broken part, so as to release elastic energy.

The elastic energy storage material or device can directly release elastic energy into the electrode, or deform or displace other damage initiators. Both cause widespread damage in electrode.

The damage initiators in electrode can deform, displace, debond, or fracture or rupture upon mechanical or thermal loading, aided by another material or device.

The elastic energy storage material or device can be charge collector, membrane separator, battery case, or a part of them, as they are prestressed and released upon mechanical or thermal loading.

The first material/device includes a heterogeneous or nonuniformly distributed, or anisotropic damage initiators. The damage initiators can be placed inside or near electrodes.

Upon mechanical loading, the damage initiators or electrode materials near such damage initiators deform or displace heterogeneously or anisotropically (i.e. differently in different areas or along different directions), causing widespread damage, as local bending, torsion, shear, compression, tension, debonding, cracking, or voiding is promoted. As charge collectors, membrane separators, or battery case have heterogeneous or anisotropic shapes or surface patterns or materials/components, they can become such damage initiators.

Using a soft impact promotion layer helps promote widespread damaging.

The electrolyte absorbers include materials that can absorb electrolyte, materials that prevent electrolyte from being available for ion transport, materials that isolate electrolyte from the rest of battery system.

The gas generation agents include materials that generate gas phase or gas bubbles, which can be placed in electrode, membrane separator, or electrolyte.

The container can be used to house any materials that mitigate thermal runaway. The container of the second material is optional if the second material is stable and non-reactive under battery operation condition.

The first material includes an elastic energy storage material or device. The elastic energy storage material or device can be placed inside or near electrode.

The elastic energy storage material or device can be confined by a locking component. Upon mechanical or thermal loading, the locking component can be weakened, softened, or broken, so as to release elastic energy.

The elastic energy storage material or device can directly release elastic energy into the electrode, or deform or displace other damage initiators, causing widespread damage in electrode.

The damage initiators in or near electrode can deform, displace, debond, or fracture or rupture upon mechanical or thermal loading.

The damage initiators in or near electrode can deform, displace, debond, or fracture or rupture upon mechanical or thermal loading, aided by another material or device in battery.

The elastic energy storage material or device can be charge collector, membrane separator, battery case, or a part of them, as they are prestressed and released upon mechanical or thermal loading.

The first material includes a heterogeneous or nonuniformly distributed, or anisotropic damage initiators, which can be placed inside or near electrodes.

Upon mechanical loading, the damage initiators or electrode materials near such damage initiators deform or displace heterogeneously or anisotropically (i.e. differently in different areas or along different directions), causing widespread damage, as local bending, torsion, shear, compression, tension, debonding, cracking, or voiding is promoted. Charge collectors, membrane separators, or battery case having heterogeneous or anisotropic shapes or surface patterns or materials/components can become such damage initiators.

Using soft impact promotion components helps promote widespread damaging. Particular embodiments of the invention have been described.

Changing a configuration of an electrolyte can include creating bubbles, absorbing liquids, increasing resistivity, or changing viscosity, Other embodiments are within the scope of the following claims. For example, the actions recited in the claims can be performed in a different order and still achieve desirable results.

What is claimed is:

1. A lithium-ion battery comprising:
   electrodes comprising an anode and a cathode;
   a membrane;
   an electrolyte; and
   charge collectors,
   characterized in that the battery further comprises a first material configured and arranged to increase an internal impedance of the battery upon mechanical loading, but before or shortly after thermal runaway has begun, to reduce or eliminate thermal runaway, wherein the first material is a crack or void initiator embedded in at least one electrode, an amount of the crack or void initiator configured to create cracks or voids in at least one electrode upon mechanical loading and wherein the crack or void initiator creates cracks or voids in at least one electrode by debonding of interfaces between the crack or void initiator and at least one electrode, fracture and rupture of the crack or void initiator, stress concentration caused by the crack or void initiator, and/or local shear, bending, torsion, compression and tension caused by stiffness mismatch of the crack or void initiator and at least one electrode, and further characterized in that the first material comprises hollow microfibers that enclose a second material.

2. The battery of claim 1, wherein the first material comprises a binder of at least one electrode, the binder configured to crack upon mechanical loading.

3. The battery of claim 1, further comprising:
materials that absorb an electrolyte, or
materials that isolate the electrolyte from a region of the battery.

4. The battery of claim 1, wherein the first material is deposited in aggregates or distributed non-uniformly inside the battery.

5. The battery of claim 1, wherein the first material has anisotropic properties and promotes damages in the electrode upon mechanical loading due to stiffness mismatch and local bending.

6. The battery of claim 1, further comprising an elastic energy storage material inside or near an electrode of the battery wherein the elastic energy storage material comprises a part of a prestressed charge collector, a part of a prestressed membrane separator, or a part of a prestressed battery case, and wherein the elastic energy storage material is confined by a locking component that weakens and releases elastic energy upon mechanical loading.

7. The battery of claim 1, wherein:
the battery optionally comprises a battery case; and
the shapes of the membrane, the battery case, or the charge collectors are non-uniform and configured to promote local shear, bending, tension, compression, or torsion of the electrodes when the battery is deformed.

8. The battery of claim 1, wherein the hollow microfibers are configured to release the second material upon mechanical or thermal loading.

9. The battery of claim 1, wherein the second material is a fire-extinguishing agent.

10. The battery of claim 9, wherein the fire-extinguishing agent is selected from the group consisting of sodium bicarbonate, monoammonium phosphate, potassium bicarbonate, potassium bicarbonate and urea complex, potassium chloride, aqueous film forming foam (AFFF), alcohol-resistant aqueous film forming foams (AR-AFFF), film forming fluoroprotein (FFF), compressed air foam system (CAFS), sodium chloride, copper, graphite, sodium carbonate-based powders, ammonium sulfate with sodium bicarbonate solution, and combinations thereof.

11. The battery of claim 1, wherein the second material is a thermal runaway retarder.

12. The battery of claim 11, wherein the thermal runaway retarder is selected from the group consisting of: aromatic amine, N,N-Diethylaniline, N,N-diethyl-p-phenylenediamine, 2-(2-methylaminoethyl)pyridine, 5-amino-1,3,3-trimethylcyclohexanemethylamine, (1R,2R)-(+)-1,2-diphenylethylenediamine, N,N'-diphenylethylenediamine, tryptamine, 2-benzylimidazoline, 1,2,3,4-tetrahydro-9H-pyrido[3,4-b]indole, 4,4'-diaminodiphenylmethane, 1-(N-boc-aminomethyl)-4-(aminomethyl)benzene, pyridine, epoxy, polyester, poly (vinyl ester), polyurethane, bakelite, polyimide, urea methanol, melamine, sodium lauryl sulfate, sodium dodecylbenzenesulfonate, oleic acid, n,n'-diphenylethylenediamine, 4,4'-diaminodiphenylmethane and 1-(N-Boc-aminomethyl)-4-(aminomethyl)benzene; nonionic surfactants such as 2,4,7,9-Tetramethyl-5-decyne-4,7-diol, polyethylene glycol hexadecyl ether, polyoxyethylene nonylphenyl ether, sorbitan laurate, polyethylene glycol sorbitan monolaurate, glycerol, glycerin, and combinations thereof.

13. The battery of claim 1, wherein the second material is an electrolyte absorber.

14. The batter of claim 13, wherein the electrolyte absorber is selected from the group consisting of: poly (sodium acrylate), poly acrylic acid-sodium styrene sulfonate (AA-SSS), poly acrylic acid, 2-acrylamido-2-methylpropane sulfonic acid (AA-AMPS), 2-Acrylamido-2-methylpropane sulphonic acid and poly(ethylene glycol) copolymer, poly (potassium, 3-sulfopropyl acrylate-acrylic acid) gels, poly (AMPS-TEA-co-AAm), (poly ethylene glycol methyl ether methacrylate-acrylic acid) copolymers, methacrylamidopropyltrimethyl ammonium chloride (MAPTAC), bovine serum albumin, casein, lactoferrin, poly (-vinylpyridine) (PVP), x,y-ionene, poly(N,N-diallyl-N,N-dimethyl-ammonium chloride) (PDMDAAC), poly(trimethylammonioethylmethacrylate) (PTMAEMA), modified polyaspartamide (PAsp), poly(amidoamine)s (PA), poly(N-isopropylacryl amide) (PNIPAM), poly(dimethylaminoethyl-L-glutamine) (PDMAEG) and copolymers, Poly(methylmethacrylate) (PMMA), methacrylamide derivatives, poly[2-(dimethylamino)ethyl methacrylamide] (PDMAEMA), poly(L-lysine) (PLL), amino acid-based polymers, poly(N-ethyl-4-vinylpyridinium bromide) (PEVP), poly(4-vinylpyridine) (PVP) copolymers, modified poly(1, 2-propylene H-phosphonate), silica, aerogels, poly (sodium acrylate), poly acrylic acid-sodium styrene sulfonate (AA-SSS), poly acrylic acid and 2-acrylamido-2-methylpropane sulfonic acid (AA-AMPS), 2-Acrylamido-2-methylpropane sulphonic acid, poly(ethylene glycol) copolymer, poly (potassium, 3-sulfopropyl acrylate-acrylic acid) gels, poly (AMPS-TEA-co-AAm), (poly ethylene glycol methyl ether methacrylate-acrylic acid) copolymers, methacrylamidopropyltrimethyl ammonium chloride (MAPTAC), and combinations thereof.

15. The battery of claim 1, wherein the second material is a gas generation agent.

16. The battery of claim 15, wherein the gas generation agent is selected from the group consisting of: acetone, methanol, ethanol, acetonitrile, benzene, carbon tetrachloride, cyclohexane, ethyl acetate, isopropyl alcohol, tert-butyl alcohol and trimethylamine, thermal decomposition of ionic solids, sodium bicarbonate and potassium bicarbonate, silver permanganate, ammonium permanganate, nickel permanganate, copper permangantes, ammonium nitrate, ammonium chromates, ammonium citrate, ammonium carbonate, ammonium bicarbonate, diaquaamminecobalt chloride, diaquaamminecobalt bromide, cobalt ammines chloride, cobalt ammines nitrate, chromium ammines thiocyanate and nickel ammines chloride, nitronium, nitrosonium perchlorates, silver oxalate, sodium azide, potassium azide, lithium azide, ammonium azide, azodicarbonamide, azobisisobutyronitrile, n,n'-dinitrosopentamethylenetetramine, 4,4'-oxydibenzenesulfonyl hydrazide, p-toluenesulfonyl hydrazide, ammonium copper sulfate hexahydate, nickel sulfate hexahydrate, calcium sulfate hemihydrate, lithium sulfate monohydrate, sodium carbonate monohydrate, borax, nickel oxalate dehydrate, sodium carbonate perhydrate, alkali, oxalate perhydrate, calcium sulfite, and combinations thereof.

17. The battery of claim 15, wherein the gas generation agent comprises bubble generation promoters (BGP).

\* \* \* \* \*

UNITED STATES PATENT AND TRADEMARK OFFICE
CERTIFICATE OF CORRECTION

PATENT NO. : 11,677,123 B2
APPLICATION NO. : 16/889168
DATED : June 13, 2023
INVENTOR(S) : Yu Qiao et al.

It is certified that error appears in the above-identified patent and that said Letters Patent is hereby corrected as shown below:

In the Specification

In Column 1, Line 15, delete "DAME-INITIATING" and insert -- DAMAGE-INITIATING --;

In the Claims

In Column 28, Line 11, in Claim 14, delete "batter" and insert -- battery --;

In Column 28, Line 22, in Claim 14, delete "permangantes," and insert -- permanganates, --;

In Column 28, Line 23, in Claim 14, delete "(PDMDAAC)" and insert -- (PDADMAC) --;

In Column 28, Lines 23-24, in Claim 14, delete "poly(trimethylammonioethylmethacrylate)" and insert -- poly(trimethylammoniumethylmethacrylate) --;

In Column 28, Line 63, in Claim 16, delete "hexahydate," and insert -- hexahydrate, --.

Signed and Sealed this
First Day of August, 2023

Katherine Kelly Vidal
Director of the United States Patent and Trademark Office